United States Patent
Lim et al.

(10) Patent No.: US 11,131,889 B2
(45) Date of Patent: Sep. 28, 2021

(54) LIQUID CRYSTAL DISPLAY DEVICE AND METHOD OF MANUFACTURING THE SAME

(71) Applicants: Samsung Display Co., Ltd., Yongin-si (KR); INDUSTRIAL COOPERATION FOUNDATION CHONBUK NATIONAL UNIVERSITY, Jeonju-si (KR)

(72) Inventors: Ho Lim, Suwon-si (KR); Shin Woong Kang, Jeonju-si (KR); Keun Chan Oh, Hwaseong-si (KR); Jae Jin Lyu, Yongin-si (KR); Aboozar Nasrollahi, Jeonju-si (KR); Vineet Kumar, Jeonju-si (KR)

(73) Assignees: Samsung Display Co., Ltd., Yongin-si (KR); Industrial Cooperation Foundation Chonbuk National University, Jeonju-si (KR)

( * ) Notice: Subject to any disclaimer, the term of this patent is extended or adjusted under 35 U.S.C. 154(b) by 89 days.

(21) Appl. No.: 16/143,045

(22) Filed: Sep. 26, 2018

(65) Prior Publication Data

US 2019/0155110 A1 May 23, 2019

(30) Foreign Application Priority Data

Nov. 23, 2017 (KR) .......................... 10-2017-0157539

(51) Int. Cl.
*G02F 1/1337* (2006.01)
*G02F 1/1343* (2006.01)
(Continued)

(52) U.S. Cl.
CPC ........ *G02F 1/133788* (2013.01); *C09K 19/24* (2013.01); *C09K 19/56* (2013.01);
(Continued)

(58) Field of Classification Search
CPC ......... G02F 1/133788; G02F 1/133753; G02F 1/133711; G02F 1/134309; G02F 1/13439;
(Continued)

(56) References Cited

U.S. PATENT DOCUMENTS

| 6,153,272 | A * | 11/2000 | Kim ........................ C09K 19/56 |
| | | | 428/1.5 |
| 2003/0081162 | A1 * | 5/2003 | Miller ............... G02F 1/133711 |
| | | | 349/129 |

(Continued)

FOREIGN PATENT DOCUMENTS

| CN | 107870485 A | 4/2018 |
| KR | 10-2015-0022130 A | 3/2015 |

(Continued)

*Primary Examiner* — Sophie Hon
(74) *Attorney, Agent, or Firm* — Lewis Roca Rothgerber Christie LLP

(57) ABSTRACT

A liquid crystal display device and a method of manufacturing a liquid crystal display device are provided. The liquid crystal display device includes: a base; an alignment inducing layer on the base and including a first compound represented by formula A1 or a polymer of the first compound; and a liquid crystal layer on the alignment inducing layer that includes liquid crystals:

(Continued)

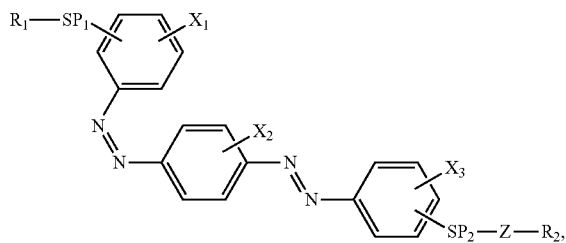

(A1)

where $R_1$ may be hydrogen or a polymerizable group, $R_2$ may be a hydrophilic group, $SP_1$ and $SP_2$ may each independently be a single bond, a $C_1$-$C_{12}$ alkylene group, or a $C_1$-$C_{12}$ alkoxylene group, Z may be a single bond, an ester group, or an ether group, and $X_1$, $X_2$ and $X_3$ may each independently be hydrogen, a methyl group, fluorine, or chlorine.

19 Claims, 42 Drawing Sheets

(51) Int. Cl.
  *C09K 19/56* (2006.01)
  *C09K 19/24* (2006.01)
  *G02F 1/1335* (2006.01)
  *G02F 1/1368* (2006.01)
  *G02F 1/1362* (2006.01)
  *C09K 19/04* (2006.01)

(52) U.S. Cl.
  CPC ............... *G02F 1/134309* (2013.01); *C09K 2019/0448* (2013.01); *C09K 2323/02* (2020.08); *G02F 1/1368* (2013.01); *G02F 1/13439* (2013.01); *G02F 1/133528* (2013.01); *G02F 1/133548* (2021.01); *G02F 1/133742* (2021.01); *G02F 1/133746* (2021.01); *G02F 1/136227* (2013.01); *G02F 1/136286* (2013.01)

(58) Field of Classification Search
  CPC ......... G02F 1/133528; G02F 1/133548; G02F 1/1368; G02F 1/136227; G02F 1/136286; G02F 2001/133746; G02F 2001/133742; G02F 2001/133548; C09K 19/24; C09K 19/56; C09K 2019/0448; C09K 2323/02; Y10T 428/1005
  See application file for complete search history.

(56) References Cited

U.S. PATENT DOCUMENTS

| 2013/0116396 | A1* | 5/2013 | Nose | C08F 220/26 526/263 |
| 2013/0182204 | A1* | 7/2013 | Shin | G02F 1/133753 349/106 |
| 2015/0036092 | A1* | 2/2015 | Miyake | G02F 1/134336 349/144 |
| 2016/0077365 | A1* | 3/2016 | Park | G02F 1/133707 349/42 |
| 2017/0210994 | A1 | 7/2017 | Lim et al. | |
| 2018/0046034 | A1 | 2/2018 | Lim et al. | |

FOREIGN PATENT DOCUMENTS

| KR | 10-2015-0030026 A | 3/2015 |
| KR | 10-2016-0031942 A | 3/2016 |

* cited by examiner

FIG. 21
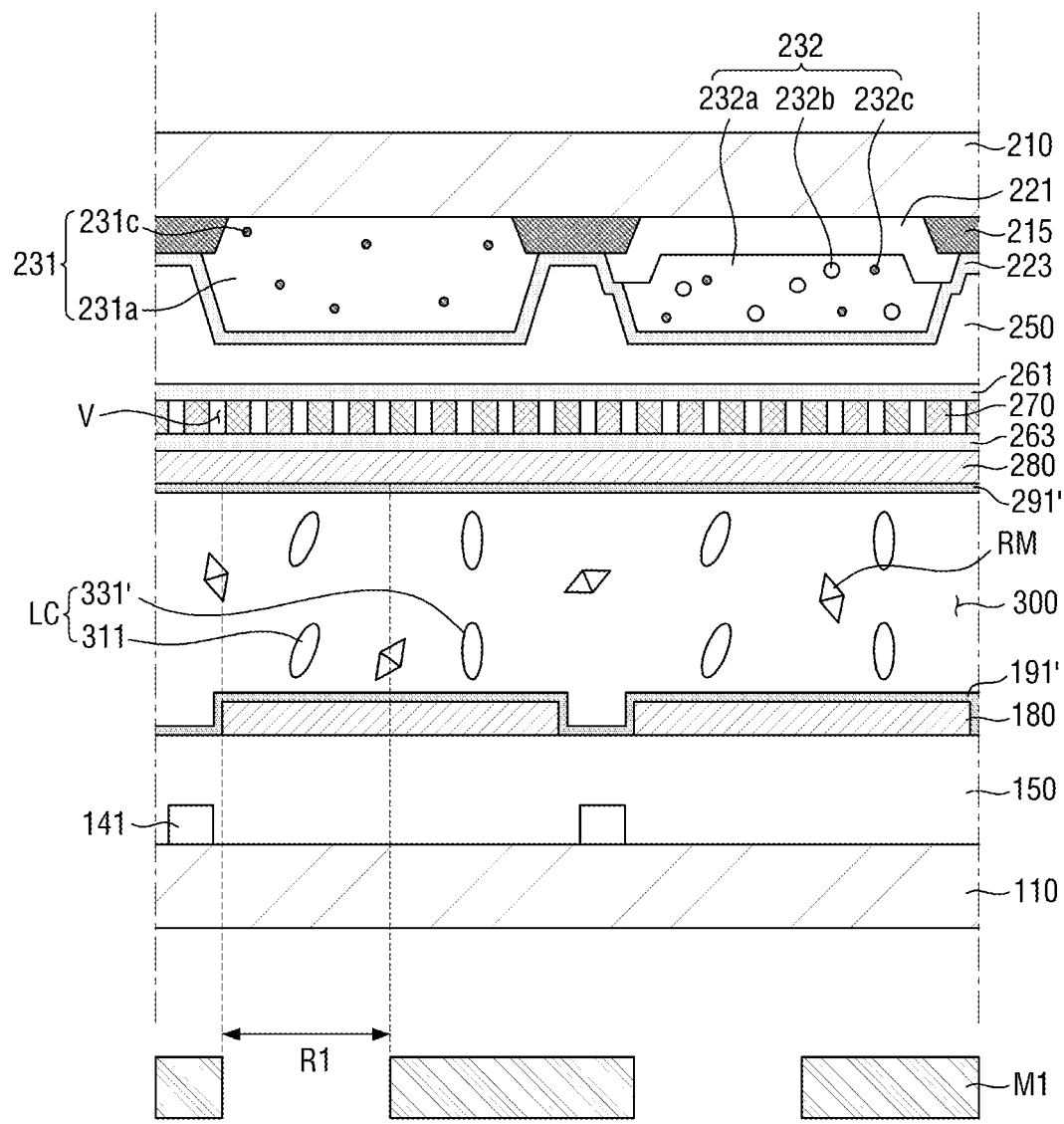
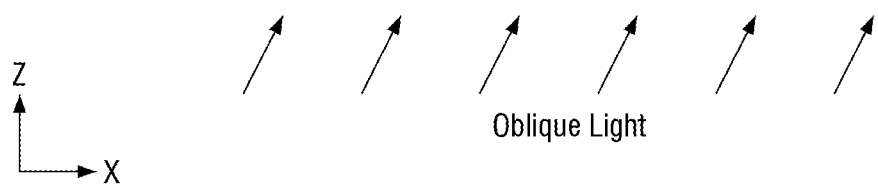

LIQUID CRYSTAL DISPLAY DEVICE AND METHOD OF MANUFACTURING THE SAME

CROSS-REFERENCE TO RELATED APPLICATION

This application claims priority to and the benefit of Korean Patent Application No. 10-2017-0157539, filed on Nov. 23, 2017, in the Korean Intellectual Property Office, the entire content of which is herein incorporated by reference.

BACKGROUND

1. Field

The present disclosure relates to a liquid crystal display (LCD) and a method of manufacturing the same.

2. Description of the Related Art

With the development of multimedia, display devices are becoming increasingly important. Accordingly, various display devices such as liquid crystal displays (LCDs) and organic light-emitting diode displays (OLEDs) are being developed.

An LCD device includes field generating electrodes (e.g., pixel electrodes and a common electrode) to form and apply an electric field to a liquid crystal layer. The LCD displays an image by rearranging liquid crystals in the liquid crystal layer using the field generating electrodes in order to control the amount of light transmitted through the liquid crystal layer in each pixel.

In order to provide an LCD having excellent display quality, a fast reaction speed and a wide viewing angle are desired.

SUMMARY

To increase the response speed of an LCD (e.g., the rearrangement of liquid crystals in response to the electric field), a pretilt may be given to liquid crystals (e.g., the liquid crystals may be previously tilted) in a direction in which the liquid crystals are to be rearranged when the LCD is driven. If the liquid crystals are pretilted in consideration of the direction of an electric field, the liquid crystals can be quickly rearranged in that set or predetermined direction, i.e., in a pretilt direction, thereby improving the response speed of the LCD.

In addition, to realize a wide viewing angle of an LCD, a plurality of domains having different liquid crystal pretilt and rearrangement directions may be formed in one (e.g., within the same) pixel. For example, fine slits extending in different directions may be formed in a field generating electrode (such as a pixel electrode and/or a common electrode) to thereby form a plurality of domains having different liquid crystal rearrangement directions within one pixel. However, the above-described domain division portions (for example, the fine slits) can cause a reduction in LCD luminance and a texture defect (e.g., unwanted texturization of the image).

Aspects of example embodiments of the present disclosure provide a liquid crystal display (LCD) having improved response speed and viewing angle characteristics by having a plurality of domains in one pixel and aligning liquid crystals in each domain to have a pretilt in a different direction.

Aspects of example embodiments of the present disclosure also provide a method of manufacturing an LCD, in which a plurality of domains are formed in one pixel, and liquid crystals in each domain have a pretilt in a different direction.

However, aspects of example embodiments of the present disclosure are not restricted to the one set forth herein. The above and other aspects of the present disclosure will become more apparent to one of ordinary skill in the art to which the present disclosure pertains by referencing the detailed description of the present disclosure given below.

Aspects of one or more example embodiment of the present disclosure provide a liquid crystal display device. The liquid crystal display device (LCD) includes: a base; an alignment inducing layer on the base and including a first compound represented by formula A1 or a polymer of the first compound; and a liquid crystal layer on the alignment inducing layer and comprising liquid crystals:

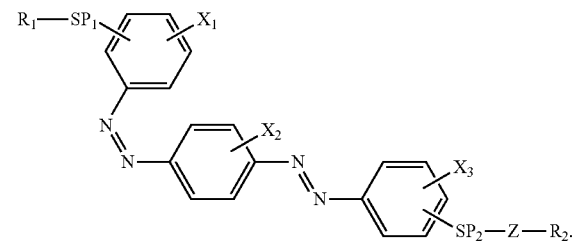

(A1)

In formula A1, $R_1$ may be hydrogen or a polymerizable group, $R_2$ may be a hydrophilic group; $SP_1$ and $SP_2$ may each independently be a single bond, a $C_1$-$C_{12}$ alkylene group, or a $C_1$-$C_{12}$ alkoxylene group; Z may be a single bond, an ester group or an ether group; and $X_1$, $X_2$ and $X_3$ may each independently be hydrogen, a methyl group, fluorine, or chlorine.

In some embodiments, the alignment inducing layer may further comprise a second compound represented by formula B1 or a polymer of the second compound:

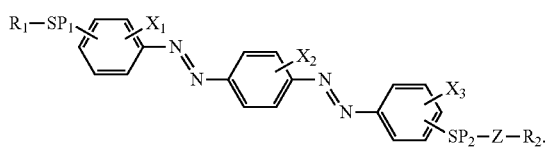

(B1)

In formula B1, $R_1$, $R_2$, $SP_1$, $SP_2$, Z, $X_1$, $X_2$ and $X_3$ may each independently be the same as defined in formula A1.

In some embodiments, $R_2$ of the first compound and/or $R_2$ of the second compound may be a monovalent group having (e.g., including) two or more hydroxyl groups or two or more carboxyl groups.

In some embodiments, the solubility of the second compound in the liquid crystals may be less than about 0.01% by weight.

In some embodiments, the alignment inducing layer may be in contact with the liquid crystal layer to induce pretilt of the liquid crystals, and the liquid crystals may have negative dielectric anisotropy.

In some embodiments, $R_2$ of the first compound or the polymer of the first compound may be aligned toward the base (e.g., may be tilted toward or closer to the base than the liquid crystal layer), and $R_1$ of the first compound or the polymer of the first compound may be aligned toward the liquid crystal layer (e.g., may be tilted toward or closer to the liquid crystal layer than the base).

In some embodiments, a plurality of pixels may be defined, and each pixel may include a first domain and a second domain having different pretilt directions of the liquid crystals, wherein a planar direction (e.g. orientation) of *—$SP_1$—$R_1$ of the first compound in the alignment inducing layer in the first domain may be different from a planar direction of the polymerizable group of the first compound in the alignment inducing layer in the second domain.

In some embodiments, a plurality of pixels may be defined, and each pixel may include a first domain and a fourth domain having the same tilt direction of the liquid crystals, wherein the liquid crystals in the first domain may have a pretilt toward the center of the pixel, and the liquid crystals in the fourth domain may have a pretilt toward the periphery of the pixel.

In some embodiments, the alignment inducing layer may further comprise a third compound represented by formula C1 or a polymer of the third compound, wherein the content of the first compound may be greater than that of the third compound:

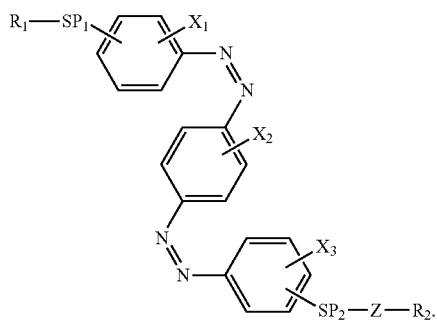

(C1)

In formula C1, $R_1$, $R_2$, $SP_1$, $SP_2$, Z, $X_1$, $X_2$ and $X_3$ may each independently be the same as defined in formula A1.

In some embodiments, the LCD may further include a first field generating electrode between the base and the alignment inducing layer. A plurality of pixels may be defined within the first field generating electrode, and each pixel may comprise a plurality of domains having different tilt directions of the liquid crystals, wherein the first field generating electrode does not have domain division portions.

Aspects of one or more example embodiments of the present disclosure provide a method of manufacturing a liquid crystal display device. The method of manufacturing an LCD may include: forming a pre-alignment inducing layer on a base and a liquid crystal layer including liquid crystals on the pre-alignment inducing layer; and irradiating the pre-alignment inducing layer with light having a first peak wavelength, wherein the pre-alignment inducing layer includes a second compound represented by formula B1:

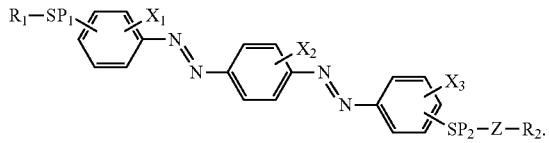

(B1)

In formula B1, $R_1$ may be a polymerizable group; $R_2$ may be a hydrophilic group; $SP_1$ and $SP_2$ may each independently be a single bond, a $C_1$-$C_{12}$ alkylene group, or a $C_1$-$C_{12}$ alkoxylene group; Z may be a single bond, an ester group, or an ether group; and $X_1$, $X_2$, and $X_3$ may each independently be hydrogen, a methyl group, fluorine, or chlorine.

In some embodiments, the forming of the pre-alignment inducing layer and the liquid crystal layer may include: providing a liquid crystal composition (which includes liquid crystals having negative dielectric anisotropy and the second compound) on the base. The content of the second compound may be about 0.05% to about 1.0% by weight based on a total weight of the liquid crystal composition.

In some embodiments, the forming of the pre-alignment inducing layer and the liquid crystal layer may include: providing a liquid crystal composition (which includes liquid crystals and the second compound) on the base, forming the pre-alignment inducing layer through phase-separation of at least a portion of the second compound of the liquid crystal composition and self-alignment of the second compound on the base, and forming the liquid crystal layer, in which the liquid crystals are vertically aligned, on the pre-alignment inducing layer.

In some embodiments, in the providing of the liquid crystal composition on the base, the second compound may be substantially uniformly dispersed in the liquid crystal composition, and the solubility of the second compound in the liquid crystals may be less than about 0.01% by weight.

In some embodiments, in the irradiating of the pre-alignment inducing layer with light having a first peak wavelength, at least a portion of the second compound may be converted into a first compound represented by formula A1 to form an alignment inducing layer, and a pretilt may be formed in the liquid crystals in the liquid crystal layer:

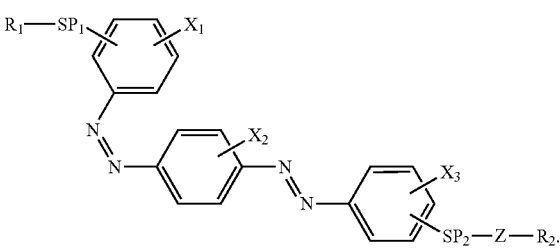

(A1)

In formula A1, $R_1$, $R_2$, $SP_1$, $SP_2$, Z, $X_1$, $X_2$ and $X_3$ may each independently be the same as those defined in formula B1.

In some embodiments, the first peak wavelength may fall within the range of about 450 nm to about 550 nm.

In some embodiments, the method may further include irradiating the alignment inducing layer with light having a second peak wavelength shorter than the first peak wavelength after the irradiating of the pre-alignment inducing layer with the light having the first peak wavelength. The liquid crystal layer may further include a reactive mesogen compound that is dispersed in the liquid crystals in the irradiating of the pre-alignment inducing layer with the light having the first peak wavelength.

In some embodiments, in the irradiating of the light having the second peak wavelength, at least a portion of the first compound, at least a portion of the second compound, and/or at least a portion of the reactive mesogen compound may form a polymer.

In some embodiments, the irradiating of the light having the first peak wavelength may include: irradiating a first oblique light having an inclination to a first region of the pre-alignment inducing layer, and irradiating a second oblique light having an inclination in a direction different from that of the inclination of the first oblique light to a second region of the pre-alignment inducing layer.

In some embodiments, the irradiating of the light having the first peak wavelength may include: irradiating a first polarized light to a first region of the pre-alignment inducing layer, and irradiating a second polarized light having a different polarization direction from the first polarized light to a second region of the pre-alignment inducing layer.

BRIEF DESCRIPTION OF THE DRAWINGS

These and/or other aspects will become apparent and more readily appreciated from the following description of the embodiments, taken in conjunction with the accompanying drawings, in which:

FIGS. 15 through 29 are views illustrating a method of manufacturing an LCD according to an embodiment of the present disclosure;

DETAILED DESCRIPTION

Figure 1:
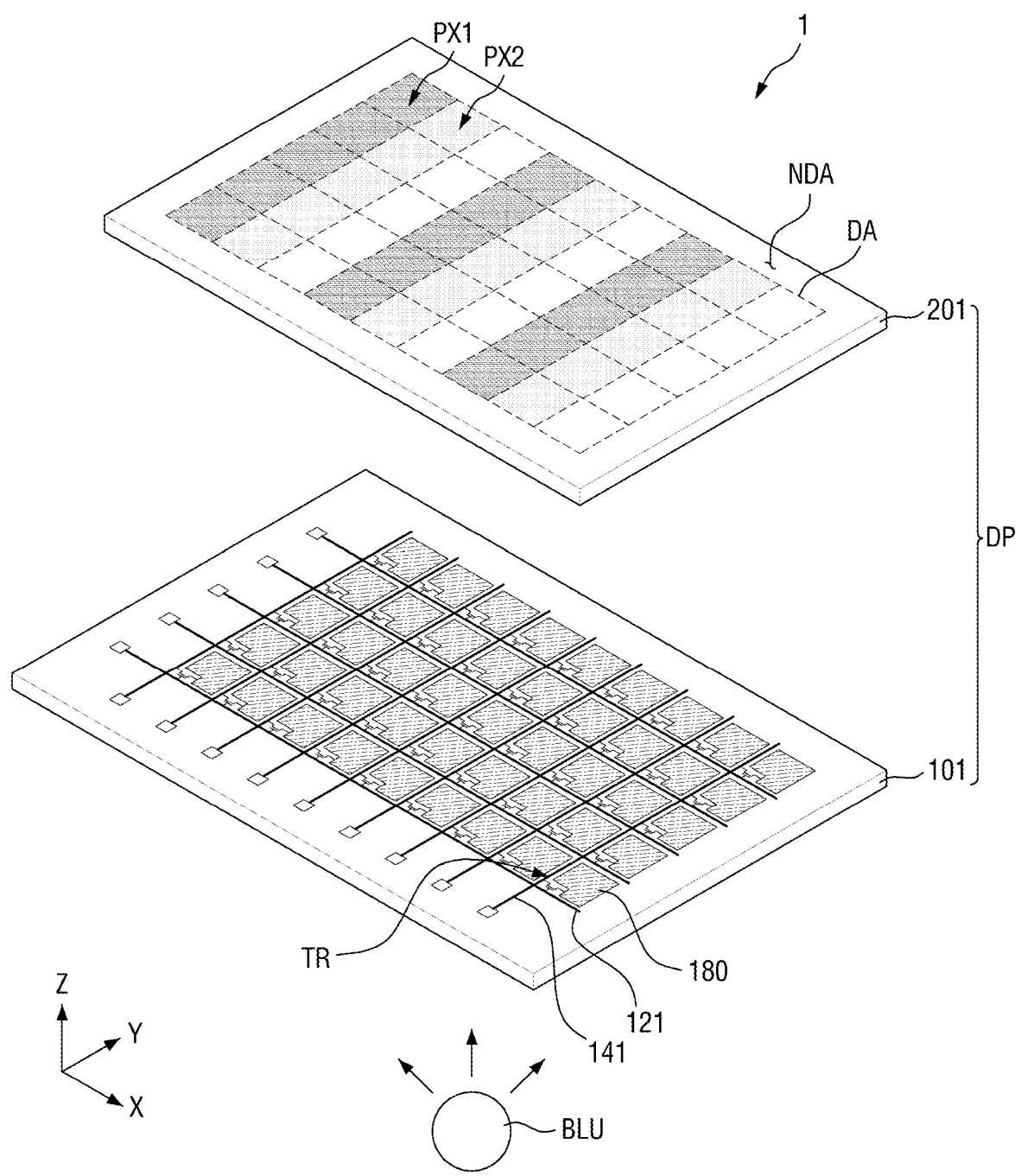
FIG. 1 is an exploded perspective view of a liquid crystal display (LCD) according to an embodiment of the present disclosure.

Features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the present disclosure to those skilled in the art, and the present disclosure will only be defined by the appended claims and equivalents thereof.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout, and duplicative descriptions may not be provided. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "below," "lower," "under," "above," "upper" and the like, may be used herein for ease of description to describe the relationship of one element or feature to another element(s) or feature(s) as illustrated in the drawings. It will be understood that the spatially relative terms are intended to encompass different orientations of the device in use or operation, in addition to the orientation depicted in the drawings. For example, if the device in the drawings is turned over, elements described as "below" or "beneath" relative to other elements or features would then be oriented "above" relative to the other elements or features. Thus, the example term "below" can encompass both an orientation of above and below. Similarly, the example terms "on" and/or "above" can also encompass an orientation of above and below. Furthermore, the device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. "At least one" is not to be construed as limiting "a" or "an." "Or" means "and/or." As used herein, the term "and/or" includes any and all combinations of one or more of the associated listed items.

As used herein, a first direction X denotes any one direction in a plane, a second direction Y denotes a direction intersecting the first direction X in the plane, and a third direction Z denotes a direction perpendicular to the plane. Unless otherwise defined, 'plane' refers to a plane to which the first direction X and the second direction Y belong.

Hereinafter, embodiments of the present disclosure will be described with reference to the accompanying drawings.

FIG. 1 is an exploded perspective view of a liquid crystal display (LCD) 1 according to an embodiment of the present disclosure.

Referring to FIG. 1, the LCD 1 includes an LCD panel DP and a backlight unit BLU.

A display area DA and a non-display area NDA may be defined in the LCD panel DP. The display area DA corresponds to the area of the display panel that contributes to substantial image display, and includes a plurality of pixels PX1 and PX2 through which light is effectively transmitted. As used herein, the terms 'pixel' and/or 'pixels' refer to a discrete region or regions into which the display area DA is divided for color display (as shown in plan view), and one pixel may express a set or predetermined primary color. For example, one pixel may be a minimum unit region that can express a color independently of other pixels.

The pixels PX1 and PX2 may include a first pixel PX1, which displays a first color, and a second pixel PX2, which displays a second color having a longer (e.g., larger) peak wavelength than the first color. In some embodiments, the first pixel PX1 and the second pixel PX2 may form at least part of a repeating unit, and the repeating unit may be repeated along the first direction X. For example, the first pixel PX1, the second pixel PX2, and a third pixel, each displaying a different color and arranged along the first direction X may form one repeating unit, and the repeating unit may be repeatedly arranged along the first direction X. Hereinafter, a case where the first color displayed by the first pixel PX1 is a blue color having a peak wavelength in the range of about 430 nm to about 470 nm and the second color displayed by the second pixel PX2 is a green color having a peak wavelength in the range of about 530 nm to about 570 nm will be described as an example. However, in another embodiment, the second color may be a red color having a peak wavelength in the range of about 610 nm to about 650 nm.

In plan view, the display area DA may be surrounded by the non-display area NDA. Unlike the display area DA, the non-display area NDA may not contribute to image display. Elements necessary for driving the LCD 1 (such as connection pads, driving circuits, and sealing members), may be located in the non-display area NDA.

The backlight unit BLU may be under the LCD panel DP and may emit light having a set or specific wavelength toward the LCD panel DP. In some embodiments, the backlight unit BLU may be an edge-type (e.g., edge-design) backlight assembly including a light source that directly emits light, and a light guide plate that guides light produced by the light source toward the LCD panel DP.

The light source may be a light emitting diode (LED), an organic light emitting diode (OLED), or a laser diode (LD). In an embodiment of the present disclosure, the light source may emit blue light having a single peak wavelength in the range of about 430 nm to about 470 nm. In some embodiments, the light source may emit white light that includes a red wavelength band, a green wavelength band, and a blue wavelength band. In some embodiments, the light source may emit light in an ultraviolet wavelength band.

The material of the light guide plate is not particularly limited as long as it is a material having high light transmittance. For example, the light guide plate may be made of a glass material, a quartz material, and/or a plastic material such as polyethylene terephthalate, polymethyl methacrylate or polycarbonate. In some embodiments, the LCD may be omitted, and the backlight unit BLU may be a direct-type (e.g., direct design) backlight assembly including a direct-type light source.

In some embodiments, one or more optical sheets may be included between the LCD panel DP and the backlight unit BLU. The optical sheets may include one or more of a prism sheet, a diffusion sheet, a (reflective) polarizing sheet, a lenticular lens sheet, and a micro-lens sheet. The optical sheets may improve the display quality of the LCD 1 by modulating the optical characteristics (e.g., condensing, diffusing, scattering, or polarization characteristics) of light travelling toward the LCD panel DP after being emitted from the backlight unit BLU.

The LCD panel DP will now be described in detail by additionally referring to FIGS. 2 through 4.

Figure 2:
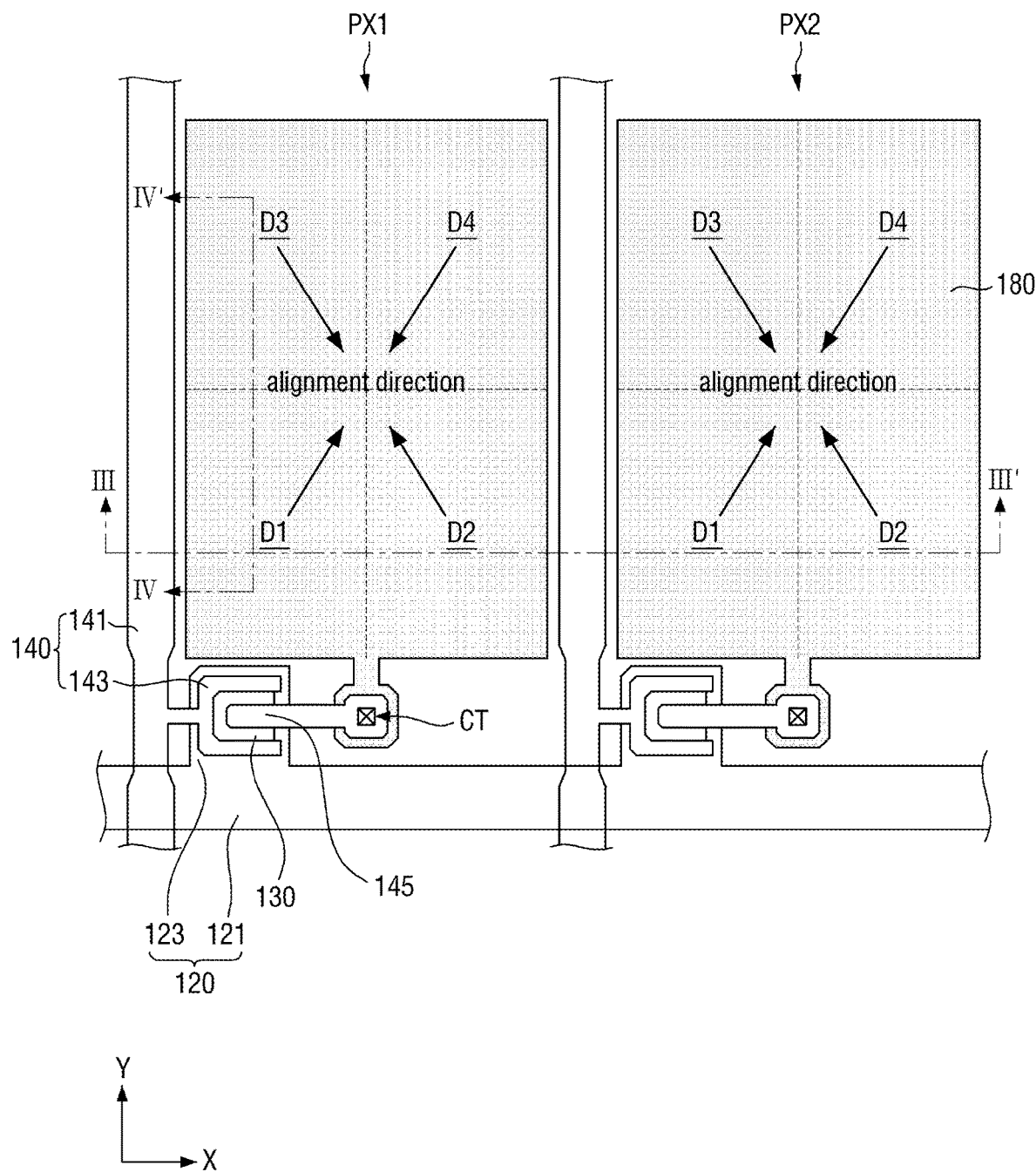
FIG. 2 is a layout view of pixels of the LCD of FIG. 1.

FIG. 2 is a layout view of two pixels of the LCD 1 of FIG. 1, including a gate wiring layer 120, an active layer 130, a data wiring layer 140 and a pixel electrode 180 of each of the first pixel PX1 and the second pixel PX2. FIG. 3 is a cross-sectional view taken along the line of FIG. 2. FIG. 4 is a cross-sectional view taken along the line IV-IV' of FIG. 2.

Referring to FIGS. 1 through 4, the LCD panel DP may include a lower substrate 101, an upper substrate 201 facing the lower substrate 101, and a liquid crystal layer 301 interposed between the lower substrate 101 and the upper substrate 201. The liquid crystal layer 301 may be sealed between the lower substrate 101 and the upper substrate 201 by a sealing member in the non-display area NDA that bonds the lower substrate 101 and the upper substrate 201 together.

First, the lower substrate 101 will be described. The lower substrate 101 may include a lower base 110, a switching element TR, and a pixel electrode 180. The lower substrate 101 may further include a lower alignment inducing layer 191.

The lower base 110 may be a transparent insulating substrate or a transparent insulating film. For example, the lower base 110 may include a glass material, a quartz material, or a translucent plastic material. In some embodiments, the lower base 110 may be flexible, and the LCD 1 may be a curved LCD. The backlight unit BLU described above may be positioned on a back surface (e.g., the lower surface in FIG. 3) of the lower base 110.

The gate wiring layer 120 may be positioned on a front surface (e.g., an upper surface in FIG. 3) of the lower base 110. The gate wiring layer 120 may include a gate wiring 121 and a gate electrode 123. The gate wiring 121 and the gate electrode 123 may be on the same layer. For example, the gate wiring 121 and the gate electrode 123 may be made of the same material and may be simultaneously (e.g., concurrently) formed by a single process.

The gate wiring 121 may extend along substantially the first direction X. The gate wiring 121 may transmit a gate driving signal received from a gate driver to the switching element TR (described below) in each of the pixels PX1 and PX2. For example, a plurality of pixels arranged along the first direction X may share one gate wiring 121.

The gate electrode 123 may be electrically connected to the gate wiring 121. For example, the gate electrode 123 may protrude from the gate wiring 121 without a physical boundary. The gate electrode 123 may form a control terminal of the switching element TR. In some embodiments, the gate wiring layer 120 may include the gate wiring 121 but may not include the protruding gate electrode 123, and a portion of the gate wiring 121 may form the control terminal of the switching element TR.

The active layer 130 may be on the gate wiring layer 120. The active layer 130 may include a semiconductor material. For example, the active layer 130 may include amorphous silicon, polycrystalline silicon, monocrystalline silicon, and/or an oxide semiconductor. A portion of the active layer 130 may form a channel of the switching element TR. The active layer 130 may turn on or off the channel according to a signal transmitted to the gate electrode 123.

A gate insulating layer may be further positioned between the gate wiring layer 120 and the active layer 130. The gate insulating layer may include an insulating material to insulate elements on the gate insulating layer from elements under the gate insulating layer. In some embodiments, for example, the gate insulating layer may include silicon nitride, silicon oxide, silicon oxynitride, zirconium oxide, and/or hafnium oxide.

The data wiring layer 140 may be on the active layer 130. The data wiring layer 140 may include a data wiring 141, a drain electrode 143, and a source electrode 145. The data wiring 141, the drain electrode 143, and the source electrode 145 may be positioned on the same layer.

The data wiring 141 may extend along substantially the second direction Y. The data wiring 141 may transmit a data driving signal received from a data driver to the switching element TR in each of the pixels PX1 and PX2. For example, a plurality of pixels arranged along the second direction Y may share one data wiring 141.

The drain electrode 143 may be electrically connected to the data wiring 141. For example, the drain electrode 143 may protrude from the data wiring 141 without a physical boundary. The drain electrode 143 may form an input terminal of the switching element TR. In some embodiments, the data wiring layer 140 may include the data wiring 141 but may not include the protruding drain electrode 143, and a portion of the data wiring 141 may form the input terminal of the switching element TR.

The source electrode 145 may be positioned on the active layer 130 to be spaced apart from the drain electrode 143. The source electrode 145 may form an output terminal of the switching element TR. The source electrode 145 may be electrically connected to the pixel electrode 180, which will be described later, by a contact hole CT.

In some embodiments, the gate electrode 123, the active layer 130, the drain electrode 143 and the source electrode 145 described above may form the switching element TR. The switching element TR may be positioned in each of the pixels PX1 and PX2 and may transmit a driving signal to the pixel electrode 180 or may block the driving signal.

An intermediate insulating layer 150 may be positioned on or above the switching element TR. The intermediate insulating layer 150 may be positioned without distinguishing between the pixels PX1 and PX2 to insulate elements on the intermediate insulating layer 150 from elements under the intermediate insulating layer 150. In addition, the intermediate insulating layer 150 may reduce or cover any steps formed by the switching element TR, the gate wiring 121, the data wiring 141, and other elements on the lower base 110. For example, the intermediate insulating layer 150 may be a step difference compensating layer or a planarizing layer. In some embodiments, the intermediate insulating layer 150 may include one or more layers. For example, the intermediate insulating layer 150 may include an organic layer made of an organic material, include an inorganic layer made of an inorganic material, or have a stacked structure of one or more organic layers and one or more inorganic layers.

The contact hole CT may be formed in the intermediate insulating layer 150 to partially expose the source electrode 145. A portion of the pixel electrode 180 may be inserted into the contact hole CT and electrically connected to the output terminal (e.g., the source electrode 145) of the switching element TR.

The pixel electrode 180 may be on the intermediate insulating layer 150. The pixel electrode 180 may be a field generating electrode that forms an electric field in the liquid crystal layer 301 together with a common electrode 280 (which will be described later). Each pixel electrode 180 in each of pixels PX1 and PX2 may be controlled independently, and a different driving signal may be transmitted to each pixel electrode 180. For example, the pixel electrode 180 may be electrically connected to the output terminal of the switching element TR via the contact hole CT formed in the intermediate insulating layer 150. The electric field formed by the pixel electrode 180 and the common electrode 280 can control the behavior of and rearrange the liquid crystals LC within the corresponding pixel. The pixel electrode 180 may be made of a transparent conductive material. Non-limiting examples of the transparent conductive material may include indium tin oxide (ITO), indium zinc oxide (IZO), zinc oxide (ZnO), indium (III) oxide ($In_2O_3$), indium gallium oxide (IGO), and aluminum zinc oxide (AZO).

In some embodiments, the pixel electrode 180 may not include domain division portions. For example, the pixel electrode 180 may be a slitless electrode without fine slits extending in different directions in a plane. When the pixel electrode 180 is formed as a slitless electrode, it may be possible to prevent or reduce image texture defects and luminance reduction in the LCD 1 caused by fine slits.

The lower alignment inducing layer 191 may be on the pixel electrode 180. The lower alignment inducing layer 191 can induce the initial alignment of adjacent liquid crystals LC in the liquid crystal layer 301 and can induce pretilt of the liquid crystals LC. As used herein, the term 'initial alignment of liquid crystals' refers to the alignment of liquid crystals in a state where no electric field has been formed in a liquid crystal layer (e.g., in the absence of an electric field). The lower alignment inducing layer 191 may be in contact with the pixel electrode 180 and the liquid crystal layer 301. In some embodiments, the lower alignment inducing layer 191 may not include an imide-based polymer. The lower alignment inducing layer 191 will be described in detail later, together with an upper alignment inducing layer 291.

Next, the liquid crystal layer 301 will be described. The liquid crystal layer 301 may be between the lower substrate 101 and the upper substrate 201. The liquid crystal layer 301 may include a plurality of initially aligned liquid crystals LC. As used herein, the term 'liquid crystal' refers to a single molecule or a collection of single molecules having liquid crystal properties.

The liquid crystals LC may have negative dielectric anisotropy, and their long axes may be aligned substantially perpendicularly to a diagonal plane in an initial alignment state. In some embodiments, in the initial alignment state, the liquid crystals LC may be vertically aligned with a pretilt. For example, an angle formed by the long axes of the liquid crystals LC and a horizontal plane may be about 80 degrees or more, about 85 degrees or more, about 86 degrees or more, about 87 degrees or more, or about 88 degrees or more. The pretilt angle may be complementary to the above described angle. As used herein, the term 'pretilt angle' refers to an angle of a long axis of a liquid crystal with respect to a normal to the horizontal plane (e.g., the vertical plane). For example, when the liquid crystals LC are perfectly vertically aligned, the pretilt angle of the liquid crystals LC is 0 degrees.

Each of the first pixel PX1 and the second pixel PX2 of the LCD 1 may have a plurality of domains D1 through D4 in which the initial alignment directions or the initial alignment states of the liquid crystals LC are different from each other. For example, the liquid crystals LC in each pixel PX1 or PX2 may be initially aligned with a pretilt toward the center of the pixel PX1 or PX2. For example, the liquid crystals LC in each pixel PX1 or PX2 may be aligned such that the ends of the long axes of the liquid crystals LC that are nearer to the upper substrate 201 are tilted or inclined toward the center of the pixel PX1 or PX2, compared with the respective opposite ends of the long axes of the liquid crystals LC that are nearer to the lower substrate 101. Since the liquid crystals LC are pretilted, the pretilted liquid crystals LC can be tilted further in the pretilt direction when an electric field is formed in (e.g., applied to) the liquid crystal layer 301.

In some embodiments, liquid crystals 311 in a first domain D1 of the first pixel PX1 may be initially aligned with a pretilt in an upper right direction (i.e., toward the center of the first pixel PX1), and liquid crystals 331 in a second domain D2 of the first pixel PX1 may be initially aligned with a pretilt in an upper left direction (i.e., toward the center of the first pixel PX1). In addition, liquid crystals 351 in a third domain D3 of the first pixel PX1 may be initially aligned with a pretilt in a lower right direction (i.e., toward the center of the first pixel PX1), and liquid crystals in a fourth domain D4 of the first pixel PX1 may be initially aligned with a pretilt in a lower left direction (i.e., toward the center of the first pixel PX1).

The domains D1 through D4 are not be formed using domain division portions of the pixel electrode 180 or the common electrode 280, and may instead be formed by the lower alignment inducing layer 191 and the upper alignment inducing layer 291, which will be described later. However, embodiments of the present disclosure are not limited thereto. In some embodiments, the pretilt direction of each of the domains D1 through D4 may be induced by the lower alignment inducing layer 191 and the upper alignment inducing layer 291, and the pixel electrode 180 or the common electrode 280 may have domain division portions.

When a plurality of domains D1 through D4 having different pretilt directions of the liquid crystals LC are formed in one pixel, the direction in which the liquid crystals LC are rearranged when an electric field is formed in the liquid crystal layer 301 can be diversified, and the viewing angle characteristics of the LCD 1 may be improved.

Next, the upper substrate 201 will be described. The upper substrate 201 may include an upper base 210 and the common electrode 280, and may further include the upper alignment inducing layer 291.

The upper base 210 may be a transparent substrate or a transparent film. For example, like the lower base 110, the upper base 210 may include a glass material, a quartz material, and/or a transparent plastic material. In some embodiments, the upper base 210 may be flexible.

A light shielding pattern 215 may be positioned on a back surface (e.g., a lower surface in FIG. 3) of the upper base 210. The light shielding pattern 215 may block or reduce the transmission of light by absorbing or reflecting at least part of the light. For example, the light shielding pattern 215 may include a light shielding colorant such as a black pigment or a black dye, or may include an opaque metallic material. The light shielding pattern 215 may be positioned at planar boundaries between adjacent pixels PX1 and PX2 to prevent or reduce color mixing between neighboring pixels. In a non-limiting example, the light shielding pattern 215 may be in a lattice shape having openings corresponding to the pixels PX1 and PX2, respectively.

A color conversion pattern 232 may be positioned on the light shielding pattern 215. The color conversion pattern 232 may be positioned in the second pixel PX2. The color conversion pattern 232 may convert incident light into transmitted light having a different color. For example, incident light may be converted into light of a set or predetermined wavelength band as it passes through the color conversion pattern 232, thereby allowing a pixel to display a specific color. In some embodiments, the color conversion pattern 232 may include a first base resin 232a and a wavelength shifter 232b dispersed within the first base resin 232a, and may further include a first scatterer 232c dispersed in the first base resin 232a.

The first base resin 232a may form the shape of the color conversion pattern 232. The first base resin 232a is not particularly limited as long as it is a material having high light transmittance and ability to disperse the wavelength shifter 232b and the first scatterer 232c. For example, the first base resin 232a may be made of an organic material such as an epoxy resin, an acrylic resin, a cardo resin, and/or an imide resin.

The wavelength shifter 232b may convert or shift the peak wavelength of incident light to another set or specific peak wavelength. The wavelength shifter 232b may be in the form of particles. Non-limiting examples of the wavelength shifter 232b may include a quantum dot, a quantum rod, and/or a phosphor. For example, the quantum dot may emit light of a set or specific color when an electron transitions from a conduction band to a valence band. In some embodiments, the quantum dot material may have a core-shell structure. The core may be a semiconductor nanocrystalline material. Non-limiting examples of the core of the quantum dot may include, but are not limited to, silicon (Si) nanocrystals, group II-VI compound nanocrystals, and group III-V compound nanocrystals. In some embodiments, the wavelength shifter 232b may include a core made of cadmium selenide (CdSe), cadmium telluride (CdTe), cadmium sulfide (CdS), or indium phosphide (InP), and an outer shell made of zinc sulfide (ZnS).

In some embodiments, the wavelength shifter 232b of the second color conversion pattern 232 in the second pixel PX2, e.g., a green pixel, may absorb at least a portion of blue light received from the backlight unit BLU, and may then emit green light having a peak wavelength in the range of about 530 nm to about 570 nm. Therefore, light that passes through the color conversion pattern 232 may be green, and the green light may be displayed in the second pixel PX2. Similarly, a wavelength shifter of a color conversion pattern in the third pixel (e.g., a red pixel) may absorb at least a portion of the blue light received from the backlight unit BLU, and may then emit red light having a peak wavelength in the range of about 610 nm to about 650 nm. The red light may be displayed in the third pixel (the red pixel). The light emitted from the wavelength shifter 232b may radiate in one or more directions regardless of its incident angle and may contribute to the improvement of lateral visibility of the green color and/or the red color displayed by the LCD 1.

The first scatterer 232c may have a refractive index different from that of the first base resin 232a, and may form an optical interface with the first base resin 232a. For example, the first scatterer 232c may be light scattering particles. The first scatterer 232c is not particularly limited as long as it is a material that can modulate the path of transmitted light by scattering at least a portion of the transmitted light. For example, the first scatterer 232c may include metal oxide particles and/or organic particles. Non-limiting examples of the metal oxide may include titanium oxide ($TiO_2$), zirconium oxide ($ZrO_2$), aluminum oxide ($Al_2O_3$), indium oxide ($In_2O_3$), zinc oxide (ZnO), and tin oxide ($SnO_2$). Non-limiting examples of the organic material may include acrylic resin and urethane resin. The first scatterer 232c within the color conversion pattern 232 may scatter light in one or more directions regardless of the incident angle without substantially changing the wavelength of the light transmitted through the color conversion pattern 232. Accordingly, this may increase the path length of the light transmitted through the color conversion pattern 232 and increase the color conversion efficiency of the wavelength shifter 232b.

In some embodiments, a first wavelength band filter 221 may be positioned between the light shielding pattern 215 and the color conversion pattern 232. The first wavelength band filter 221 may overlap the color conversion pattern 232 in the third direction Z. The first wavelength band filter 221 is a wavelength-selective optical filter that transmits light of only some wavelength bands by blocking light of a specific or selected wavelength band. For example, the first wavelength band filter 221 may block light in the blue wavelength band by absorbing the light in the blue wavelength band, and may only transmit light having a longer peak wavelength than blue, e.g., light having a green peak wavelength and/or light having a red peak wavelength. The color filter may include a base resin and a colorant (such as a pigment and/or dye) dissolved or dispersed in the base resin. When blue light provided from the backlight unit BLU is incident on the color conversion pattern 232 of the second pixel PX2, blue light that is transmitted through the color conversion pattern 232 without being absorbed and color-converted by the wavelength shifter 232b may be blocked by the first wavelength band filter 221. Therefore, the spectrum of green light displayed in the second pixel PX2 can be made sharper, and color purity and display quality may be improved.

In another embodiment, the first wavelength band filter 221 may be a distributed Bragg reflector that reflects light in the blue wavelength band to block the transmission of the light in the blue wavelength band, and transmits only light in the green wavelength band and/or light in the red wavelength band.

In some embodiments, a scattering pattern 231 may be on the light shielding pattern 215 in the first pixel PX1. The scattering pattern 231 may scatter at least a portion of transmitted light without substantially changing the color of the transmitted light. For example, the color (e.g., blue) of light provided from the backlight unit BLU may be maintained even after the light passes through the scattering pattern 231. Therefore, the first pixel PX1 may display blue light. In some embodiments, the scattering pattern 231 may include a second base resin 231a and a second scatterer 231c dispersed within the second base resin 231a.

Like the first base resin 232a, the second base resin 231a is not particularly limited as long as it is a material having high light transmittance and excellent dispersion properties. For example, the second base resin 231a may be made of an organic material such as an epoxy resin, an acrylic resin, a cardo resin, and/or an imide resin. In addition, like the first scatterer 232c, the second scatterer 231c is not particularly limited as long as it is a material that can modulate the path of transmitted light by scattering at least a portion of the transmitted light. For example, the second scatterer 231c may include metal oxide particles and/or organic particles. The scattering pattern 231 of the first pixel PX1 can scatter at least a portion of blue light received from the backlight unit BLU in one or more directions, and may contribute to the improvement of lateral visibility of the blue color displayed by the LCD 1.

In some embodiments, the scattering pattern 231 of the first pixel PX1 and the color conversion pattern 232 of the second pixel PX2 may be spaced apart from each other on a portion of the light shielding pattern 215. For example, sides of the scattering pattern 231 may be spaced apart from sides of the color conversion pattern 232. Since the color conversion pattern 232 and the scattering pattern 231 are physically spaced apart from each other, it may be possible to prevent or reduce light emitted from the wavelength shifter 232b in the color conversion pattern 232 from travelling toward the scattering pattern 231 and causing green to be displayed in the first pixel PX1, and/or to prevent or reduce blue light scattered by the second scatterer 231c in the scattering pattern 231 from travelling toward the color conversion pattern 232 and being unintentionally color-converted by the wavelength shifter 232b.

A second wavelength band filter 223 may be on the color conversion pattern 232 and the scattering pattern 231. The second wavelength band filter 223 may be positioned in both (e.g., simultaneously) the first pixel PX1 and the second pixel PX2. The second wavelength band filter 223 is a wavelength-selective optical filter that transmits light of only some wavelength bands by blocking light of a specific or selected wavelength band. For example, the second wavelength band filter 223 may be a distributed Bragg reflector that reflects light in the green wavelength band and light in the red wavelength band to block the transmission of the light in the green wavelength band and the transmission of the light in the red wavelength band and transmits only light having a shorter peak wavelength than green and red, for example, light in the blue wavelength band including the blue peak wavelength. In some embodiments, the distributed Bragg reflector may include a plurality of layers stacked on each other. For example, the distributed Bragg reflector may include a low refractive layer and a high refractive layer having a relatively higher refractive index than the low refractive layer, and the low refractive layer and the high refractive layer may be alternatingly stacked. The transmission wavelength band and the reflection wavelength band of the second wavelength band filter 223 may be controlled or selected by varying the difference between the refractive indices of the low refractive layer and the high refractive layer, the difference between the thicknesses of the low refractive layer and the high refractive layer, and/or the number of repeating units formed by the low refractive layer and the high refractive layer.

Regarding the green light emitted in one or more directions from the wavelength shifter 232b in the second pixel PX2 displaying green and/or the red light emitted in one or more directions from the wavelength shifter in the third pixel displaying red, light emitted toward the second wavelength band filter 223 (e.g., toward the lower side in FIG. 3) may be reflected by the second wavelength band filter 223 toward the upper base 210 (e.g., toward an upper side in FIG. 3) and toward the viewer so that the reflected light can contribute to the color display output. This can increase light utilization efficiency and improve the display quality (e.g., luminance and color purity) of the LCD 1.

An overcoat layer 250 may be on the second wavelength band filter 223. The overcoat layer 250 may be positioned without distinguishing between the pixels PX1 and PX2. The overcoat layer 250 may reduce or cover any step or steps formed by the color conversion pattern 232, the scattering pattern 231, and other elements on the upper base 210. For example, the overcoat layer 250 may be a step difference compensating layer or a planarizing layer. The overcoat layer 250 is not particularly limited as long as it is made of a material having excellent planarization properties and light transmittance. For example, the overcoat layer 250 may include an epoxy resin, an acrylic resin, an imide resin, a cardo resin, a siloxane resin and/or a silsesquioxane resin.

In some embodiments, a first protective layer 261 may be on the overcoat layer 250. The first protective layer 261 may include a non-metallic inorganic material. Non-limiting examples of the inorganic material that may form the first protective layer 261 include silicon oxide, silicon nitride, silicon oxynitride, and silicon nitride oxide. The first protective layer 261 may protect the overcoat layer 250 from being damaged during the process of forming wire grid patterns 270, which will be described later. Although embodiments of the present disclosure are not limited to the following case, when the wire grid patterns 270 are formed by a dry etching process, the first protective layer 261 may serve as an etch stopper to prevent or reduce the overcoat layer 250 from being unintentionally etched. In addition, the first protective layer 261 can improve the adhesion of the wire grid patterns 270 to the overcoat layer 250 made of an organic material, and may thus prevent or reduce damage or corrosion of the wire grid patterns 270 due to penetration of air or moisture, thereby improving the durability and reliability of the LCD 1. In some embodiments, the first protective layer 261 may be omitted, and the wire grid patterns 270 may be directly on the overcoat layer 250.

The wire grid patterns 270 may be on the first protective layer 261. The wire grid patterns 270 may be a polarizer performing an optical shutter function together with the liquid crystal layer 301. For example, the wire grid patterns 270 may function as an upper polarizer. In some embodiments, the wire grid patterns 270 may have reflective polarizing properties, and for example, may reflect a polarization component oscillating in a direction substantially parallel to a direction in which the wire grid patterns 270 extend, and may transmit a polarization component oscillating in a direction substantially parallel to a direction in which the wire grid patterns 270 are spaced apart from each other. For example, the wire grid patterns 270 may polarize transmitted light by reflecting at least a portion of incident light. In FIGS. 3 and 4, the wire grid patterns 270 extend in the second direction Y and are spaced apart from each other in the first direction X. However, embodiments of the present disclosure are not limited to this case.

The wire grid patterns 270 may include a reflective metallic material. Non-limiting examples of the metallic material may include aluminum (Al), silver (Ag), gold (Au), copper (Cu), titanium (Ti), molybdenum (Mo), nickel (Ni), and alloys of these materials. In some embodiments, the wire grid patterns 270 may have a stacked structure of a metallic material and a non-metallic inorganic material.

A second protective layer 263 may be on the wire grid patterns 270. The second protective layer 263 may be positioned directly on the wire grid patterns 270 to cover and protect the wire grid patterns 270 and to insulate the common electrode 280 from the wire grid patterns 270. In addition, the second protective layer 263 may define a void V between adjacent wire grid patterns 270. In some embodiments, the second protective layer 263 may have a stacked structure. For example, the second protective layer 263 may have a stacked structure including an organic layer containing an organic material and an inorganic layer containing an inorganic material. The material of the second protective layer 263 is not particularly limited, but may include an inorganic material such as silicon nitride and/or silicon oxide, and/or an inorganic material such as an epoxy resin, an acrylic resin, an imide resin, a cardo resin, a siloxane resin and/or a silsesquioxane resin.

The common electrode 280 may be on the second protective layer 263. The common electrode 280 may be a field generating electrode that forms an electric field in the liquid crystal layer 301 together with the pixel electrode 180. The common electrode 280 may be positioned over the pixels PX1 and PX2 without distinguishing between the pixels PX1 and PX2, and a common voltage may be applied to the common electrode 280. Like the pixel electrode 180, the common electrode 280 may include a transparent conductive material.

In some embodiments, the common electrode 280 may not include domain division portions. For example, the common electrode 280 may be a slitless electrode without fine slits or openings extending in different directions in a plane. When the common electrode 280 is formed as a slitless electrode, it may be possible to prevent or reduce image texture defects and luminance reduction in the LCD 1 caused by fine slits.

The upper alignment inducing layer 291 may be on the common electrode 280. The upper alignment inducing layer 291 may induce the initial alignment of adjacent liquid crystals LC in the liquid crystal layer 301 and may induce the pretilt of the liquid crystals LC. In some embodiments, the upper alignment inducing layer 291 may not include an imide-based polymer.

The lower alignment inducing layer 191 and the upper alignment inducing layer 291 of the LCD 1 according to the current embodiment will now be described in more detail by additionally referring to FIGS. 5 and 6.

Figure 3:
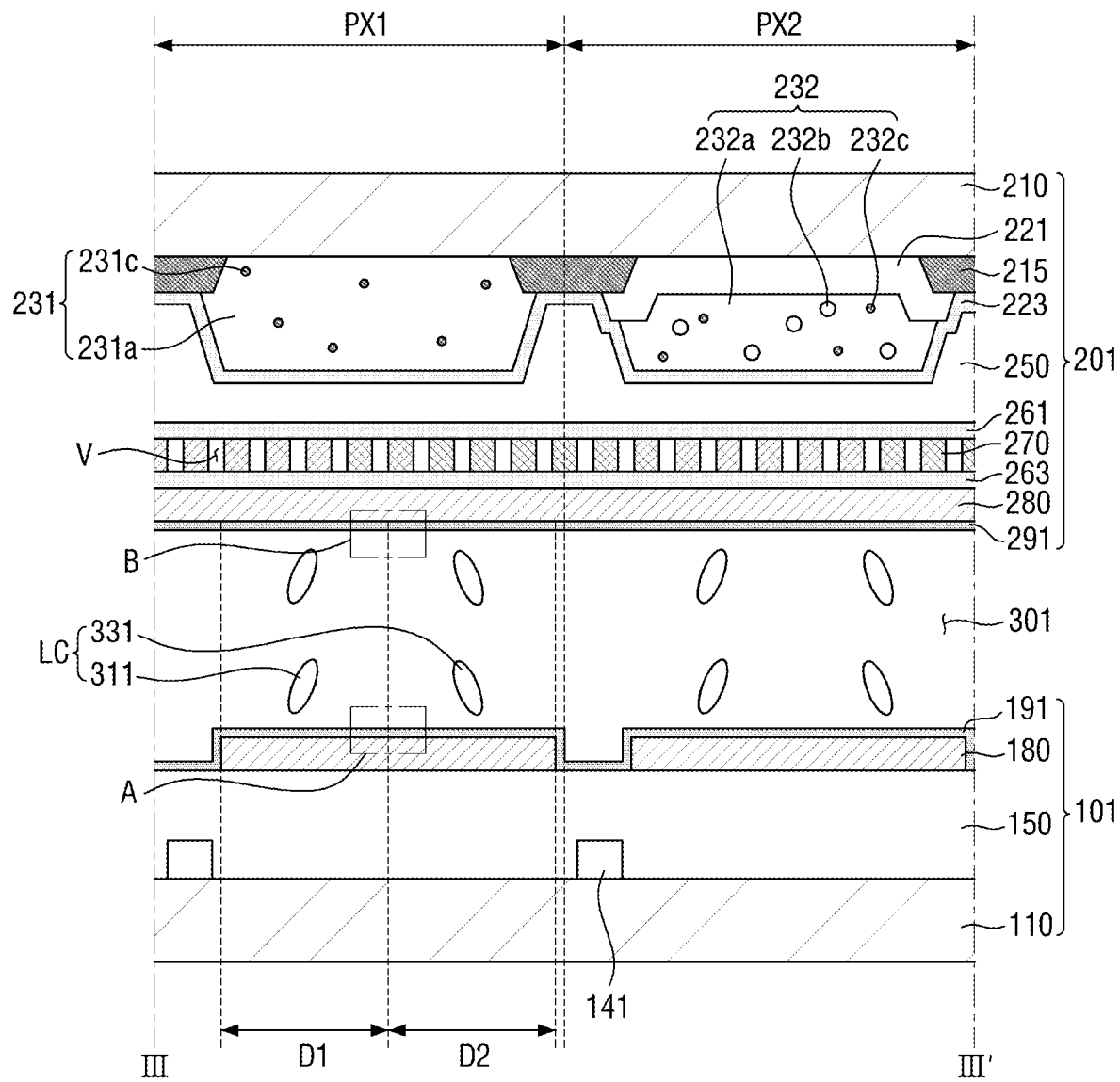
FIG. 3 is a cross-sectional view taken along the line III-III' of FIG. 2.
Figure 4:
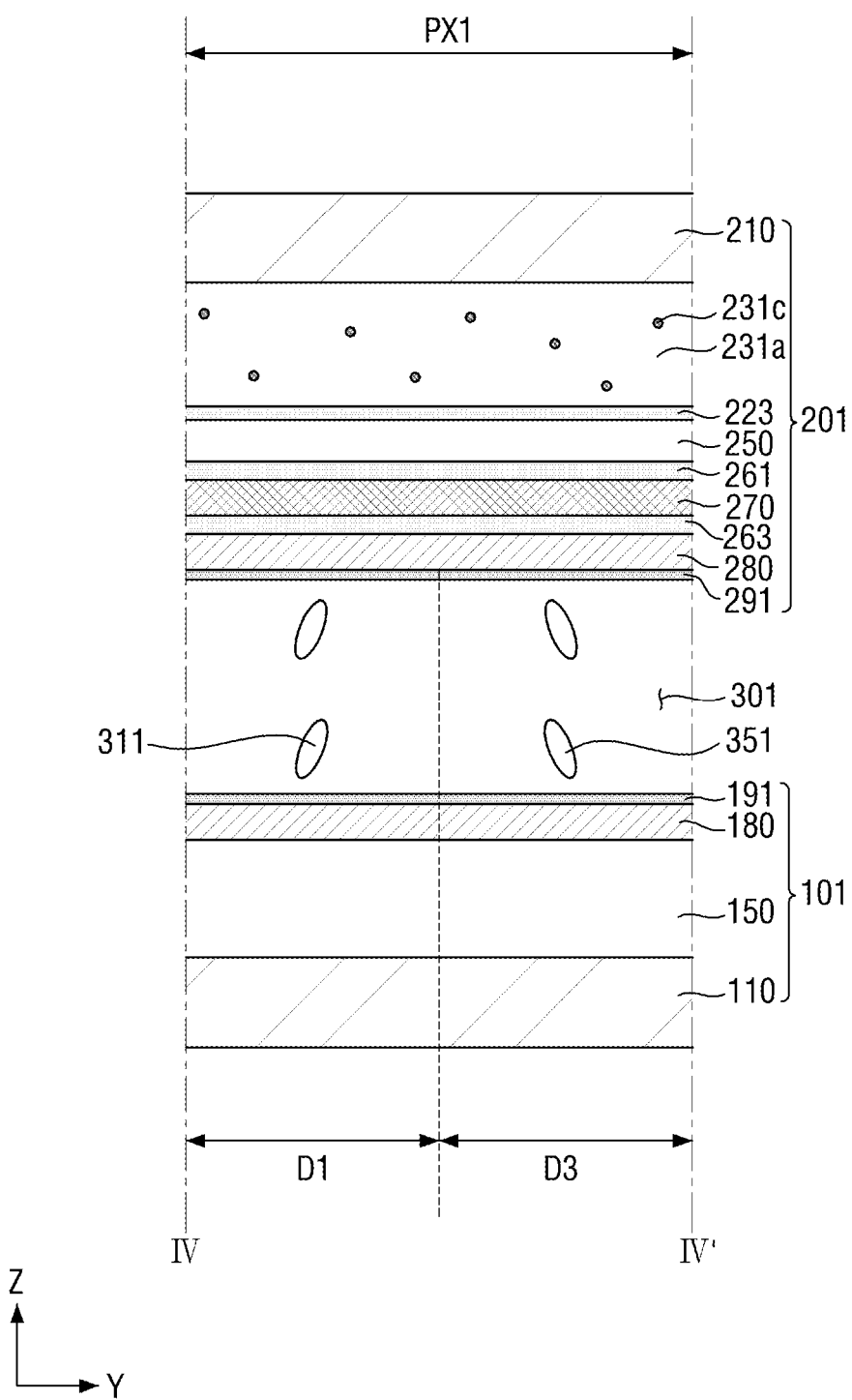
FIG. 4 is a cross-sectional view taken along the line IV-IV' of FIG. 2.
Figure 5:
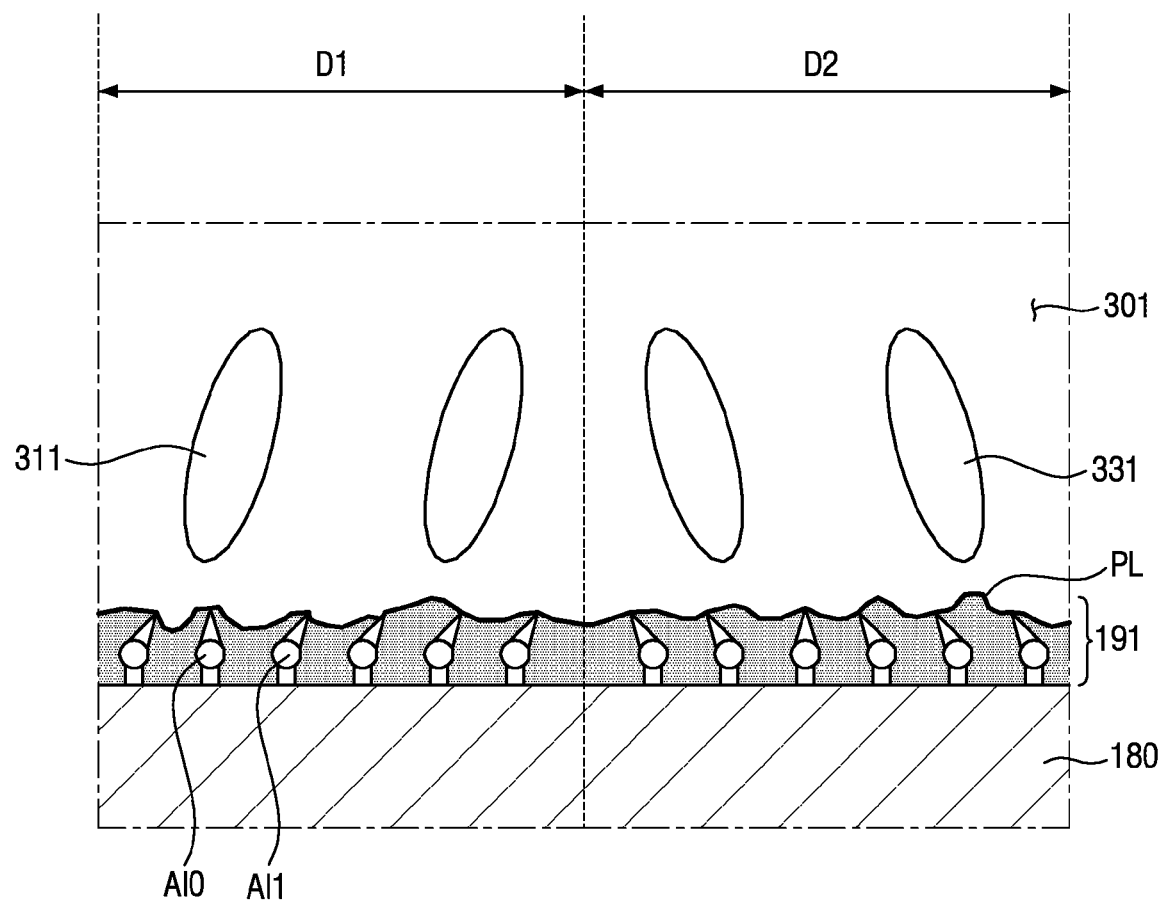
FIG. 5 is a schematic enlarged view of area A in FIG. 3.

FIG. 5 is a schematic enlarged view of area A in FIG. 3 including the lower alignment inducing layer 191. FIG. 6 is a schematic enlarged view of area B in FIG. 3 including the upper alignment inducing layer 291.

Referring to FIGS. 1 through 6, each of the lower alignment inducing layer 191 and the upper alignment inducing layer 291 according to the current embodiment may include a first compound AI1 represented by formula A1, and/or a polymer PL of the first compound AI1. For example, the first compound AI1 may be self-aligned in the lower alignment inducing layer 191 and/or the upper alignment inducing layer 291 to form a monomolecular layer or a polymerized monomolecular layer:

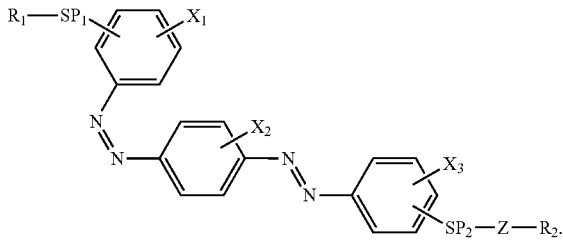

(A1)

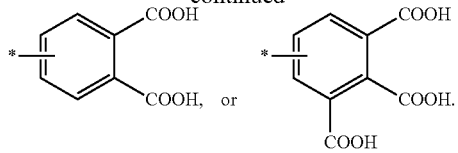

In formula A1, $R_1$ may be hydrogen or a polymerizable group, and $R_2$ may be a hydrophilic group. In addition, $SP_1$ and $SP_2$ may each independently be a single bond, a $C_1$-$C_{12}$ alkylene group (*—$(CH_2)_n$—*), or a $C_1$-$C_{12}$ alkoxylene group (*—O—$(CH_2)_n$—* or *—$(CH_2)_n$—O—*), and Z may be a single bond, an ester group, or an ether group. In addition, $X_1$, $X_2$ and $X_3$ may each independently be hydrogen, a methyl group, fluorine, or chlorine.

The first compound AI1 having the structure represented by formula A1 may be in a cis isomer state (e.g., may have cis-isomer stereochemistry), in which the two benzene rings closest to the $R_1$ group are located on the same side of an azo group double bond, and the molecule includes two azo groups. When the first compound AI1 has two azo groups, one having cis-isomer stereochemistry, a pretilt can be given to the liquid crystals LC by the first compound AI1. For example, the first compound AI1 may be an alignment inducing agent that induces the vertical alignment and pretilt of the liquid crystals LC. When the alignment inducing agent that forms a monomolecular layer has only one azo group, the liquid crystals LC may be (but are not necessarily) horizontally aligned.

The hydrophilic group (*—$R_2$) of the first compound AI1 represented by formula A1 may be a polar group or an anchor group having a chemical structure capable of hydrogen bonding. The hydrophilic group may give self-alignment properties to the first compound AI1. For example, the hydrophilic group may cause the first compound AI1 to be self-aligned when the hydrophilic group forms at least one hydrogen bond to a hydrophilic surface.

The hydrophilic group is not limited to a particular type or kind of group as long as it is capable of hydrogen bonding. In some embodiments, the hydrophilic group may be a monovalent group including a hydroxyl group or a carboxyl group. In some embodiments, for example, $R_2$ may be any one of

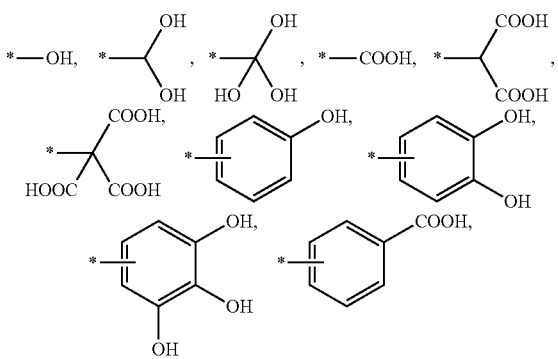

-continued

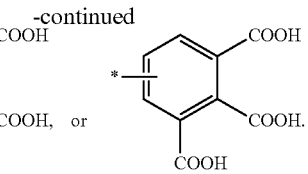

In some embodiments, the hydrophilic group of the first compound AI1 may be a monovalent group including two or more hydroxyl groups or two or more carboxyl groups. When the first compound AI1 represented by formula A1 has two or more hydroxyl groups or two or more carboxyl groups, the first compound AI1 may easily form a self-aligned monomolecular layer.

For example, the hydrophilic group of the first compound AI1 having the structure represented by formula A1 and/or the hydrophilic group of the polymer PL of the first compound AI1 in the lower alignment inducing layer 191 may be aligned toward the pixel electrode 180, and may maintain a stable state. The hydrophilic group may form a hydrogen bond with a functional group (e.g., a hydroxyl group) exposed on the surface of the pixel electrode 180. Similarly, the hydrophilic group of the first compound AI1 and/or the hydrophilic group of the polymer PL of the first compound AI1 in the upper alignment inducing layer 291 may be aligned toward the common electrode 280, and may maintain a stable state.

In addition, $R_1$ of the first compound AI1 in the lower alignment inducing layer 191 and/or the upper alignment inducing layer 291 may be aligned toward the liquid crystal layer 301, and may thereby contribute to the vertical alignment and the formation of the pretilt direction of the liquid crystals LC in the liquid crystal layer 301.

In some embodiments, for example, the planar direction of *—$SP_1$—$R_1$ of the aligned first compound AI1 of the lower alignment inducing layer 191 located in the first domain D1 of the first pixel PX1 may be different from the planar direction of *—$SP_1$—$R_1$ of the aligned first compound AI1 of the lower alignment inducing layer 191 located in the second domain D2 of the same first pixel PX1. As used herein, the term 'planar direction' may refer to the orientation of the group in space, for example with respect to the plane of the layer including the group.

In some embodiments, the planar direction of *—$SP_1$—$R_1$ of the aligned first compound AI1 of the lower alignment inducing layer 191 located in the first domain D1 of the first pixel PX1 may be different from the planar direction of *—$SP_1$—$R_1$ of the aligned first compound AI1 of the upper alignment inducing layer 291 located in the first domain D1 of the same first pixel PX1.

In some embodiments, $R_1$ of the first compound AI1 in the lower alignment inducing layer 191 in each of the domains D1 through D4 may be aligned (e.g., tilted) toward the center of a pixel (e.g., PX1 or PX2) in plan view, and $R_1$ of the first compound AI1 in the upper alignment inducing layer 291 in each of the domains D1 through D4 may be aligned (e.g., tilted) toward the periphery of the pixel (e.g., the same PX1 or PX2) in plan view. When the direction of $R_1$ of the first compound AI1 is different in different parts of each of the lower alignment inducing layer 191 and the upper alignment inducing layer 291, a plurality of domains D1 through D4 having different pretilt directions of the liquid crystals LC can be formed.

In some embodiments, when $R_1$ of the first compound AI1 represented by formula A1 is a polymerizable group, the polymerizable group may give polymerization properties to the first compound AI1 under set or specific conditions. For example, the polymerizable group may be a photopolymerizable group. Non-limiting examples of the polymerizable group may include an acryloyl group, a methacryloyl group, an acrylate group, and a methacrylate group. When $R_1$ of the first compound AI1 is a polymerizable group, the first compound AI1 may form the polymer PL together (e.g., may polymerize) with another first compound AI1, with a second compound AI0 (which will be described later), or with reactive mesogens (which will also be described later). The polymer PL may be in the form of protrusions (e.g., may form one or more protrusions) and may cover the whole of the lower alignment inducing layer 191 and/or the whole of the upper alignment inducing layer 291.

$SP_1$ and $SP_2$ of the first compound AI1 represented by formula A1 may enable the compound to be a flexible group having a set or predetermined length. Each of $SP_1$ and $SP_2$ may give liquid crystal-affinitive properties to the first compound AI1, and may each serve as a spacer between a core structure and $R_1$ and $R_2$ at the ends of that core structure. In some embodiments, the solubility of the first compound AI1 in the liquid crystals LC can be controlled using the lengths of $SP_1$ and $SP_2$, the types (e.g., identities) of $X_1$, $X_2$ and $X_3$ and/or the type (e.g., identity) of Z in the first compound AI1 represented by formula A1, although embodiments of the present disclosure are not limited thereto.

In some embodiments, the first compound AI1 represented by formula A1 may be further represented by formula A2:

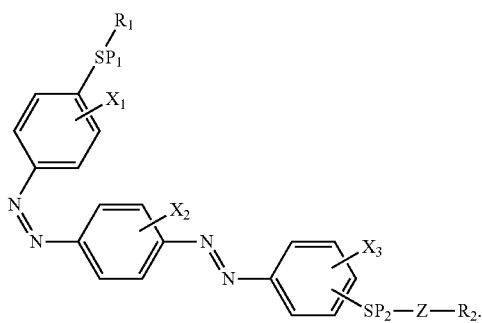

(A2)

In formula A2, $R_1$, $R_2$, $SP_1$, $SP_2$, Z, $X_1$, $X_2$, and $X_3$ may each independently be the same as defined in formula A1.

The ability of the first compound AI1 to vertically align and give a pretilt to the liquid crystals LC may be further improved by bonding an azo group (e.g., the left azo group in formula A2) and $SP_1$ to para positions of the benzene ring, and/or bonding an azo group (e.g., the right azo group in formula A2) and $SP_2$ to para positions of the benzene ring.

Figure 6:
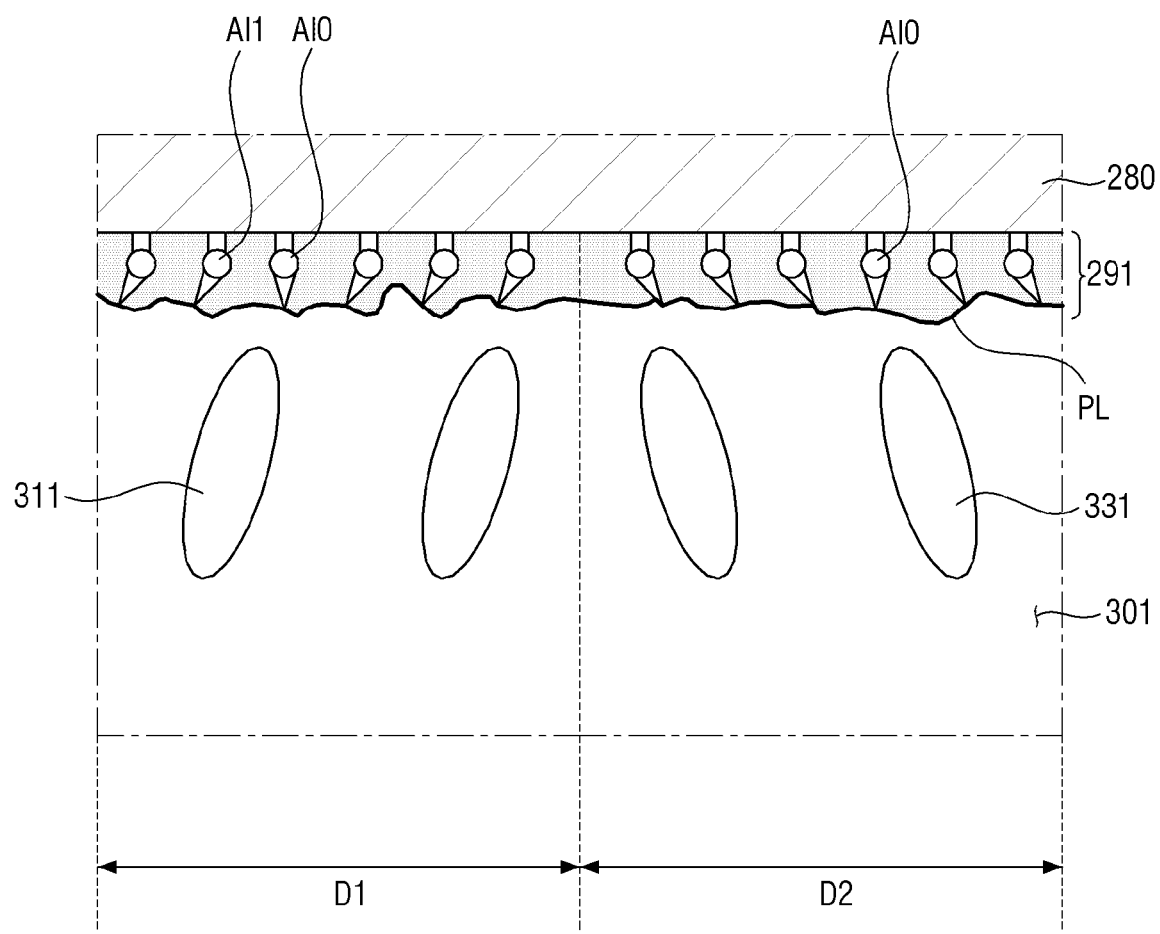
FIG. 6 is a schematic enlarged view of area B in FIG. 3.

In FIGS. 5 and 6, the lower alignment inducing layer 191 and the upper alignment inducing layer 291 both (e.g., simultaneously) include the first compound AI1 and the polymer PL of the first compound AI1. However, in some embodiments, the lower alignment inducing layer 191 and/or the upper alignment inducing layer 291 may not include the first compound AI1 and the polymer PL of the first compound AI1 (e.g., may include neither, one, or the other).

In some embodiments, each of the lower alignment inducing layer 191 and the upper alignment inducing layer 291 may further include the second compound AI0 represented by formula B1 and/or a polymer PL of the second compound AI0. For example, the second compound AI0 may be self-aligned in each of the lower alignment inducing layer 191 and the upper alignment inducing layer 291 to form a monomolecular layer or a polymerized monomolecular layer:

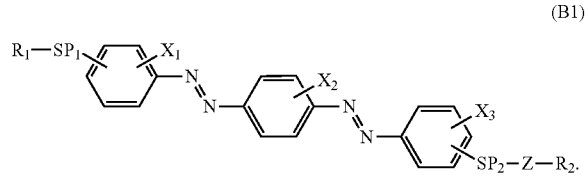

(B1)

In formula B1, $R_1$, $R_2$, $SP_1$, $SP_2$, Z, $X_1$, $X_2$, and $X_3$ may each independently be the same as defined in formula A1.

The second compound AI0 having the structure represented by formula B1 may be in a trans isomer state (e.g., may have trans-isomer stereochemistry) in which the benzene rings are on opposite sides of the each of the two azo group double bonds. The first compound AI1 having the structure represented by the above-described formula A1 may be formed by a trans-cis reaction of at least a portion of the second compound AI0 having the structure represented by formula B1, although embodiments of the present disclosure are not limited thereto.

The hydrophilic group (*—$R_2$) of the second compound AI0 represented by formula B1 may give self-alignment properties to the second compound AI0. Non-limiting examples of the hydrophilic group (*—$R_2$) may be similar to the examples of the hydrophilic group described above in relation to the first compound AI1.

In some embodiments, the hydrophilic group of the second compound AI0 may be a monovalent group including two or more hydroxyl groups or two or more carboxyl groups. When the second compound AI0 represented by formula B1 includes two or more hydroxyl groups or two or more carboxyl groups, the solubility of the second compound AI0 in the liquid crystals LC may be relatively low, thereby facilitating phase separation of the first compound AI1 from the liquid crystals LC. The solubility of the second compound AI0 in the liquid crystals LC may be less than about 0.01% by weight. When the solubility of the second compound AI0 in the liquid crystals LC is less than about 0.01% by weight, the second compound AI0 may be easily phase-separated from a liquid crystal composition in a method of manufacturing an LCD that will be described later. In addition, the second compound AI0 may induce the initial vertical alignment of the liquid crystals LC without requiring an additional process. When the solubility of the second compound AI0 is about 0.01% by weight or more, the amount of the second compound AI0 dissolved in the liquid crystals LC may increase, making it difficult or impossible to form a complete monomolecular layer, although embodiments of the present disclosure do not exclude this case. Accordingly, the liquid crystals LC may initially be randomly or horizontally aligned. As used herein, the term 'solubility (wt %) in liquid crystals' denotes the grams (g) of solute that can be completely dissolved in 100 grams of liquid crystals at 25° C. or alternatively, the percentage of the weight of a solute that can be completely dissolved at 25° C. to the weight of liquid crystals.

In some embodiments, the hydrophilic group of the second compound AI0 having the structure represented by formula B1 or the hydrophilic group of the polymer PL of the second compound AI0 in the lower alignment inducing layer 191 may be aligned toward the pixel electrode 180 and may maintain a stable state, and the hydrophilic group of the second compound AI0 or the hydrophilic group of the polymer PL of the second compound AI0 in the upper alignment inducing layer 291 may be aligned toward the common electrode 280 and may maintain a stable state. In addition, $R_1$ of the second compound AI0 in the lower alignment inducing layer 191 and in the upper alignment inducing layer 291 may be aligned toward the liquid crystal layer 301, and may thereby contribute to the initial vertical alignment of the liquid crystals LC in the liquid crystal layer 301.

The description and examples of each functional group of the second compound AI0 represented by formula B1 and the alignment state of the second compound AI0 may be substantially the same as those of the first compound AI1 described above.

In some embodiments, the second compound AI0 represented by formula B1 may be further represented by formula B2;

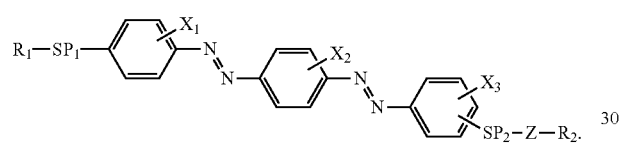

(B2)

In formula B1, $R_1$, $R_2$, $SP_1$, $SP_2$, Z, $X_1$, $X_2$, and $X_3$ may each independently be the same as defined in formula A1.

When an azo group and $SP_1$ are bonded to para positions of the first benzene ring, respectively, and an azo group and $SP_2$ are bonded to para positions of a second benzene ring, it may be possible to secure the linearity of the core structure of the second compound AI0 and thereby further improve the ability of the second compound AI0 to vertically align the liquid crystals LC.

In some embodiments, the lower alignment inducing layer 191 and the upper alignment inducing layer 291 may both (e.g., simultaneously) include a third compound represented by formula C1 and/or a polymer PL of the third compound. For example, the third compound may be self-aligned in both of the lower alignment inducing layer 191 and the upper alignment inducing layer 291 to form a monomolecular layer or a polymerized monomolecular layer:

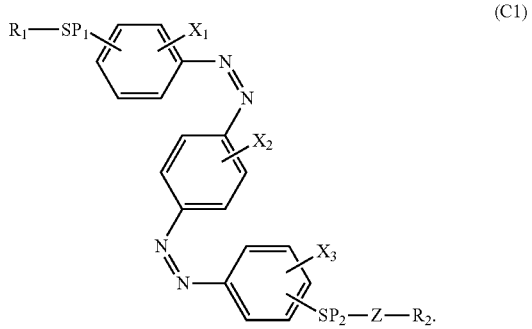

(C1)

In formula C1, $R_1$, $R_2$, $SP_1$, $SP_2$, Z, $X_1$, $X_2$ and $X_3$ may each independently be the same as defined in formula A1.

The third compound represented by formula C1 may be in a cis isomer state (e.g., may have cis isomer stereochemistry) in which two benzene rings are located on the same side of the azo group double bond in each of the two azo groups. The third compound having the structure represented by C1 may be formed via a trans-cis reaction of at least a portion of the first compound AI1 having the structure represented by formula A1, but embodiments of the present disclosure are not limited thereto.

The description and examples of each functional group of the third compound represented by formula C1 and the alignment state of the third compound may be substantially the same as those of the first compound AI1 described above.

In some embodiments, the third compound represented by formula C1 may be further represented by formula C2:

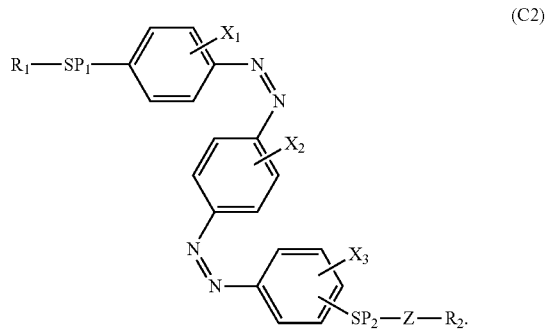

(C2)

In formula C1, $R_1$, $R_2$, $SP_1$, $SP_2$, Z, $X_1$, $X_2$ and $X_3$ may each independently be the same as defined in formula A1.

In some embodiments, the content of the first compound AI1 having the structure represented by formula A1 in the lower alignment inducing layer 191 and/or the upper alignment inducing layer 291 may be greater than the content of the third compound having the structure represented by formula C1 in the lower alignment inducing layer 191 and/or the upper alignment inducing layer 291.

The third compound may be formed via conversion of at least a portion of the first compound AI1, but embodiments of the present disclosure are not limited thereto. In the method of manufacturing an LCD which will be described later, the conversion (e.g., conversion amount or ratio) of the first compound AI1 into the third compound may be controlled or selected to thereby improve the ability of the lower alignment inducing layer 191 and the upper alignment inducing layer 291 to give a pretilt to the liquid crystals LC.

Hereinafter, additional embodiments will be described. Elements substantially identical to those included in the LCD 1 will be clearly understood by those skilled in the art from the attached drawings, and for simplicity, descriptions thereof will not be repeated.

Figure 7:
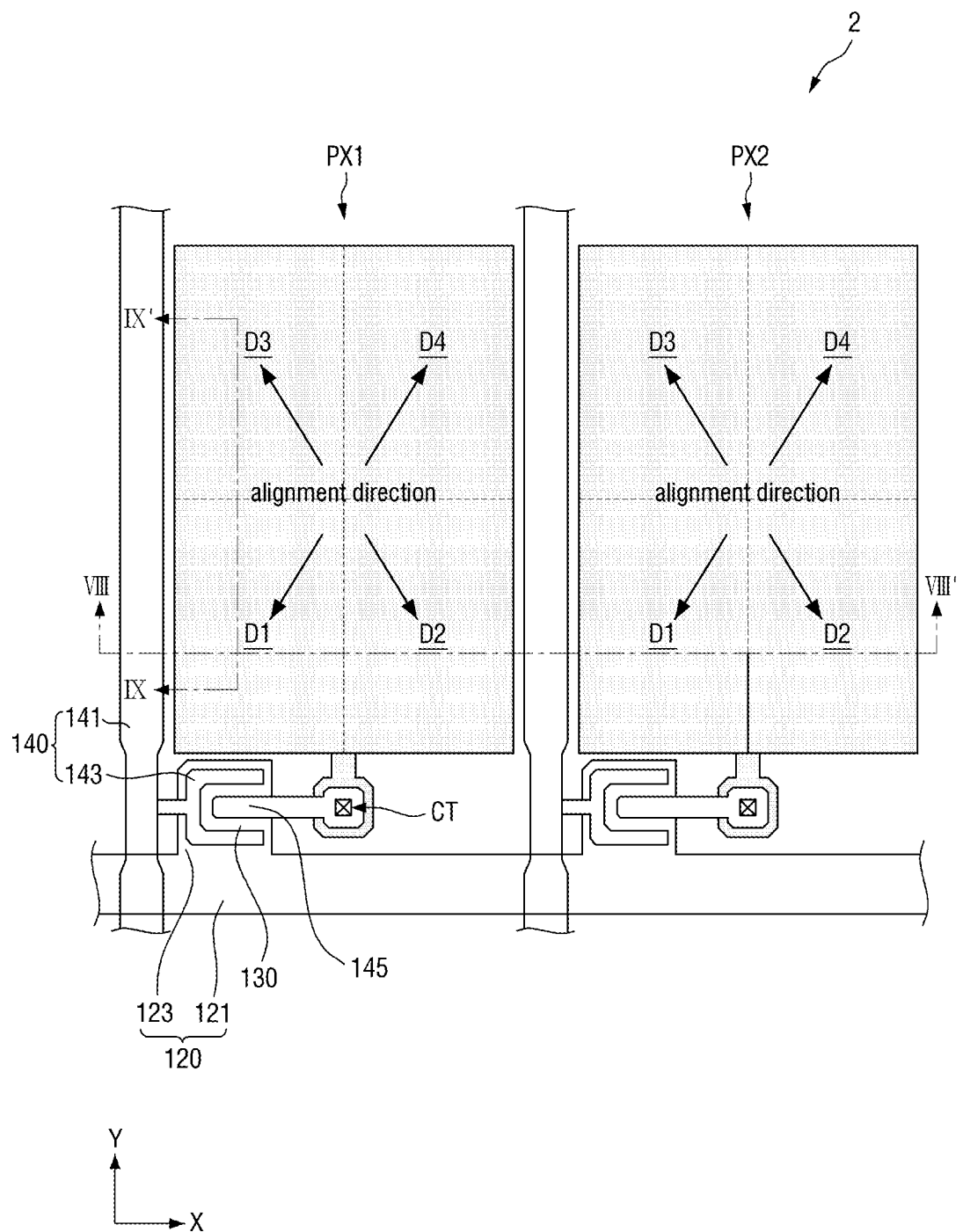
FIG. 7 is a schematic view of pixels of an LCD according to an embodiment of the present disclosure.
Figure 8:
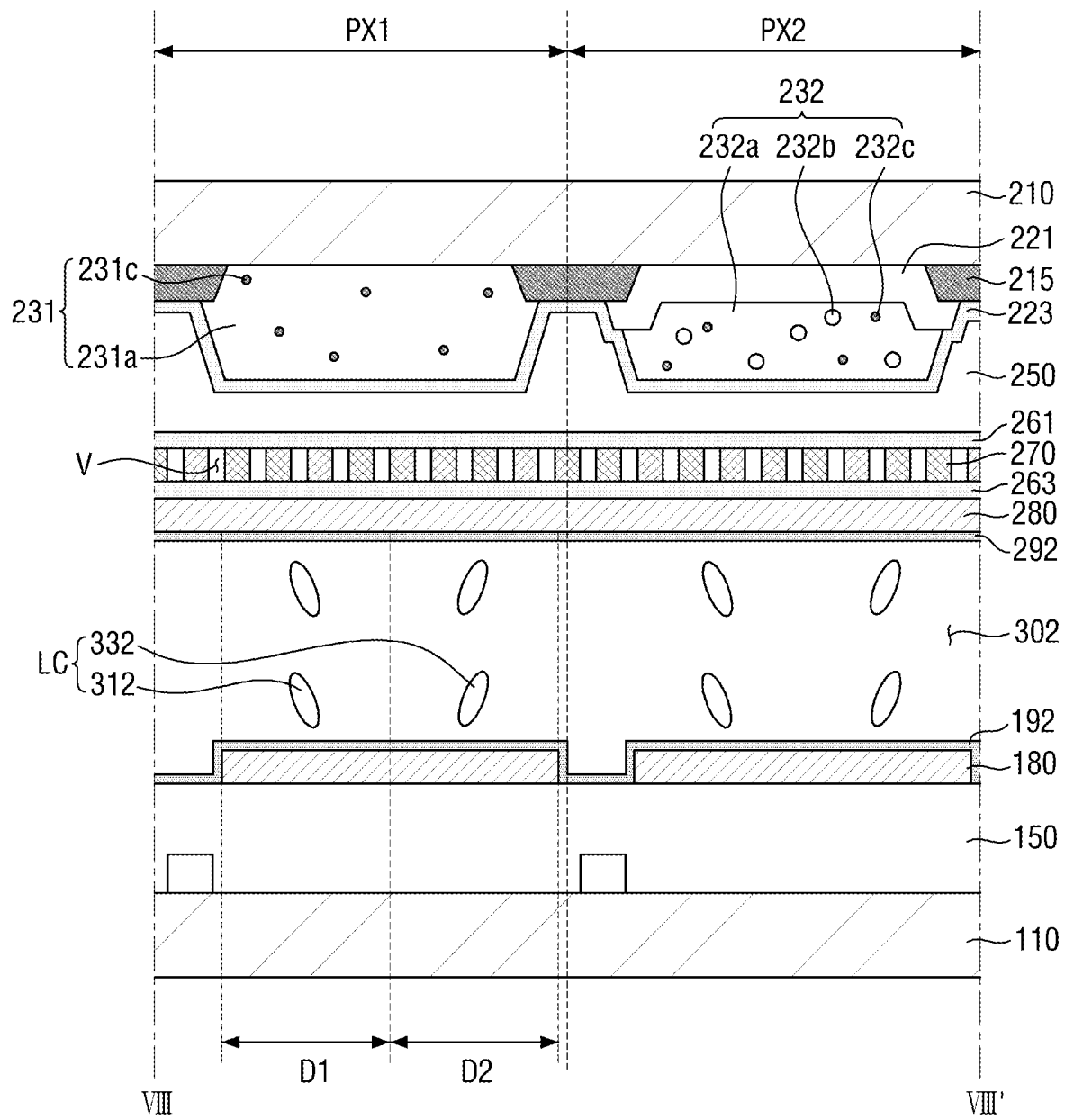
FIG. 8 is a cross-sectional view taken along the line VIII-VIII' of FIG. 7.
Figure 9:
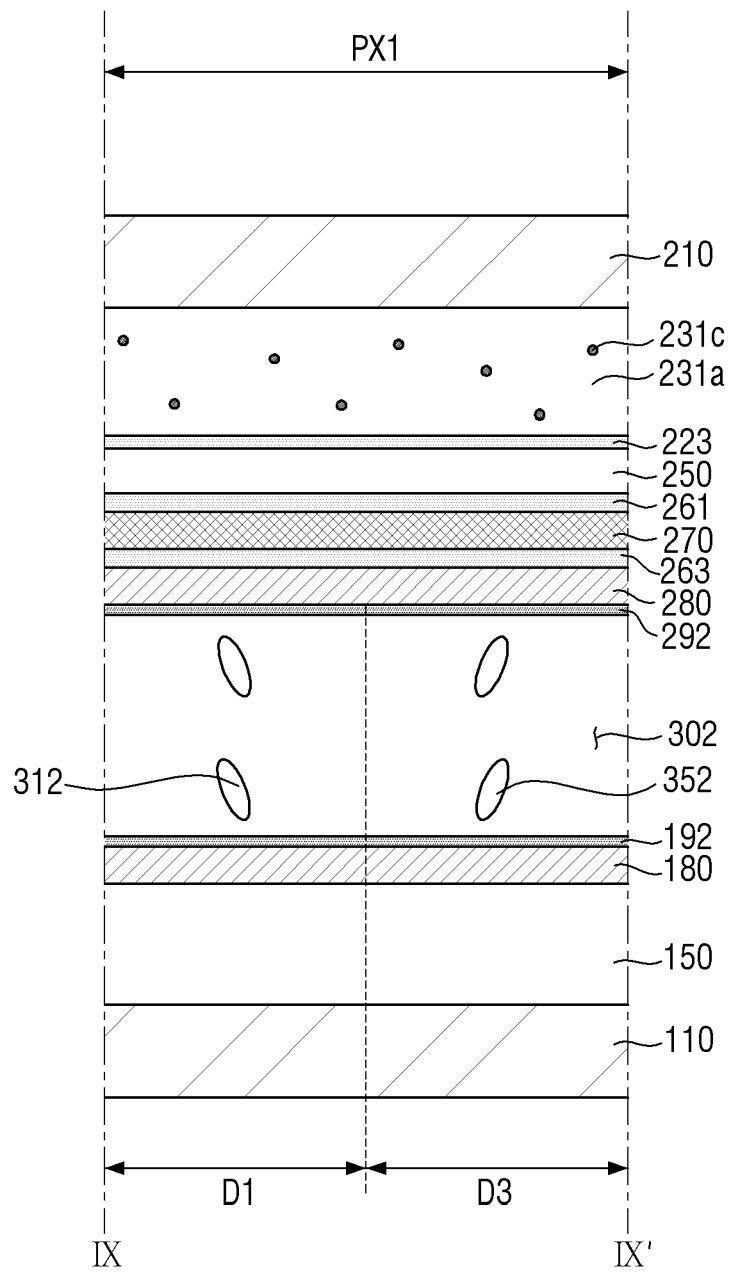
FIG. 9 is a cross-sectional view taken along the line IX-IX' of FIG. 7.

FIG. 7 is a schematic view showing two pixels of an LCD 2 according to an embodiment of the present disclosure. FIG. 8 is a cross-sectional view taken along the line VIII-VIII' of FIG. 7. FIG. 9 is a cross-sectional view taken along the line IX-IX' of FIG. 7.

Referring to FIGS. 7 through 9, the LCD 2 according to the current embodiment differs from the LCD 1 illustrated in the embodiment of FIG. 2, etc. in that the first pixel PX1 and the second pixel PX2 both (e.g., simultaneously) include a plurality of domains D1 through D4 having different initial liquid crystal LC alignment directions or states of, and the liquid crystals LC in the liquid crystal layer 302 in each of the pixels PX1 and PX2 are initially aligned with a pretilt toward the periphery of the pixel PX1 or PX2.

For example, the liquid crystals LC in each of the pixels PX1 and PX2 may be aligned such that the ends of long axes of the liquid crystals LC that are nearer to the upper substrate side are tilted or inclined toward the periphery of the pixel PX1 or PX2, compared with the respective ends of the long axes of the liquid crystals LC that are nearer to the lower substrate side.

In some embodiments, liquid crystals 312 in a first domain D1 of the first pixel PX1 may be initially aligned with a pretilt in a lower left direction (i.e., toward the periphery of the first pixel PX1), and liquid crystals 332 in a second domain D2 of the first pixel PX1 may be initially aligned with a pretilt in a lower right direction (i.e., toward the periphery of the first pixel PX1). In addition, liquid crystals 352 in a third domain D3 of the first pixel PX1 may be initially aligned with a pretilt in an upper left direction (i.e., toward the periphery of the first pixel PX1), and liquid crystals in a fourth domain D4 of the first pixel PX1 may be initially aligned with a pretilt in an upper right direction (i.e., toward the periphery of the first pixel PX1).

In some embodiments, the domains D1 through D4 are not formed using domain division portions in a pixel electrode 180 or a common electrode 280, but by using a lower alignment inducing layer 192 and an upper alignment inducing layer 292, though embodiments of the present disclosure are not limited thereto.

Figure 10:
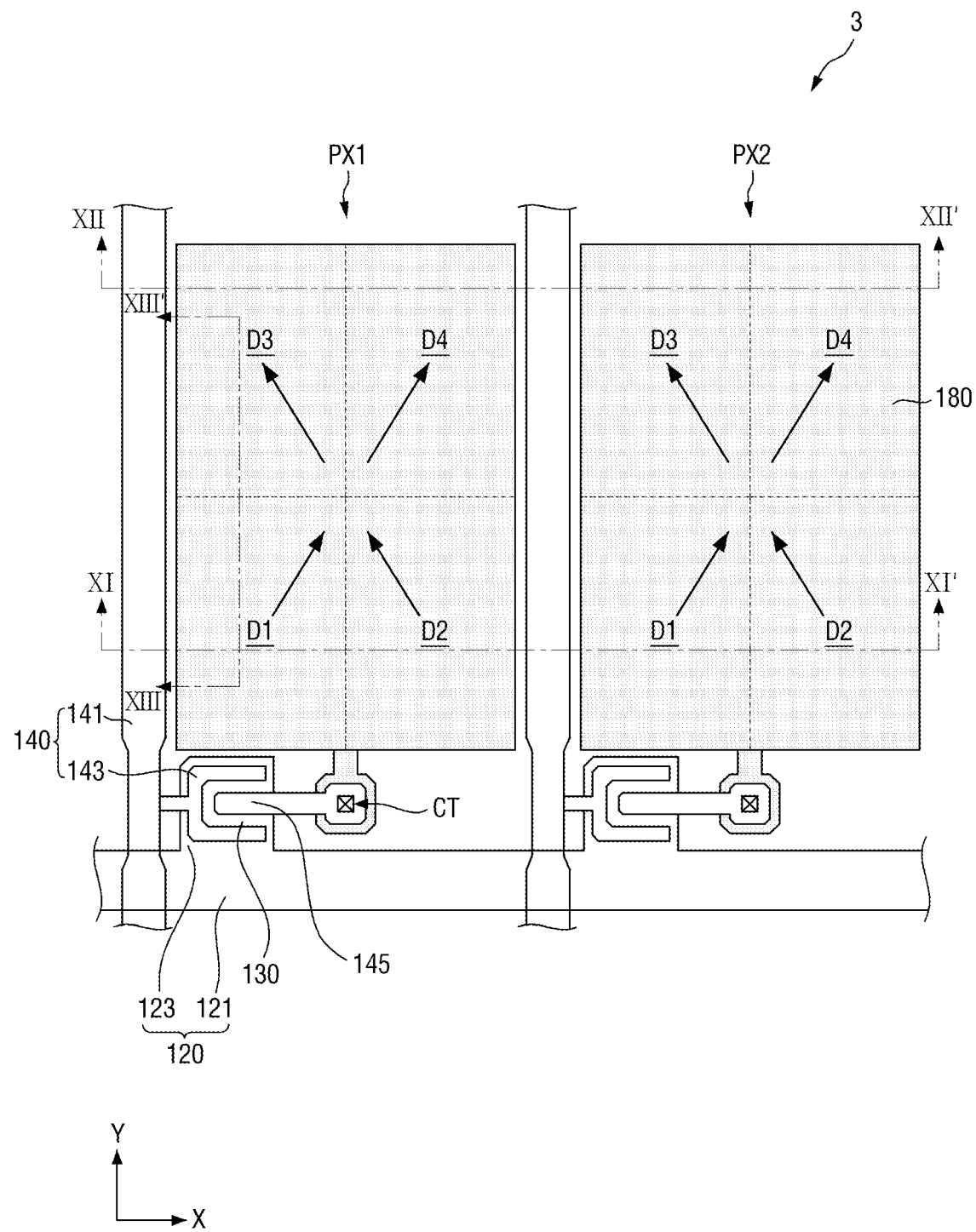
FIG. 10 is a schematic view of pixels of an LCD according to an embodiment of the present disclosure.
Figure 11:
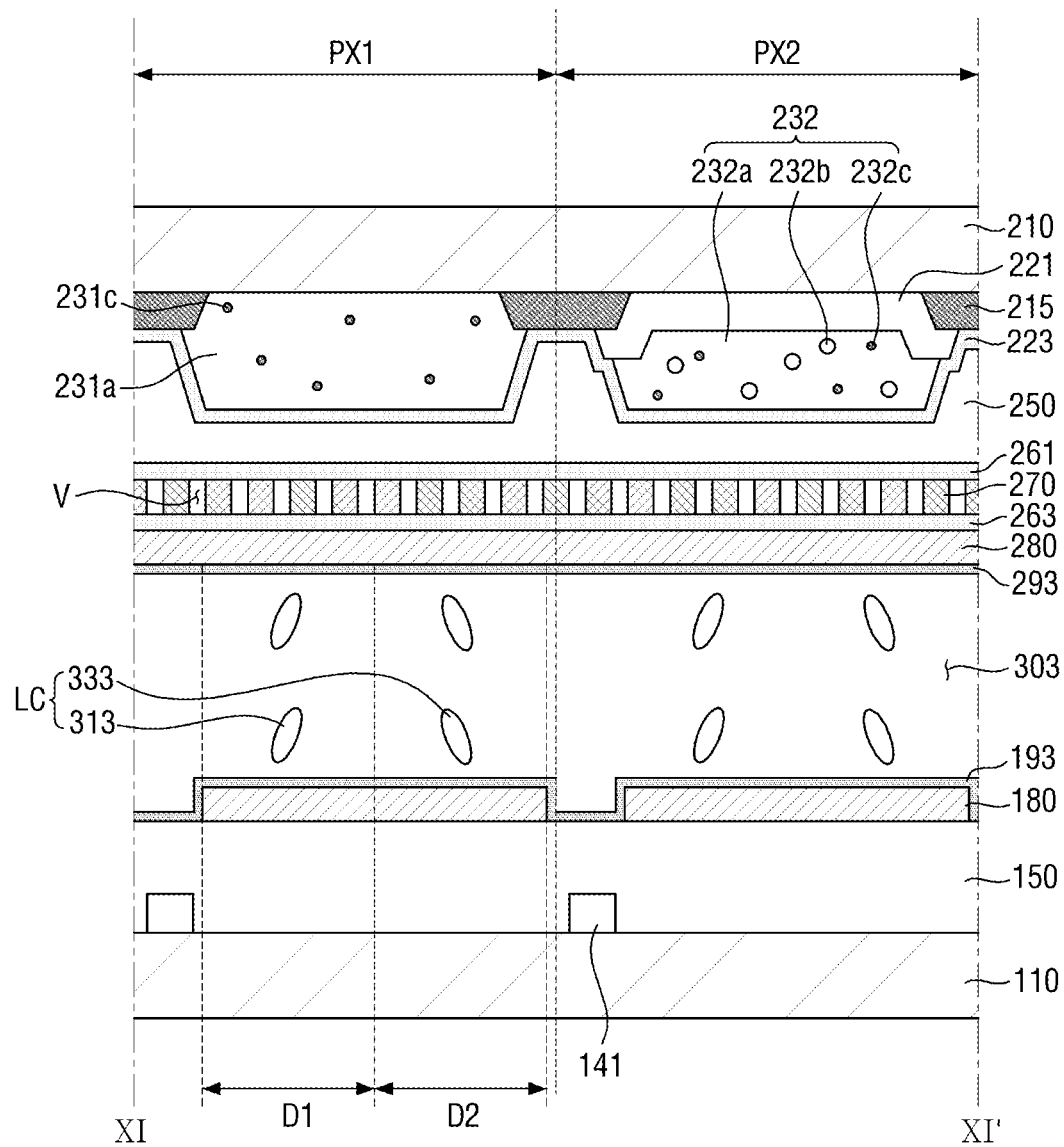
FIG. 11 is a cross-sectional view taken along the line XI-XI' of FIG. 10.
Figure 12:
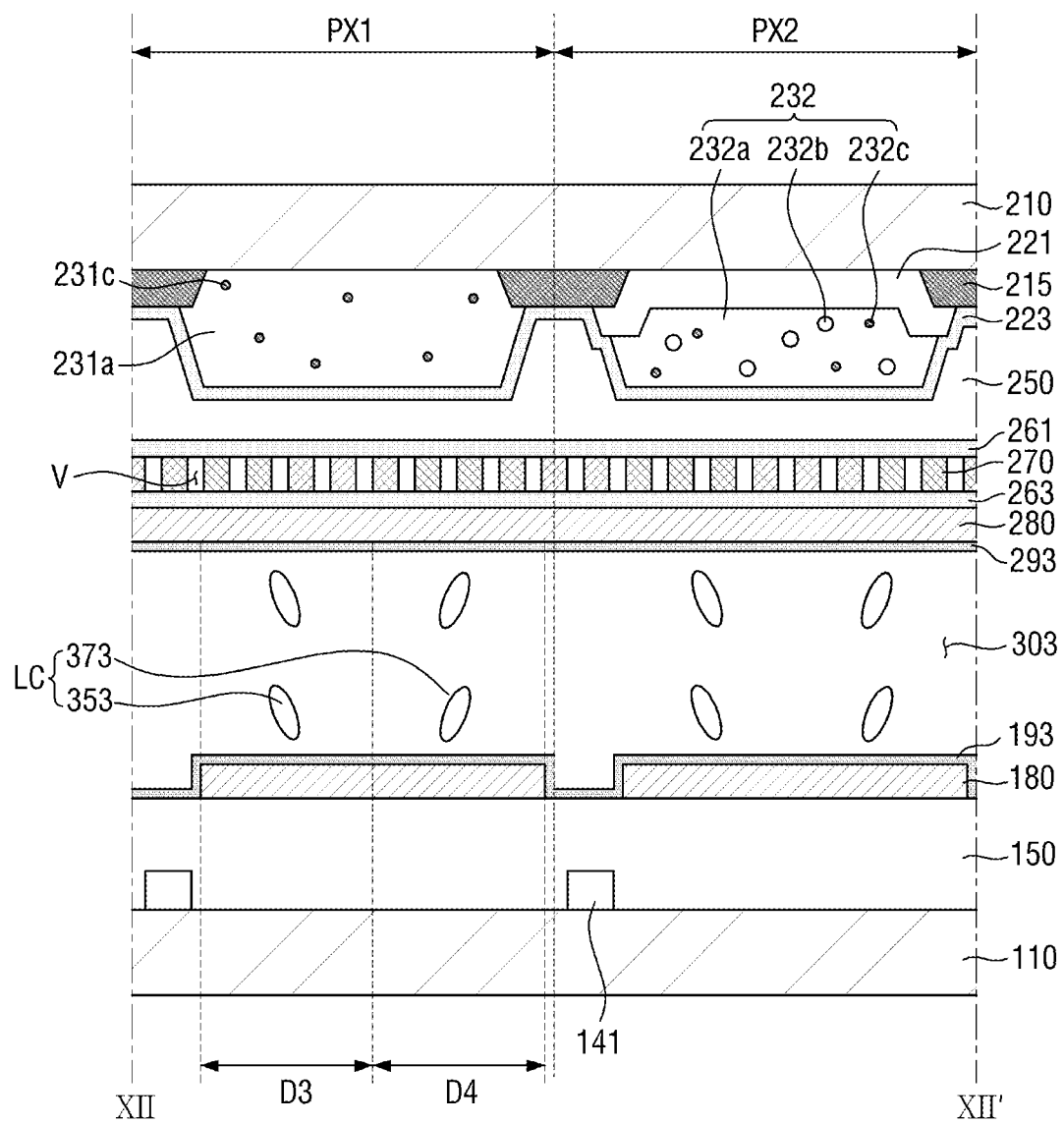
FIG. 12 is a cross-sectional view taken along the line XII-XII' of FIG. 10.
Figure 13:
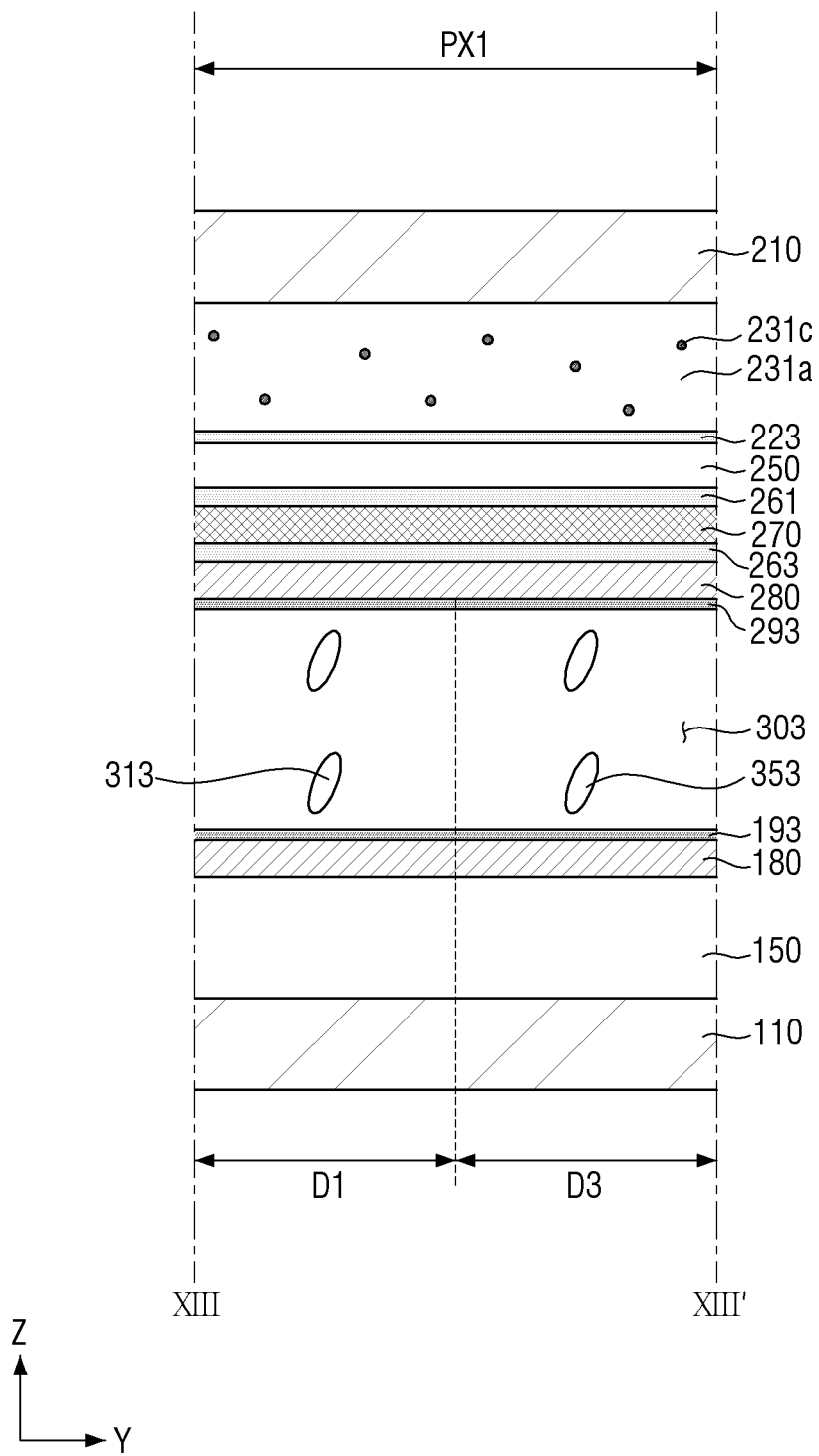
FIG. 13 is a cross-sectional view taken along the line XIII-XIII' of FIG. 10.

FIG. 10 is a schematic view of pixels of an LCD 3 according to an embodiment of the present disclosure. FIG. 11 is a cross-sectional view taken along the line XI-XI' of FIG. 10. FIG. 12 is a cross-sectional view taken along the line XII-XII' of FIG. 10. FIG. 13 is a cross-sectional view taken along the line XIII-XIII' of FIG. 10.

Referring to FIGS. 10 through 13, the LCD 3 according to the current embodiment differs from the LCD 1 illustrated in the embodiment of FIG. 2, etc. in that a first pixel PX1 and a second pixel PX2 both (e.g., simultaneously) have a plurality of domains D1 through D4 having different initial alignment directions or states of liquid crystals LC, where some of the liquid crystals LC in each of the pixels PX1 and PX2 are initially aligned with a pretilt toward the center of the pixel PX1 or PX2, and some of the liquid crystals LC in each of the pixels PX1 and PX2 are initially aligned with a pretilt toward the periphery of the pixel PX1 or PX2.

In some embodiments, liquid crystals 313 in a first domain D1 of the first pixel PX1 may be initially aligned with a pretilt in an upper right direction (i.e., toward the center of the first pixel PX1), and liquid crystals 333 in a second domain D2 of the first pixel PX1 may be initially aligned with a pretilt in an upper left direction (i.e., toward the center of the first pixel PX1).

On the other hand, liquid crystal 353 in a third domain D3 of the first pixel PX1 may be initially aligned with a pretilt in an upper left direction (i.e., toward the periphery of the first pixel PX1), and liquid crystals 373 in a fourth domain D4 may be initially aligned with a pretilt in an upper right direction (i.e., toward the periphery of the first pixel PX1).

The domains D1 through D4 are not formed using domain division portions of a pixel electrode 180 or a common electrode 280, and may instead be formed by a lower alignment inducing layer 193 and an upper alignment inducing layer 293, but embodiments of the present disclosure are not limited thereto.

Each of the pixels PX1 and PX2 of the LCD 3 according to the current embodiment includes a first domain D1, a second domain D2 located on a side of the first domain D1 in the first direction X, a third domain D3 located on a side of the first domain D1 in the second direction Y, and a fourth domain D4 located diagonally to the first domain D1. Here, the liquid crystals 313 and 333 in the first domain D1 and the second domain D2 may have a pretilt toward the center of each pixel, and the liquid crystals 353 and 373 in the third domain D3 and the fourth domain D4 may have a pretilt toward the periphery of each pixel. In addition, the liquid crystals 313 and 373 in the first domain D1 and the fourth domain D4 may have the same pretilt direction (i.e., toward the upper right direction), and the liquid crystals 333 and 353 in the second domain D2 and the third domain D3 may have the same pretilt direction (i.e., toward the upper left direction).

As described above, the pretilt of the liquid crystals LC of the LCD 3 according to the current embodiment may not be determined by the pixel electrode 180 and the common electrode 280. Accordingly, the rearrangement direction of the liquid crystals LC may be determined not by the direction of an electric field formed between the pixel electrode 180 and the common electrode 280 (for example, the direction of a lateral field caused by the shape of the pixel electrode 180 in each of the pixels PX1 and PX2), but by the arrangement of a first compound having a cis isomer state (e.g., cis-isomer stereochemistry) in the lower alignment inducing layer 193 and the upper alignment inducing layer 293. Accordingly, it should be possible to freely modify the design of the domains D1 through D4 in each pixel PX1 or PX2 and diversify the rearrangement direction of the liquid crystals LC when an electric field is formed in a liquid crystal layer 303.

Figure 14:
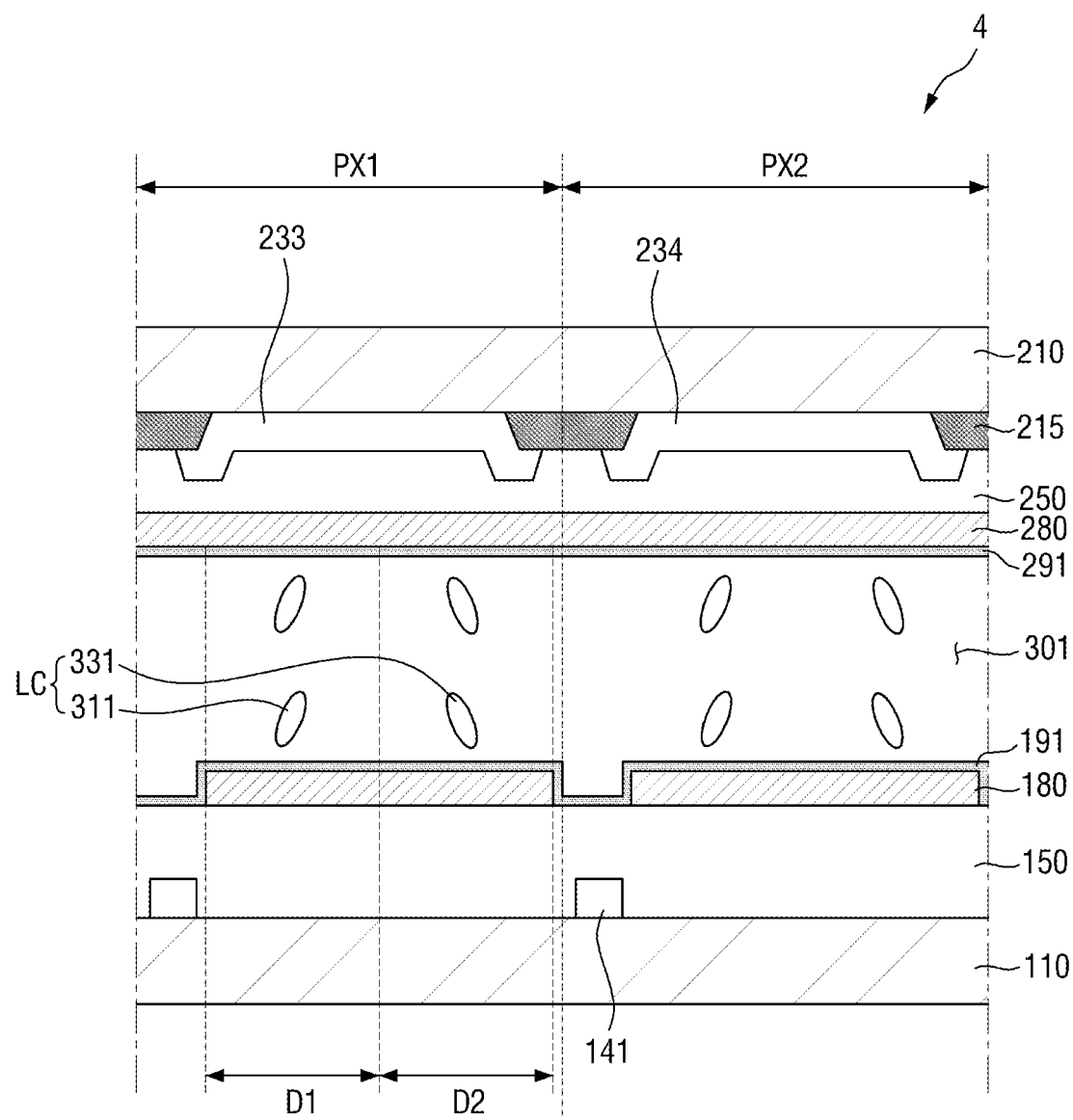
FIG. 14 is a cross-sectional view of an LCD according to an embodiment of the present disclosure.

FIG. 14 is a cross-sectional view of an LCD 4 according to an embodiment of the present disclosure.

Referring to FIG. 14, the LCD 4 according to the current embodiment differs from the LCD 1 illustrated in the embodiment of FIG. 3, etc. in that it includes a first color conversion pattern 233 in the first pixel PX1 and a second color conversion pattern 234 in the second pixel PX2, and the first color conversion pattern 233 and the second color conversion pattern 234 are color filters.

In some embodiments, each of the first color conversion pattern 233 and the second color conversion pattern 234 may be a color filter that does not include a wavelength shifter, and includes a colorant (such as a pigment and/or dye) dissolved and/or dispersed in a base resin.

When white light provided from a backlight unit is incident on the first pixel PX1, only light in a blue wavelength band including a blue peak wavelength may be transmitted by the first color conversion pattern 233, and light in wavelength bands other than the blue wavelength band may be absorbed and reduced or blocked by the first color conversion pattern 233. Thus, the first pixel PX1 may display a blue color.

Similarly, when white light provided from the backlight unit is incident on the second pixel PX2, only light in a green wavelength band including a green peak wavelength may be transmitted by the second color conversion pattern 234, and light in wavelength bands other than the green wavelength band may be absorbed and reduced or blocked by the second color conversion pattern 234. Thus, the second pixel PX2 may display a green color.

In some embodiments, a third color conversion pattern (a red color filter) may be in the third pixel (a red pixel), so that the third pixel can display a red color.

Hereinafter, methods of manufacturing an LCD according to the present disclosure will be described.

FIGS. 15 through 29 are drawings illustrating a method of manufacturing an LCD according to an embodiment of the present disclosure.

In some embodiments, a method of manufacturing an LCD includes forming a pre-alignment inducing layer and a liquid crystal layer, and irradiating with light having a first peak wavelength. The method may further include irradiating with light having a second peak wavelength shorter than the first peak wavelength.

Figure 15:
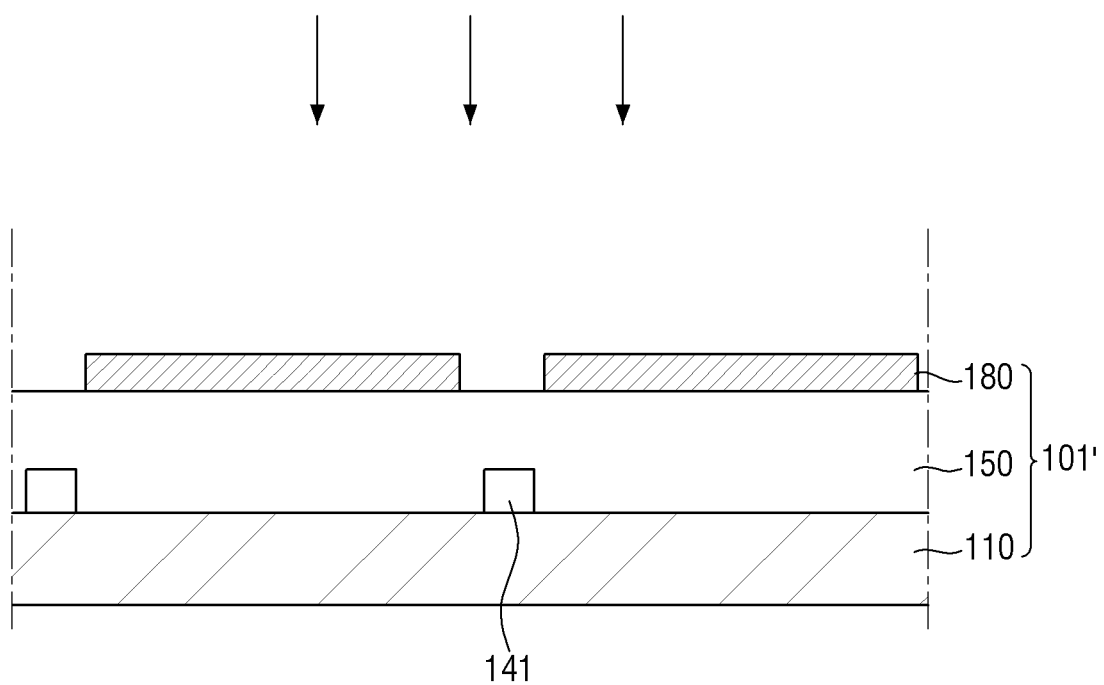

First, referring to FIG. 15, a first substrate 101' whose surface has been subjected to hydrophilic treatment is prepared. For example, the first substrate 101' (including a first base 110, switching elements, an intermediate insulating layer 150, and pixel electrodes 180) may be prepared, and the surfaces of the pixel electrodes 180 and the intermediate insulating layer 150 of the first substrate 101' may be treated to be at least partially hydrophilic.

The hydrophilic treatment may include one or more selected from ozone treatment, plasma treatment, and ultraviolet treatment. The hydrophilicity of the surfaces of the pixel electrodes 180 and the intermediate insulating layer 150 of the first substrate 101' may be controlled or selected by the hydrophilic treatment of the first substrate 101'. For example, the hydrophilicity of the surface of the first substrate 101' can be increased. This may improve the self-alignment properties of a second compound AI0 in a liquid crystal composition positioned on the surface of the first substrate 101'.

Figure 16:
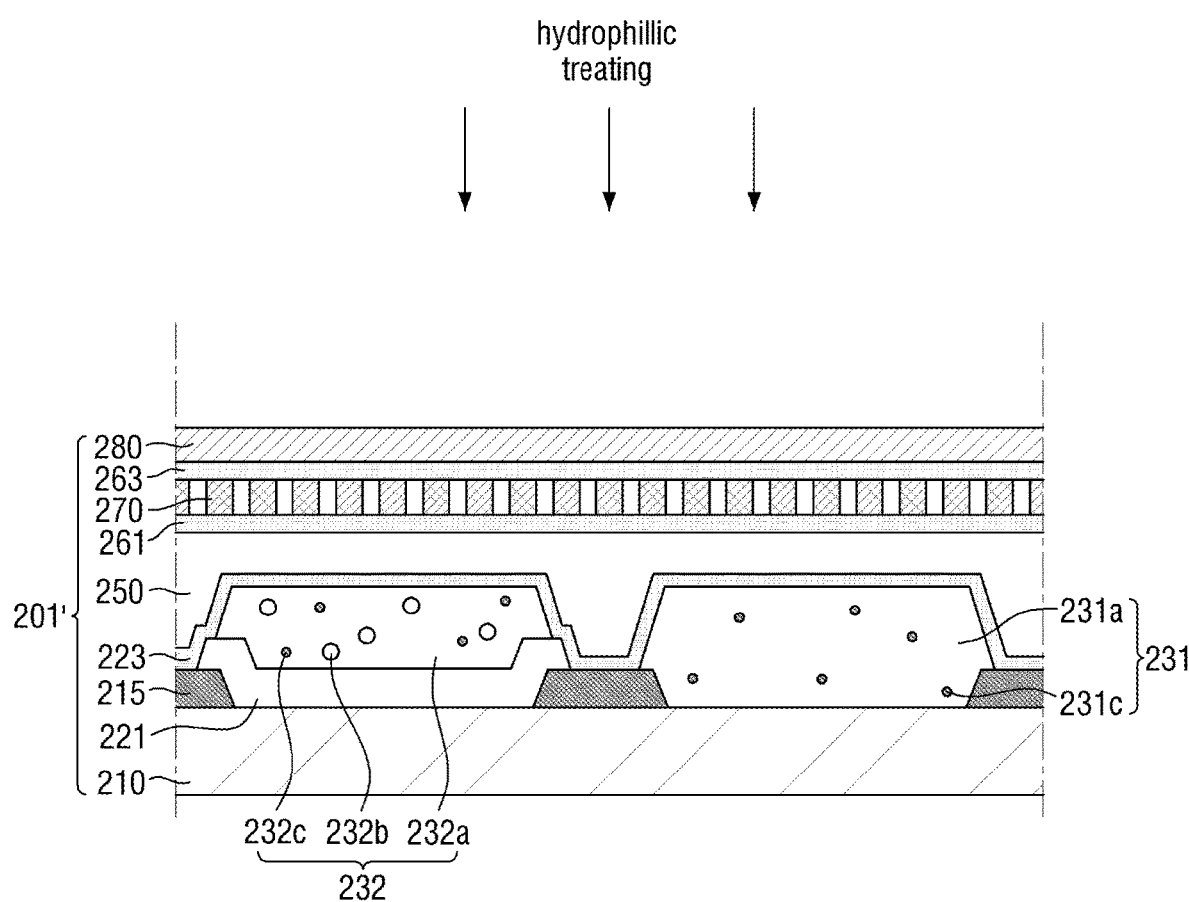

Next, referring to FIG. 16, a second substrate 201' whose surface has been subjected to hydrophilic treatment is prepared. For example, the second substrate 201' including a second base 210, a color conversion pattern 232, an overcoat layer 250, wire grid patterns 270, and a common electrode 280 may be prepared, and the surface of the common electrode 280 of the substrate 201' may be treated to be at least partially hydrophilic.

The hydrophilic treatment may include one or more selected from ozone treatment, plasma treatment, and ultraviolet treatment. The hydrophilicity of the surface of the common electrode 280 of the second substrate 201' may be increased by the hydrophilic treatment of the second substrate 201'.

Figure 17:
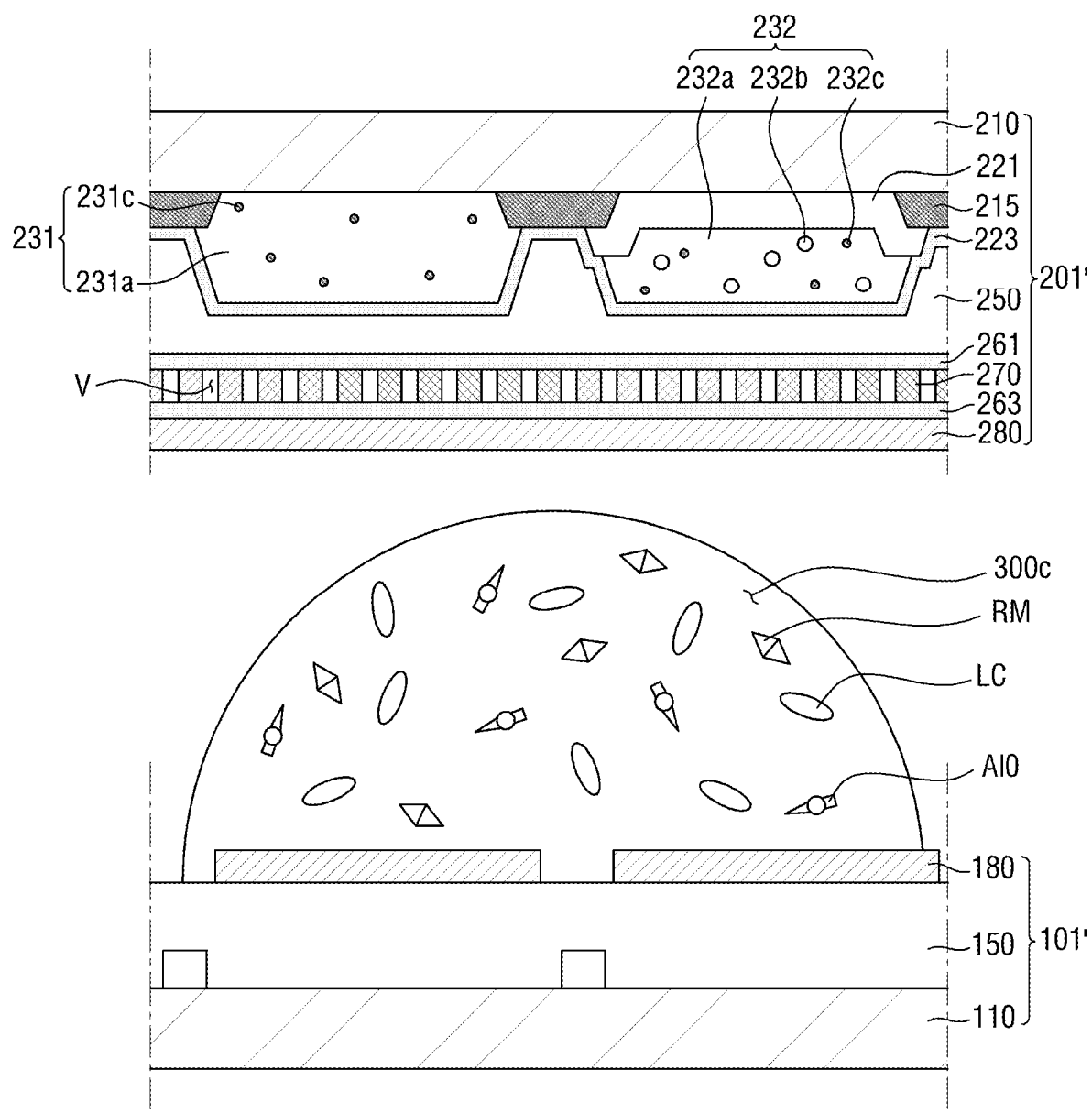
Figure 18:
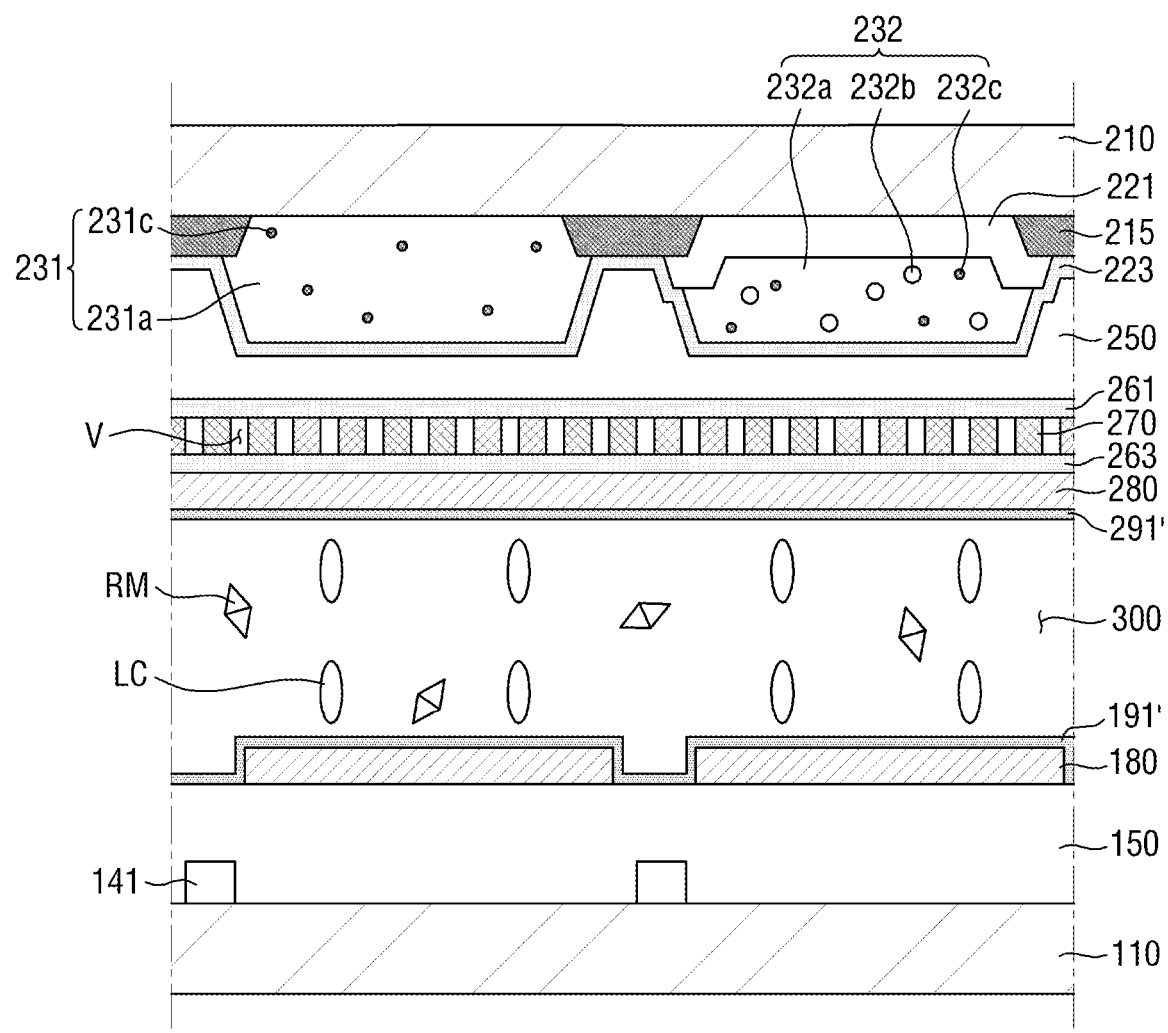

Referring to FIGS. 17 and 18, a first pre-alignment inducing layer 191', a second pre-alignment inducing layer 291' and a liquid crystal layer 300 are formed. The forming of the first pre-alignment inducing layer 191', the second pre-alignment inducing layer 291' and the liquid crystal layer 300 may include providing (e.g., positioning) a liquid crystal composition 300c between the first substrate 101' and the second substrate 201', letting the second compound AI0 in the liquid crystal composition 300c be self-aligned, and forming the liquid crystal layer 300 including vertically aligned liquid crystals LC.

FIG. 17 is a view illustrating the operation of providing (e.g., positioning) the liquid crystal composition 300c. Referring to FIG. 17, the liquid crystal composition 300c may be provided between the first substrate 101' and the second substrate 201'. In some embodiments, the liquid crystal composition 300c may include the liquid crystals LC and the second compound AI0 represented by formula B1, and may further include a reactive mesogen compound RM:

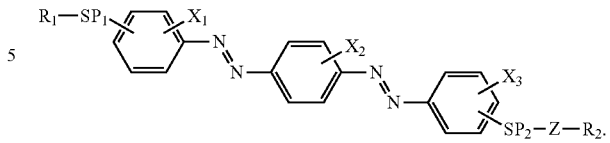

(B1)

The description, function, and specific chemical structure of each substituent of the second compound AI0 represented by formula B1 may be the same as described above.

As described above, the liquid crystals LC may have negative dielectric anisotropy. In addition, the second compound AI0 may be substantially insoluble in the liquid crystals LC. For example, the solubility of the second compound AI0 in the liquid crystals LC may be less than about 0.01% by weight. The solubility of the second compound AI0 can be controlled by the type or kind of the hydrophilic group and the type or kind of each substituent. In the current operation, the second compound AI0 may be substantially uniformly dispersed in the liquid crystal composition 300c.

In some embodiments, the content of the second compound AI0 may be about 0.05% to about 1.0% by weight based on the total weight of the liquid crystal composition 300c. When the second compound AI0 is included in an amount of about 0.05% by weight or more, a monomolecular layer (e.g., a pre-alignment inducing layer) can be formed to induce the vertical alignment and pretilt of the liquid crystals LC. When the second compound AI0 is contained in an amount of more than about 1.0% by weight, at least a portion of the second compound AI0 may fail to form a monomolecular layer on the surface of the first substrate 101' and/or the second substrate 201', and may act as an impurity in the liquid crystal layer 300, thereby reducing a voltage holding ratio of the LCD.

The reactive mesogen compound RM may include a core structure having a mesogen skeleton and a polymerizable group bonded to one or both ends of the core structure.

In some embodiments, the reactive mesogen compound RM may be represented by formula D:

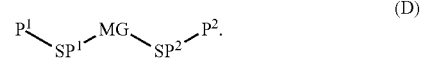

(D)

In formula D, MG may represent a mesogen skeleton that forms the core structure of the reactive mesogen compound RM. For example, MG may be a divalent $C_6$-$C_{24}$ aromatic group that may be miscible with liquid crystals. In some embodiments, MG may be selected from:

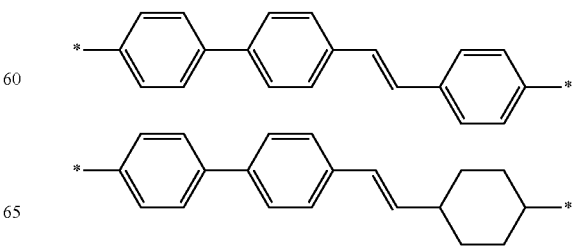

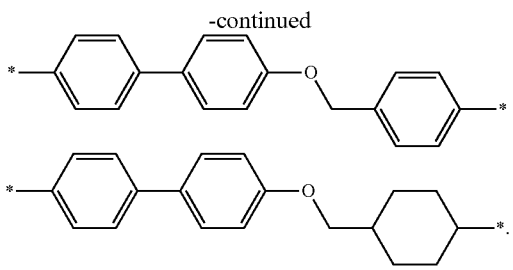

In addition, SP¹ and SP² may each independently be a spacer group connecting the core structure and a terminal group. The spacer group is not particularly limited as long as it is a hydrocarbon group having a set or predetermined length and flexibility. For example, SP¹ and SP² may each independently be a single bond, an alkylene group having 1 to 5 carbon atoms, or an alkoxylene group having 1 to 5 carbon atoms. SP¹ and SP² may be the same or different from each other.

P¹ and P² may each independently represent a terminal group of a reactive mesogen (RM). One or both of P¹ and P² may be a polymerizable group. For example, P¹ and P² may both (e.g., simultaneously) be polymerizable groups, or either of P¹ and P² may be hydrogen. Non-limiting examples of the polymerizable group may include an acryloyl group, a methacryloyl group, an acrylate group, and a methacrylate group.

In some embodiments, the providing or application of the liquid crystal composition 300c may include providing (e.g., positioning) the liquid crystal composition 300c such that the liquid crystal composition 300c contacts the pixel electrodes 180 and/or the intermediate insulating layer 150 exposed on the surface of the first substrate 101'. In FIG. 17, the liquid crystal composition 300c is dropped onto the surface of the first substrate 101'. However, in some embodiments, the liquid crystal composition 300c may be dropped onto the surface of the second substrate 201'. In this case, the liquid crystal composition 300c may contact the common electrode 280 exposed on the surface of the second substrate 201'.

Figure 19:
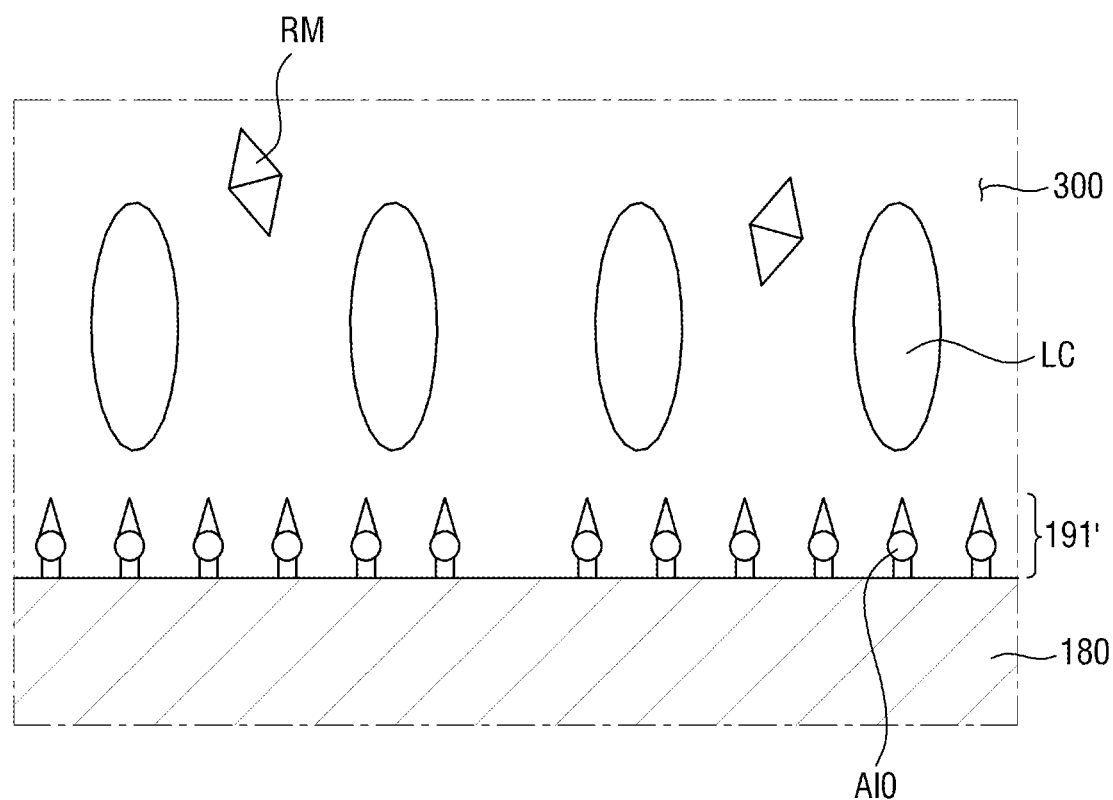
Figure 20:
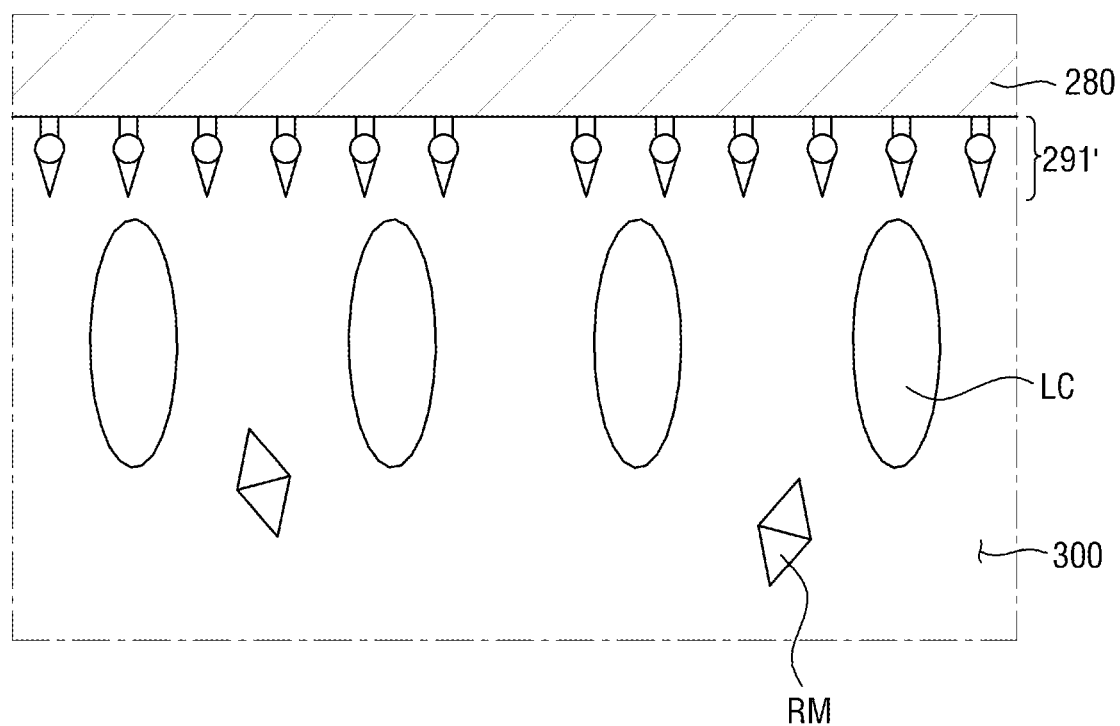

FIG. 18 is a drawing illustrating the operation of letting the second compound AI0 be self-aligned (e.g., undergo self-alignment) and the operation of forming the liquid crystal layer 300 including the vertically aligned liquid crystals LC. In addition, FIG. 19 is a schematic view illustrating a close-up of FIG. 18 in the vicinity of the first pre-alignment inducing layer 191', and FIG. 20 is a schematic view illustrating a close-up of FIG. 18 in the vicinity of the second pre-alignment inducing layer 291'.

Referring to FIGS. 17 through 20, the first substrate 101' and the second substrate 201' are bonded together to cause the second compound AI0 to be self-aligned and to vertically align the liquid crystals LC in the liquid crystal layer 300. The first substrate 101' and the second substrate 201' may be bonded together using a sealing member. The liquid crystal layer 300 may be sealed and interposed between the first substrate 101', the second substrate 201' and the sealing member.

In some embodiments, self-alignment of the second compound AI0 may include forming the first pre-alignment inducing layer 191' and the second pre-alignment inducing layer 291' via phase-separation of at least a portion of the second compound AI0 of the liquid crystal composition 300c, followed by self-alignment of the second compound AI0 on the pixel electrodes 180 and the common electrode 280.

For example, the first pre-alignment inducing layer 191' and the second pre-alignment inducing layer 291' may both (e.g., simultaneously) include the self-aligned second compound AI0.

As described above, an end (e.g., terminal group)_of the second compound AI0 may include a hydrophilic group $R_2$ that is capable of forming a hydrogen bond with a functional group exposed on the surfaces of the pixel electrodes 180 or the common electrode 280. This hydrogen bond formation allows the second compound AI0 to have self-alignment properties and thus be at least partially self-aligned to form a monomolecular layer, i.e., the first pre-alignment inducing layer 191' and/or the second pre-alignment inducing layer 291'.

In addition, the other end of the second compound AI0 may include a liquid crystal-affinitive group (*—SP₁—R₁) having liquid crystal-affinitive properties. Therefore, the second compound AI0 may induce vertical alignment of the liquid crystals LC in the liquid crystal layer 300. In some embodiments, when the second compound AI0 is substantially insoluble in the liquid crystals LC and forms a monomolecular layer, the liquid crystals LC in the liquid crystal layer 300 may be initially vertically aligned. In the current operation, the liquid crystals LC in the liquid crystal layer 300 may be in an unpretilted state, for example, may be perfectly vertically aligned with respect to the display, however, embodiments of the present disclosure are not limited thereto.

In some embodiments, the liquid crystal layer 300 having the vertically aligned liquid crystals LC may include the substantially uniformly dispersed reactive mesogen compound RM.

Next, the display is irradiated with light having a first peak wavelength. In some embodiments, the irradiating with light having the first peak wavelength may include irradiating a first region R1 of each of the first and second pre-alignment inducing layers 191' and 291' with oblique light having the first peak wavelength, and irradiating a second region R2 of each of the first and second pre-alignment inducing layers 191' and 291' with oblique light having the first peak wavelength.

Figure 22:
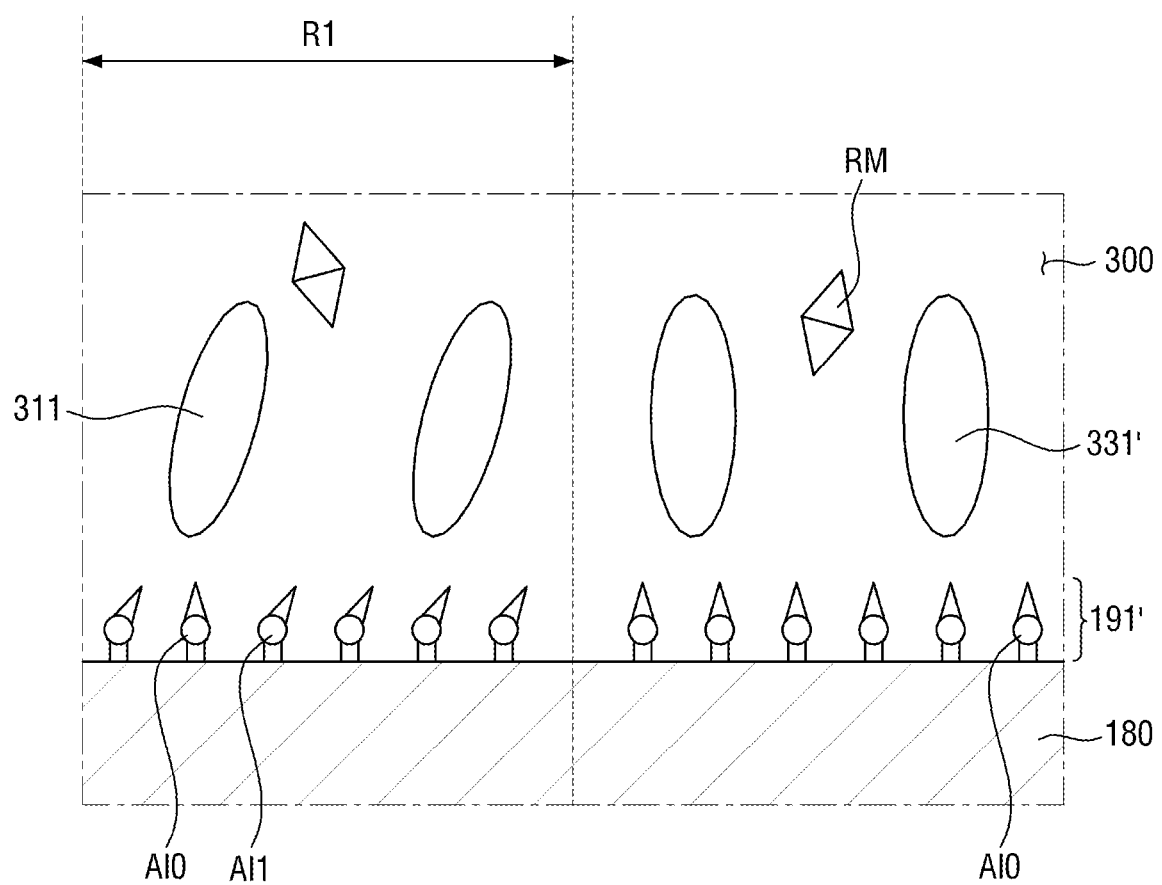

FIG. 21 is a view illustrating the operation of irradiating the first region R1 of each of the first and second pre-alignment inducing layers 191' and 291' with light having the first peak wavelength. FIG. 22 is a schematic view of the first pre-alignment inducing layer 191', and FIG. 23 is a schematic view of the second pre-alignment inducing layer 291' of FIG. 21.

Figure 23:
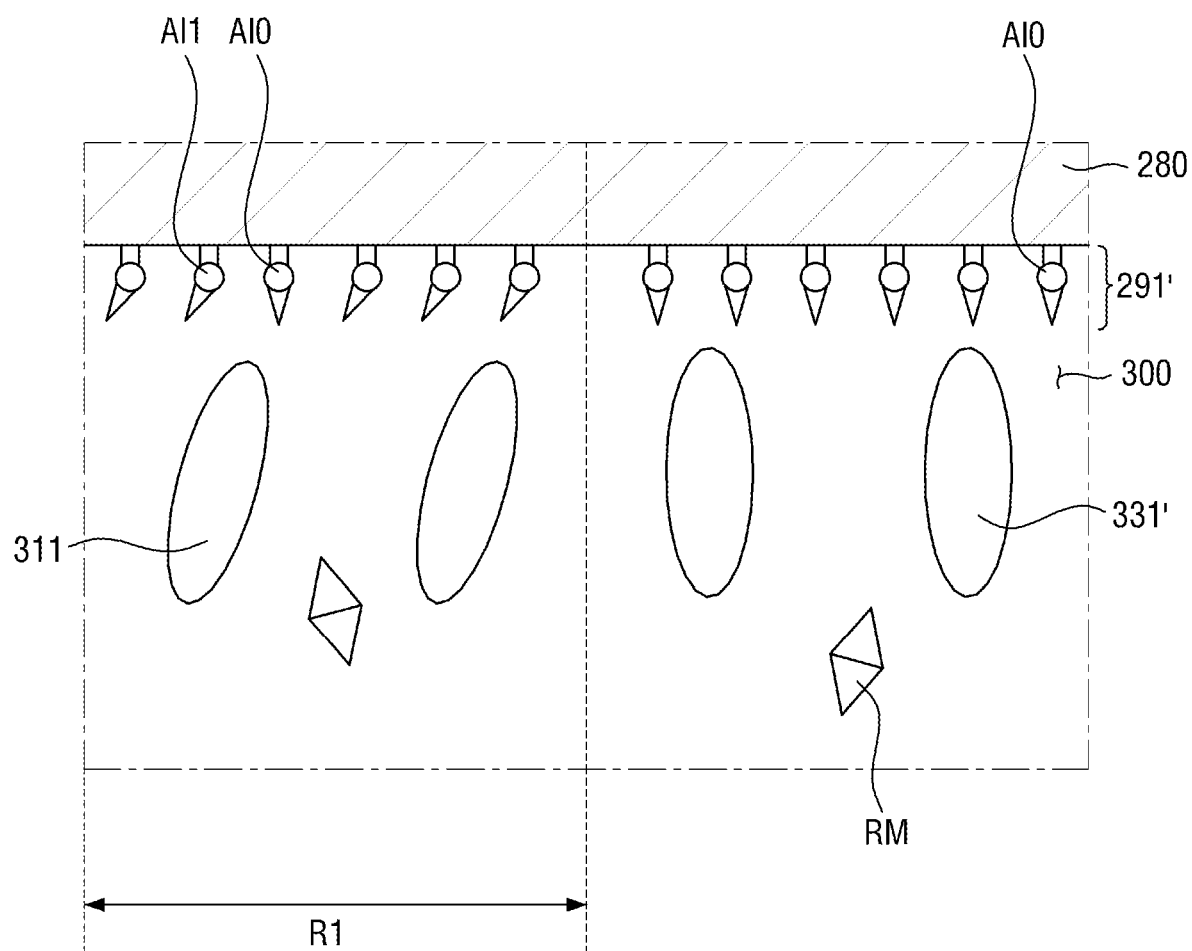

Referring to FIGS. 21 through 23, the first region R1 is irradiated with oblique light having the first peak wavelength.

The irradiating of the first region R1 with oblique light having the first peak wavelength may include partially exposing the first region R1 using a first light shielding mask M1, and irradiating with the first oblique light having the first peak wavelength. During the irradiation, at least a portion of the second compound AI0 in the first region R1 may be converted into a first compound AI1 represented by formula A1:

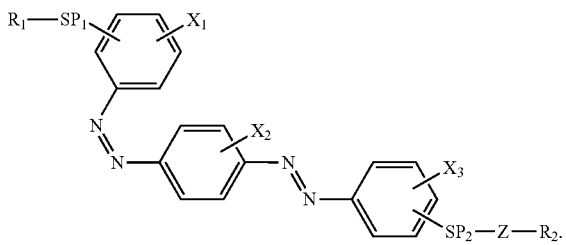

(A1)

The description, function, and chemical structure of each substituent of the first compound AI1 represented by formula A1 may be the same as described above.

For example, the first compound AI1 may be formed when the first oblique light having the first peak wavelength induces trans-cis isomerization of the second compound AI0 in the first and second pre-alignment inducing layers 191' and 291' in the first region R1. *—$SP_1$—$R_1$ of the first compound AI1 having a cis structure may thus be aligned and stabilized in a certain or selected direction. Accordingly, a pretilt may be given to liquid crystals 311 in the first region R1.

The first peak wavelength may be within a wavelength range that can induce trans-cis isomerization of an azo group on the $R_1$ side of the second compound AI0. For example, the first peak wavelength may fall within the range of about 450 nm to about 550 nm. In addition, the alignment direction of *—$SP_1$—$R_1$ of the first compound AI1 may be controlled by the inclination direction of the first oblique light.

In the current operation, the second compound AI0 in the first and second pre-alignment inducing layers 191' and 291' in other regions shielded by the first light shielding mask M1 may not be isomerized, and may thereby maintain (e.g. remain in) the trans-isomer state. For example, the liquid crystal 331' in the second region may remain vertically aligned.

Figure 24:
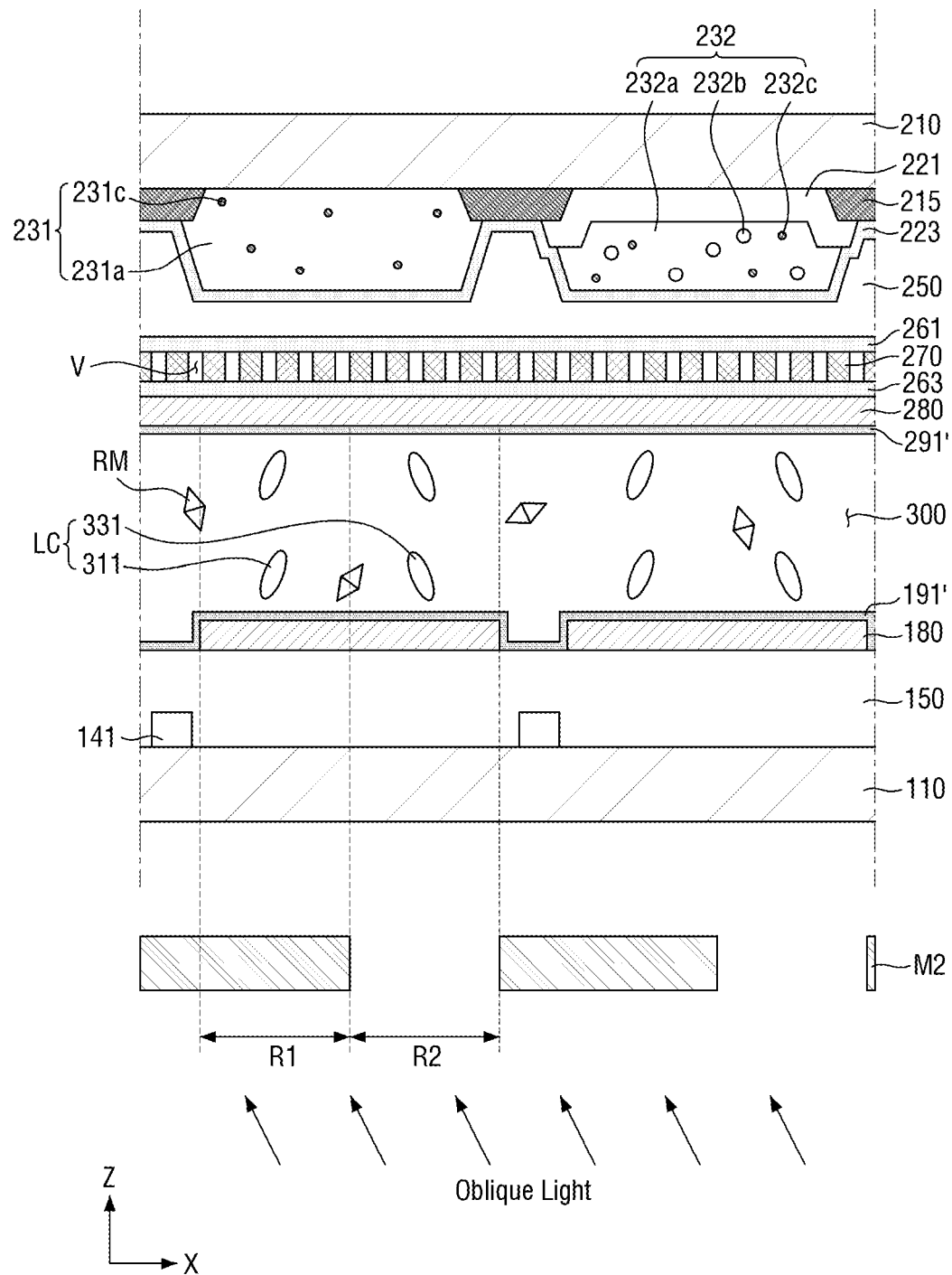
Figure 25:
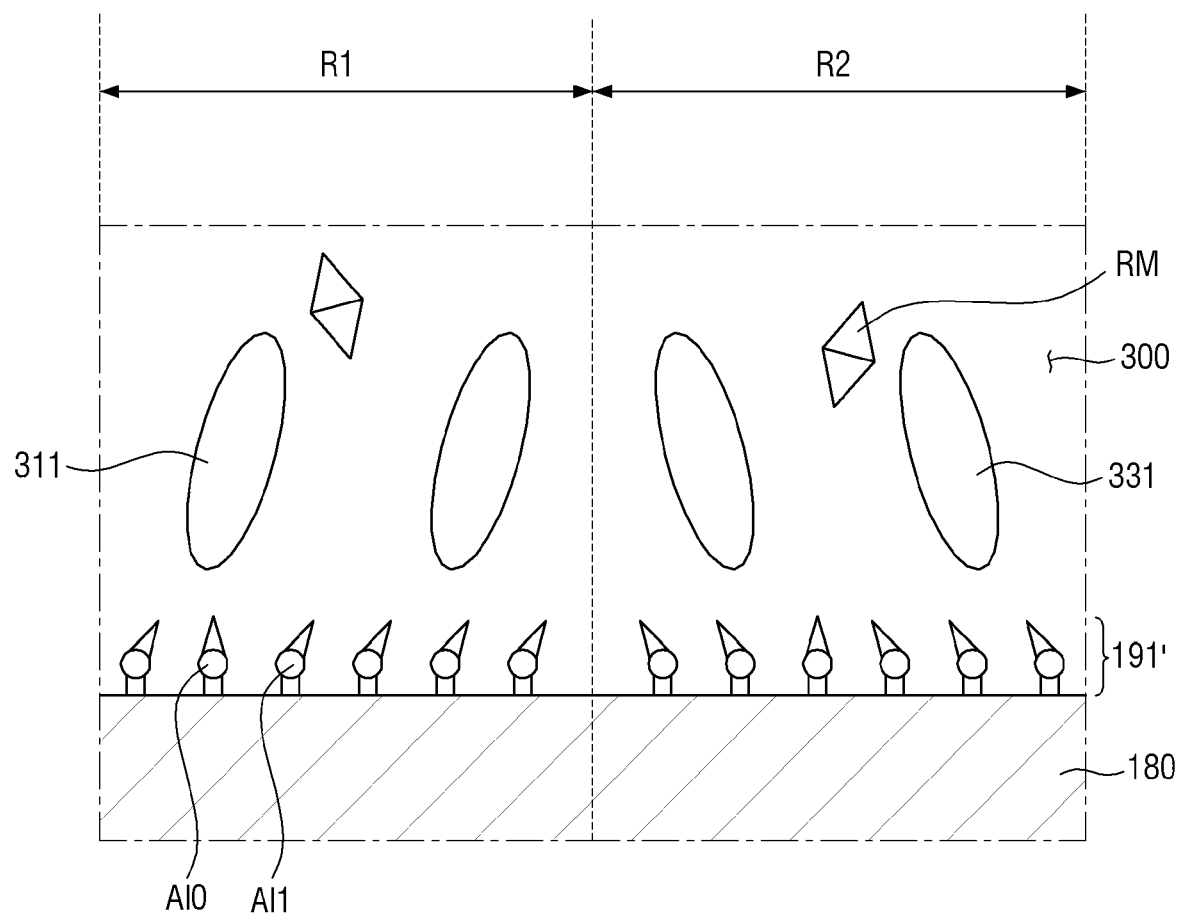

FIG. 24 is a drawing illustrating the operation of irradiating the second region R2 with light having the first peak wavelength in each of the first and second pre-alignment inducing layers 191' and 291'. FIG. 25 is a schematic view illustrating a close-up of FIG. 24 in the vicinity of the first pre-alignment inducing layer 291', and FIG. 26 is a schematic view illustrating a close-up of FIG. 24 in the vicinity of the second pre-alignment inducing layer 291'.

Figure 26:
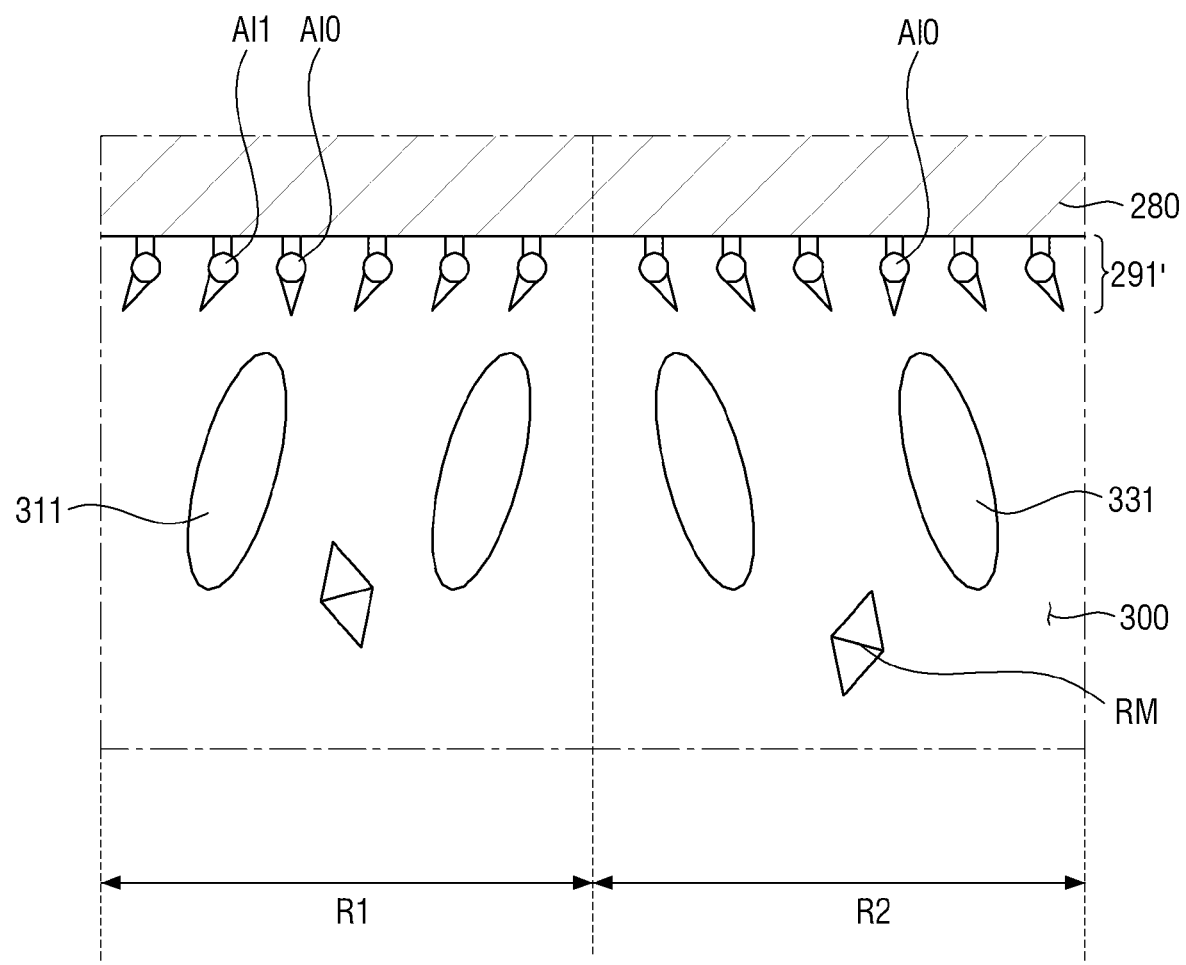

Referring to FIGS. 24 through 26, the second region R2 is irradiated with oblique light having the first peak wavelength.

The irradiating the second region R2 with oblique light having the first peak wavelength may include partially exposing the second region R2 using a second light shielding mask M2, and irradiating with the second oblique light having the first peak wavelength and an inclination direction different from that of the first oblique light. In the current operation, at least a portion of the second compound AI0 in the second region R2 may be converted into the first compound AI1.

The second oblique light having an inclination direction that is different from that of the first oblique light may cause *—$SP_1$—$R_1$ of the first compound AI1 in the second region R2 to be arranged and stabilized in a different direction from *—$SP_1$—$R_1$ of the first compound AI1 in the first region R1. Therefore, a pretilt in a direction different from that of the liquid crystals 311 in the first region R1 may be given to liquid crystals 331 in the second region R2.

In some embodiments, the liquid crystal layer 300 having the pretilted liquid crystals 311 and 331 may include the substantially uniformly dispersed reactive mesogen compound RM.

Next, light having a second peak wavelength shorter than the first peak wavelength is irradiated.

Figure 27:
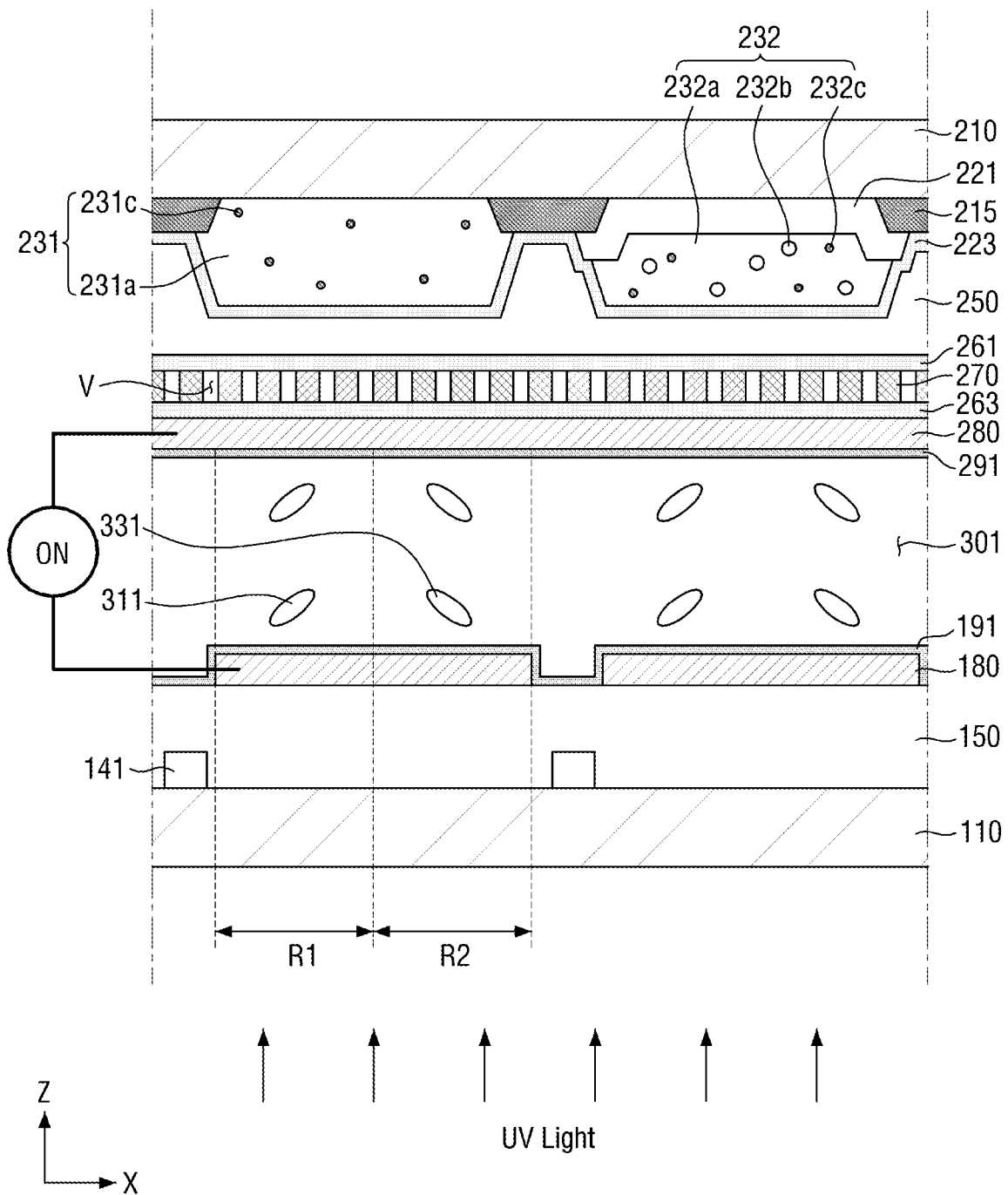
Figure 28:
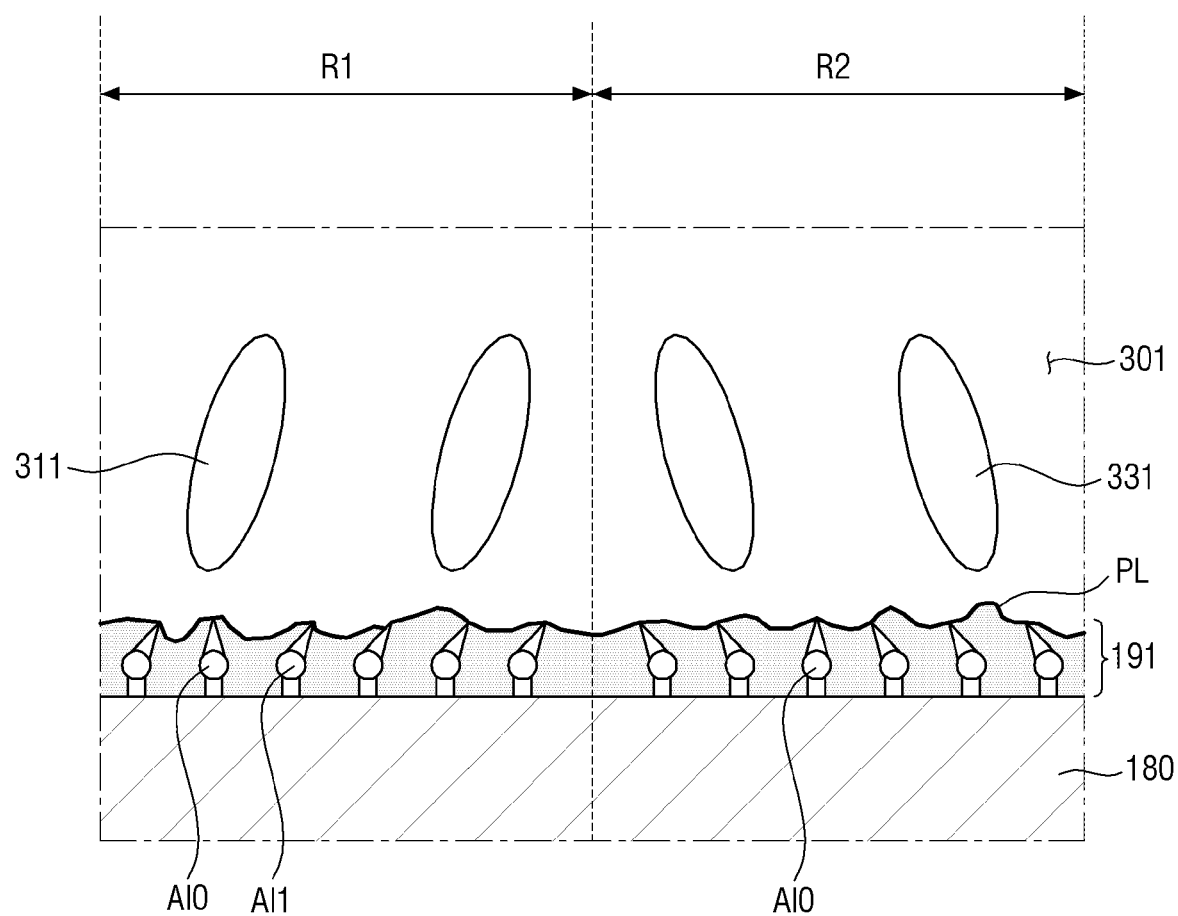
Figure 29:
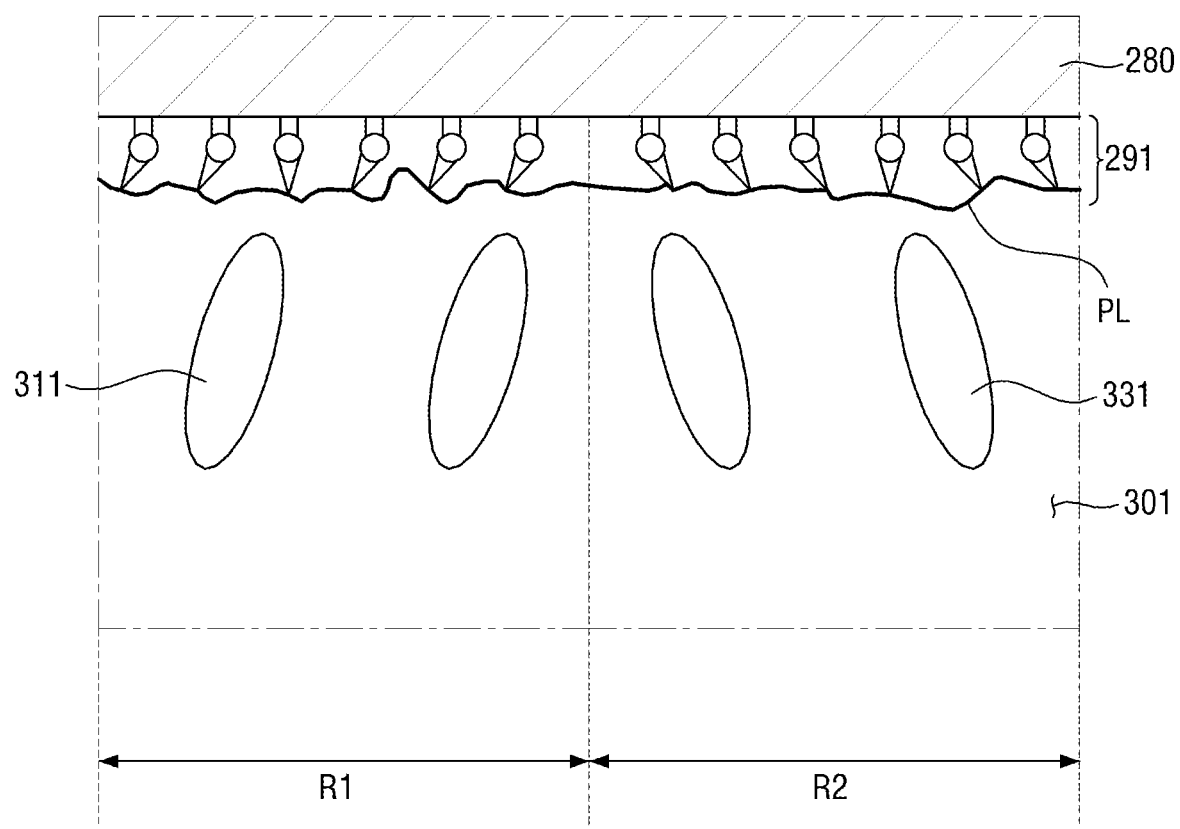

FIG. 27 is a view illustrating the operation of irradiating light having the second peak wavelength. FIG. 28 is a schematic view illustrating a close-up of FIG. 27 in the vicinity of a first alignment inducing layer 191, and FIG. 29 is a schematic view illustrating a close-up of FIG. 27 in the vicinity of a second alignment inducing layer 291.

In some embodiments, the irradiating with the light having the second peak wavelength may include irradiating with ultraviolet light in a state where an electric field has been formed in the liquid crystal layer 301.

When the liquid crystals 311 and 331 in the liquid crystal layer 301 have negative dielectric anisotropy, if an electric field is formed in the liquid crystal layer 301, the liquid crystals 311 and 331 may be rearranged such that long axes of the liquid crystals 311 and 331 are aligned in a direction intersecting (e.g., perpendicular to) the direction of the electric field.

In addition, when the light having the second peak wavelength is irradiated, at least a portion of the first compound AI1 in the pre-alignment inducing layers, at least a portion of the second compound AI0 in the pre-alignment inducing layers and/or at least a portion of a reactive mesogen compound in the liquid crystal layer 301 may form a polymer PL, thereby forming the first alignment inducing layer 191 and the second alignment inducing layer 291. Accordingly, the arrangement state of the first compound AI1 and the second compound AI0 and the pretilt of the liquid crystals LC in the liquid crystal layer 301 may be stabilized. For example, the polymer PL of each of the first alignment inducing layer 191 and the second alignment inducing layer 291 may contribute to the stabilization of the pretilt of the liquid crystals 311 and 331.

In the method of manufacturing an LCD according to the current embodiment, a pre-alignment inducing layer may be formed using an alignment inducing compound having two azo groups, (for example, the second compound AI0 represented by the above-described formula B2) when each region of the pre-alignment inducing layer is irradiated with light having a different inclination from the light used in other regions. As a result, a plurality of domains having different pretilt directions can be formed in one pixel.

The domains are divided not by the shapes of the pixel electrode 180 and the common electrode 280, but by the first alignment inducing layer 191 and the second alignment inducing layer 291 that induce the alignment of the liquid crystals LC in the liquid crystal layer 301. Therefore, the domains can be freely formed regardless of the shapes and arrangement of the pixel electrode 180 and the common electrode 280. However, embodiments of the present disclosure are not limited thereto.

Figure 30:
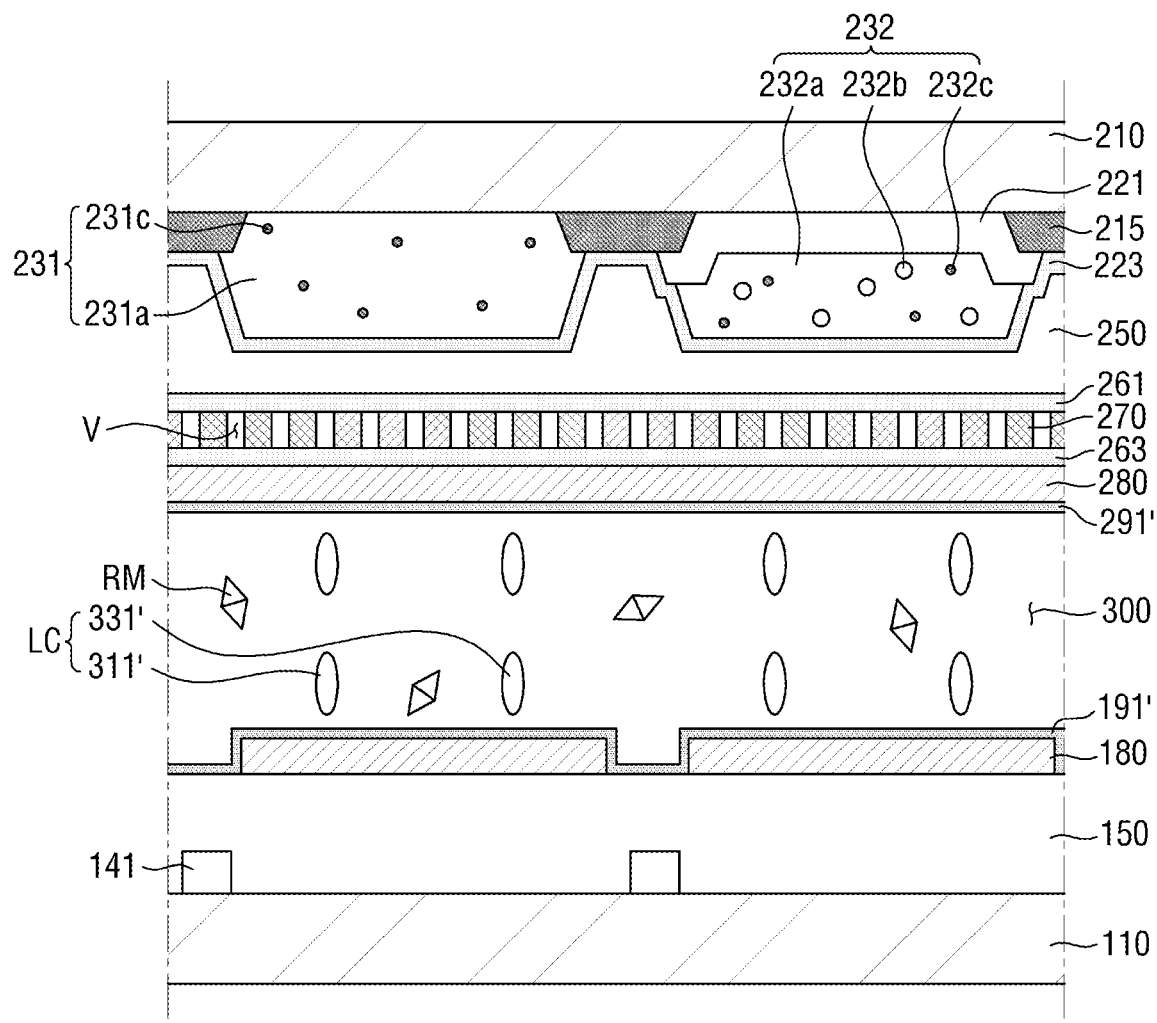
FIGS. 30 through 32 are views illustrating a method of manufacturing an LCD according to an embodiment of the present disclosure.
Figure 31:
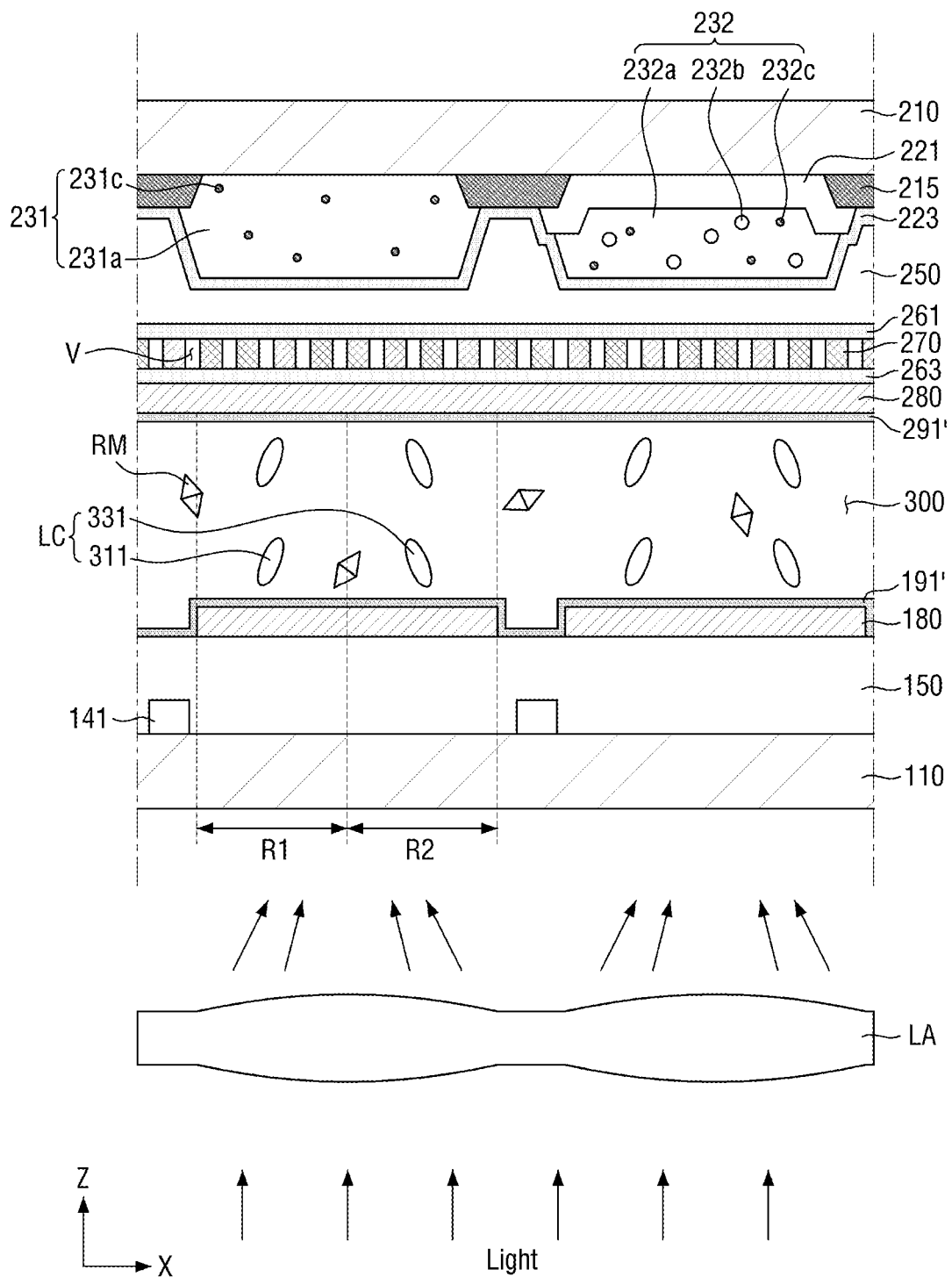
Figure 32:
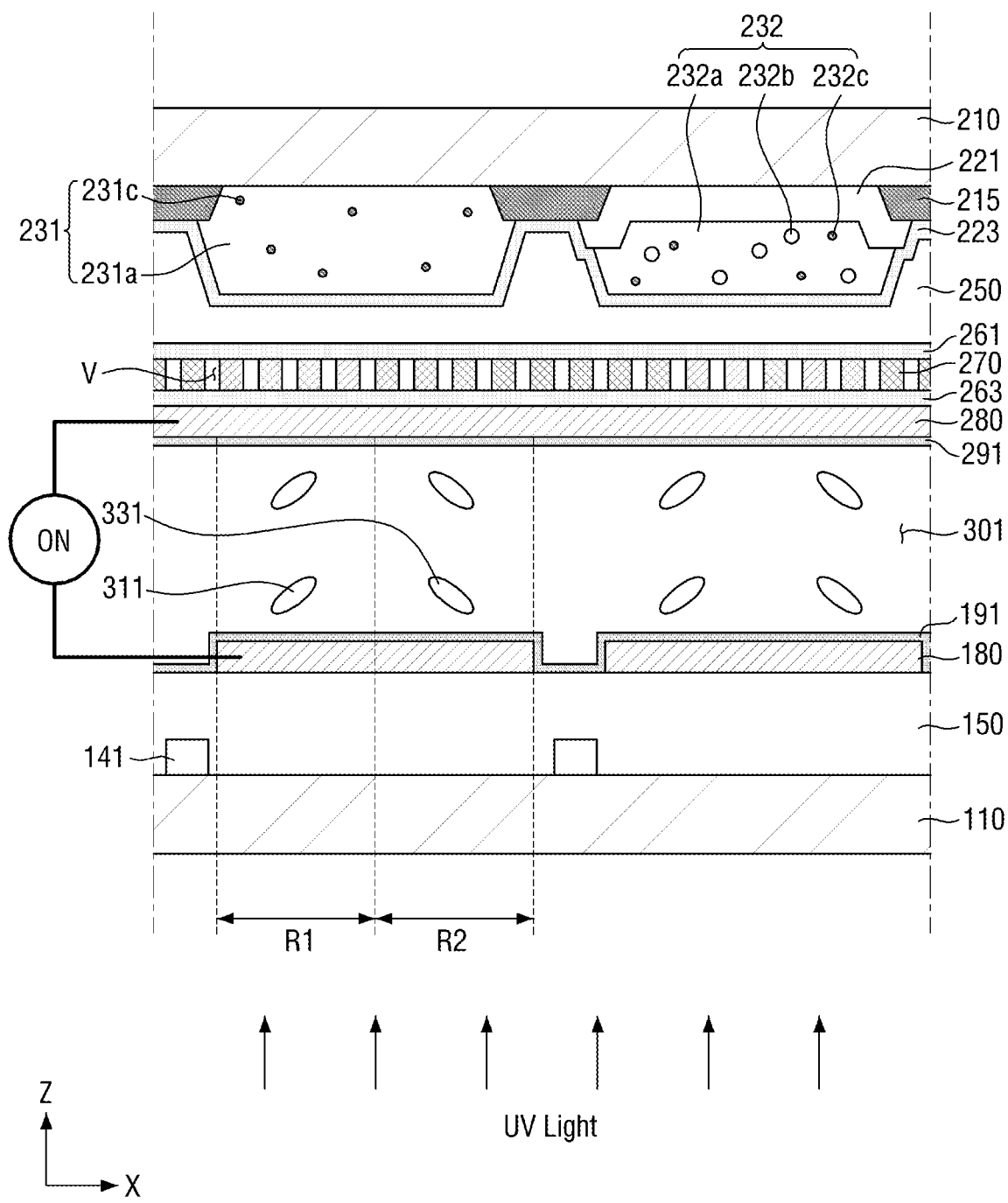

FIGS. 30 through 32 are drawings illustrating a method of manufacturing an LCD according to an embodiment of the present disclosure.

Referring to FIG. 30, a first pre-alignment inducing layer 191', a second pre-alignment inducing layer 291', and a liquid crystal layer 300 are formed, including vertically aligned liquid crystals LC 311' and 331'. The operation may be similar to that described above.

Referring to FIG. 31, light having a first peak wavelength is irradiated. In some embodiments, the irradiating of the light having the first peak wavelength may include irradiating the first and second pre-alignment inducing layers 191' and 291' with light having the first peak wavelength using a lens array LA.

In some embodiments, the light having the first peak wavelength may be at least partially condensed and converted into oblique light by the lens array LA. For example, a portion of the light that passes through the lens array LA may be incident on the first region R1 at an angle (e.g., a first angle), and the other portion (e.g., another) of the light that passes through the lens array LA may be incident on the second region R2 at another angle (e.g., a second angle different from the first angle).

In the method of manufacturing an LCD according to the current embodiment, the lens array LA may be used to irradiate light having different angles of inclination to the first region R1 and the second region R2 of each of the first and second pre-alignment inducing layers 191' and 291' during one exposure. Therefore, a plurality of domains having different pretilt directions can be formed in one pixel PX1 or PX2.

In FIG. 31, the lens array LA includes a plurality of convex lenses to form oblique light proceeding toward the center of each pixel. However, in some embodiments, oblique light proceeding toward the periphery of each pixel can also be formed using the convex lenses. In some embodiments, the lens array LA may include concave lenses.

Referring to FIG. 32, light having a second peak wavelength shorter than the first peak wavelength is irradiated to stabilize the pretilt of the first alignment inducing layer 191, the second alignment inducing layer 291, and the liquid crystals LC. The operation may be substantially the same as described above.

FIGS. 33 through 38 are drawings illustrating a method of manufacturing an LCD according to an embodiment of the present disclosure.

Figure 33:
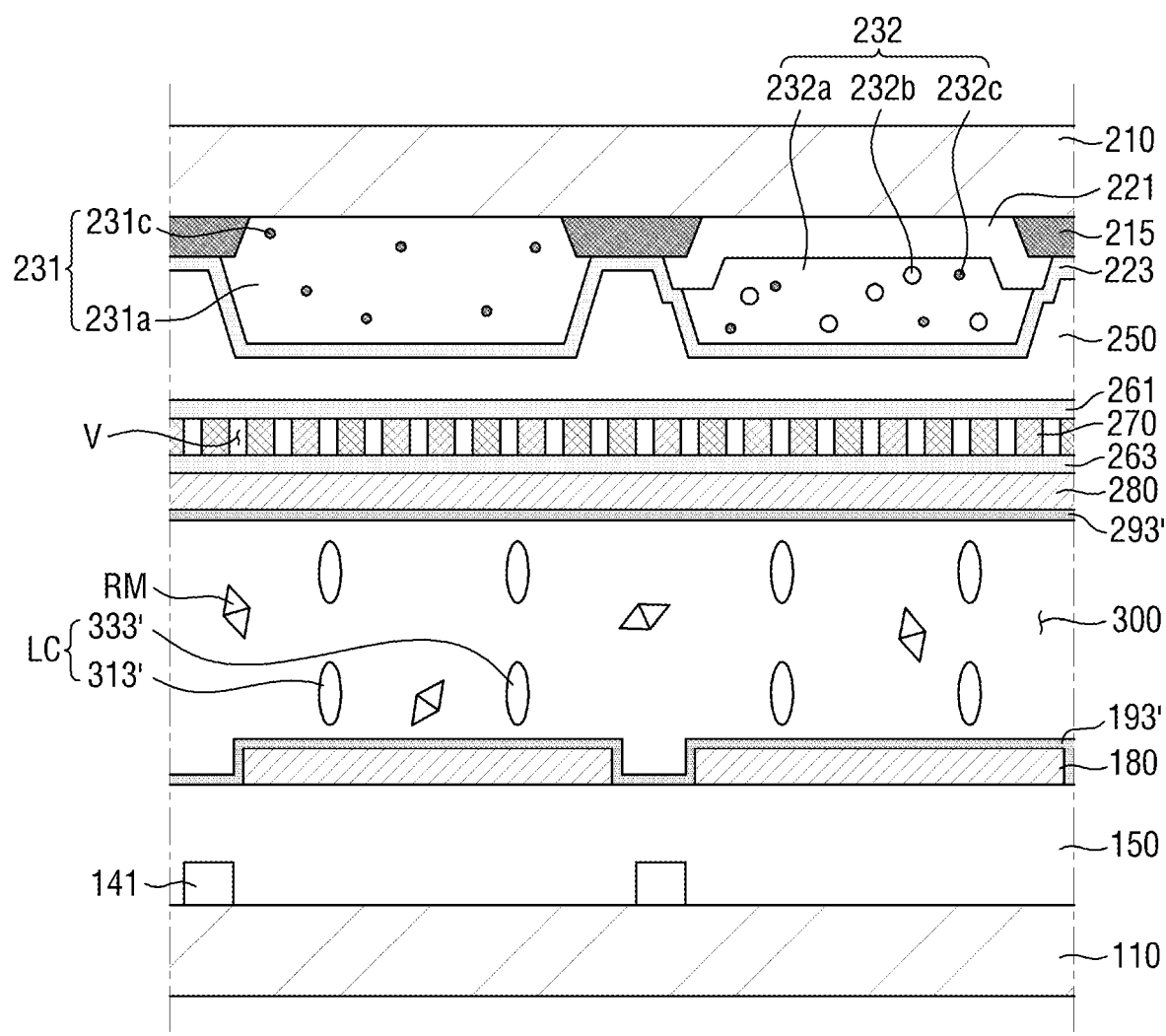
FIGS. 33 through 38 are views illustrating a method of manufacturing an LCD according to an embodiment of the present disclosure.

Referring to FIG. 33, a first pre-alignment inducing layer 193', a second pre-alignment inducing layer 293', and a liquid crystal layer 300 including vertically aligned liquid crystals 313' and 333' are formed. The operation may be substantially the same as described above.

Next, light having a first peak wavelength is irradiated. In some embodiments, the irradiating of the light having the first peak wavelength may include irradiating the first region R1 and the third region R3 of each of the first and second pre-alignment inducing layer 193' and 293' with polarized light having the first peak wavelength, and irradiating the second region R2 and the fourth region R4 of each of the first and second pre-alignment inducing layers 193' and 293' with polarized light having the first peak wavelength.

Figure 34:
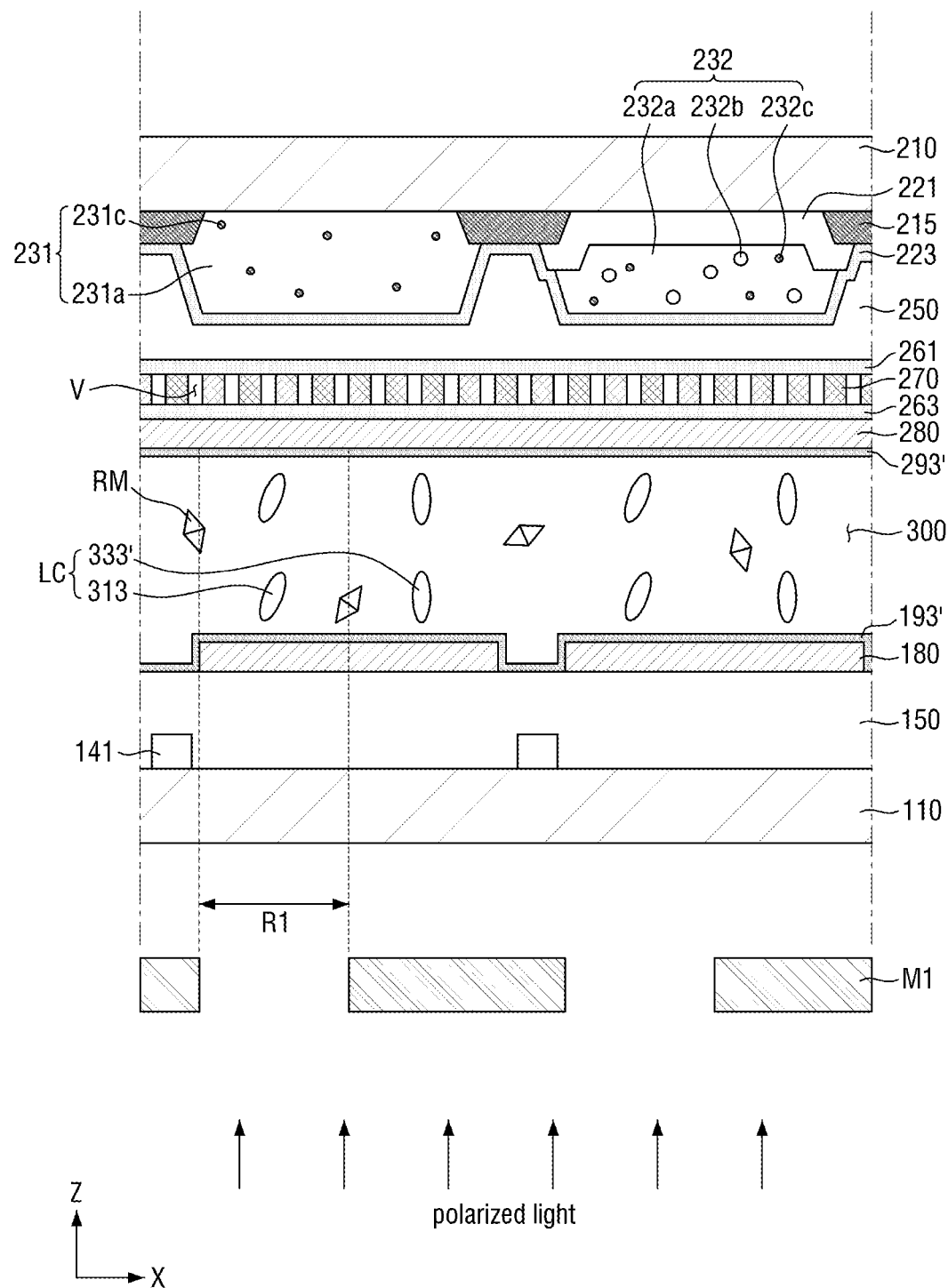
Figure 35:
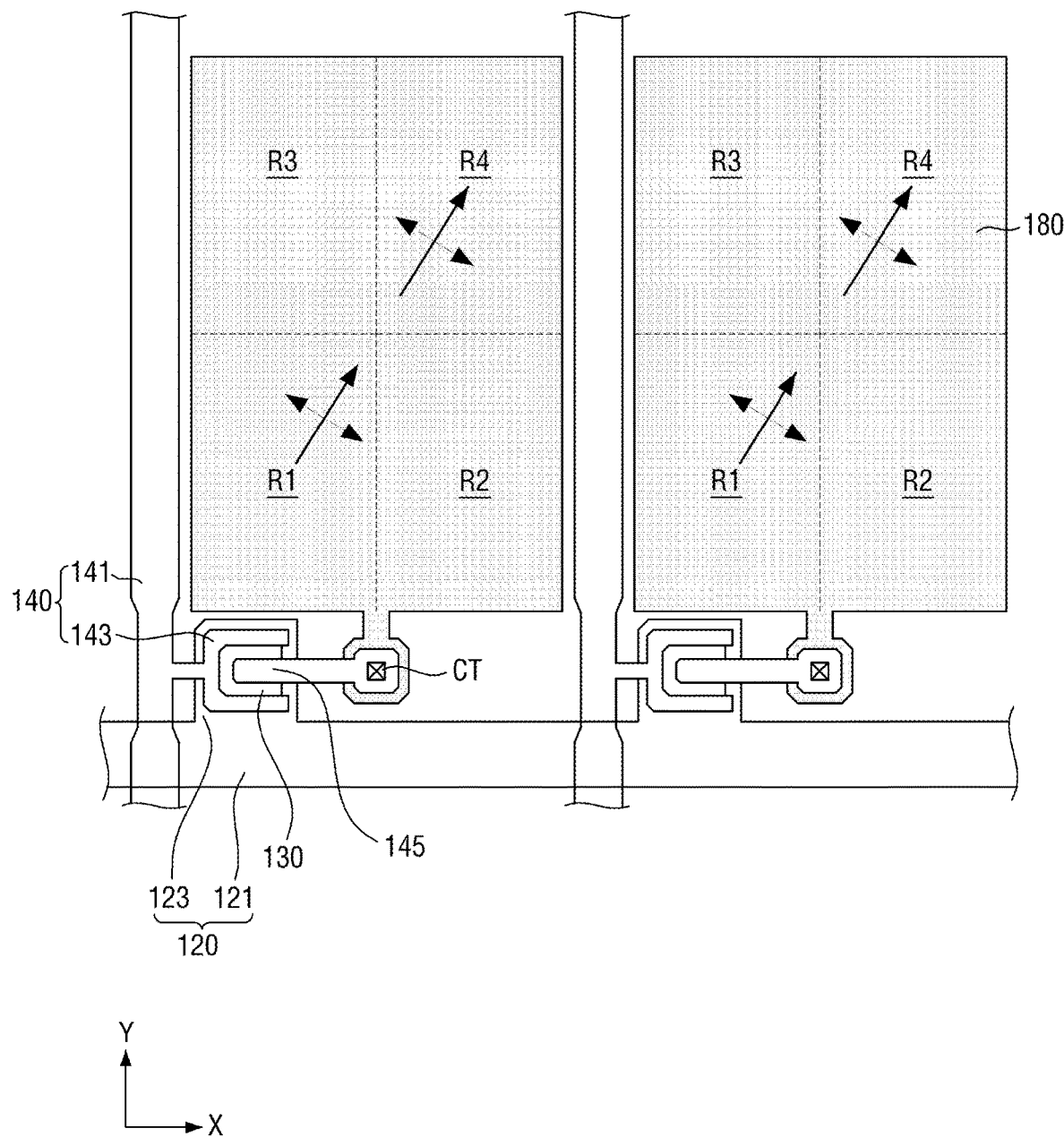

FIG. 34 is a cross-sectional view illustrating the operation of irradiating the first region R1 and the third region R3 of each of the first and second pre-alignment inducing layers 193' and 293' with light having the first peak wavelength. FIG. 35 is a plan view corresponding to FIG. 34.

Referring to FIGS. 34 and 35, polarized light having the first peak wavelength is irradiated to the first region R1 and the third region R3.

The irradiating the first region R1 and the third region R3 with the polarized light having the first peak wavelength may include partially exposing the first region R1 and the third region R3 using a first light shielding mask M1, and irradiating first polarized light having the first peak wavelength. In the current operation, at least a portion of a second compound in the first region R1 and the third region R3 may be converted into a first compound.

The first polarized light having the first peak wavelength may induce trans-cis isomerization of the second compound, thereby forming the first compound in the first and second pre-alignment inducing layers 193' and 293' in the first region R1 and the third region R3. Accordingly, a pretilt may be given to liquid crystals 313 in the first region R1 and the third region R3. In addition, the alignment direction of *—$SP_1$—$R_1$ of the first compound can be controlled by the polarization direction of the first polarized light. For example, the alignment direction of *—$SP_1$—$R_1$ of the first compound may be substantially perpendicular to the polarization direction of the first polarized light.

In the current operation, the second compound of the first and second pre-alignment inducing layers 191' and 291' in other regions shielded by the first light shielding mask M1 may not be isomerized and may maintain the trans-isomer state.

In some embodiments, the angle of inclination of the first polarized light irradiated to the first region R1 may be different from that of the first polarized light irradiated to the third region R3.

Figure 36:
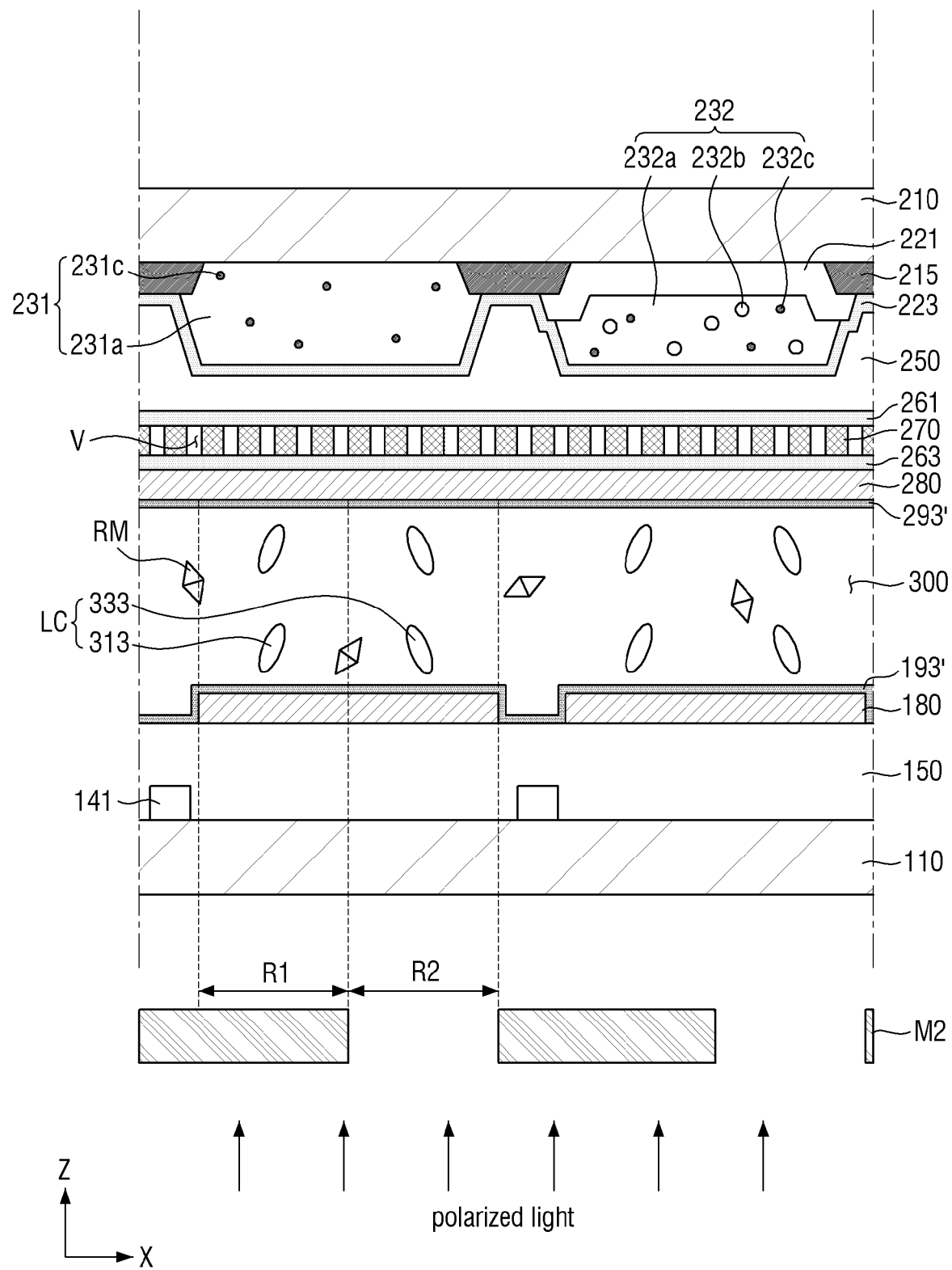
Figure 37:
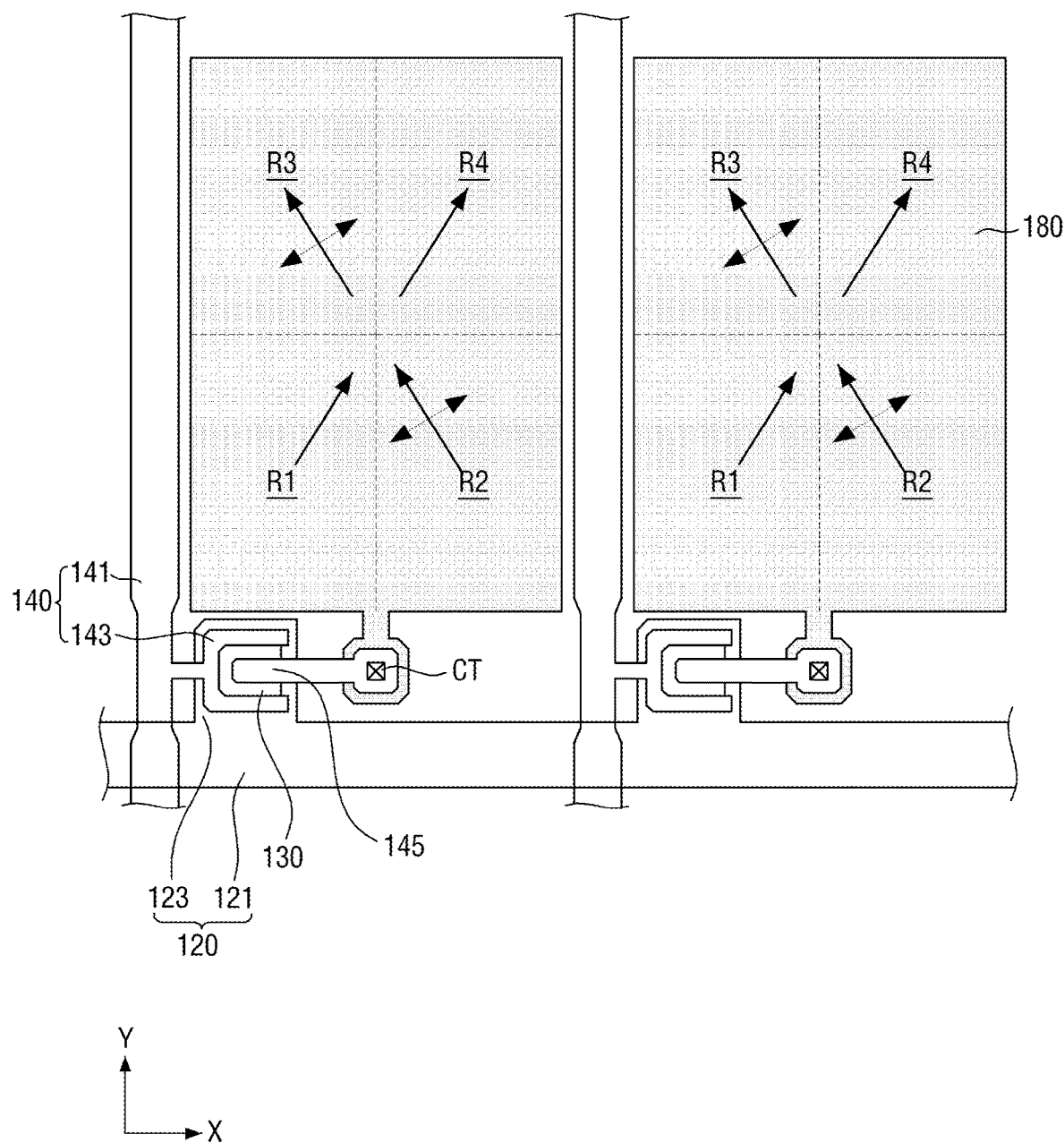

FIG. 36 is a cross-sectional view illustrating the operation of irradiating light having the first peak wavelength to the second region R2 and the fourth region R4 of each of the first and second pre-alignment inducing layers 193' and 293'. FIG. 37 is a plan view corresponding to FIG. 36.

Referring to FIGS. 36 and 37, polarized light having the first peak wavelength is irradiated to the second region R2 and the fourth region R4.

The irradiating of the polarized light having the first peak wavelength to the second region R2 and the fourth region R4 may include partially exposing the second region R2 and the fourth region R4 using a second light shielding mask M2 and irradiating second polarized light having the first peak wavelength and a different polarization direction from the first polarized light. In this operation, at least a portion of the second compound in the second region R2 and the fourth region R4 may be converted into the first compound.

The second polarized light having a different polarization direction from the first polarized light may cause *—$SP_1$—$R_1$ of the first compound in the second region R2 and the fourth region R4 to be arranged and stabilized in a direction different from the direction of *—$SP_1$—$P_1$ of the first compound in the first region R1 and the third region R3. Accordingly, a pretilt in a direction different from that of the liquid crystals 313 in the first region R1 and the third region R3 can be given to liquid crystals 333 in the second region R2 and the fourth region R4.

In the method of manufacturing an LCD according to the current embodiment, since polarized light having a different polarization direction is irradiated to each of the first through fourth regions R1 through R4 of the first and second pre-alignment inducing layers 193' and 293', a plurality of domains having different pretilt directions can be formed within one pixel.

Figure 38:
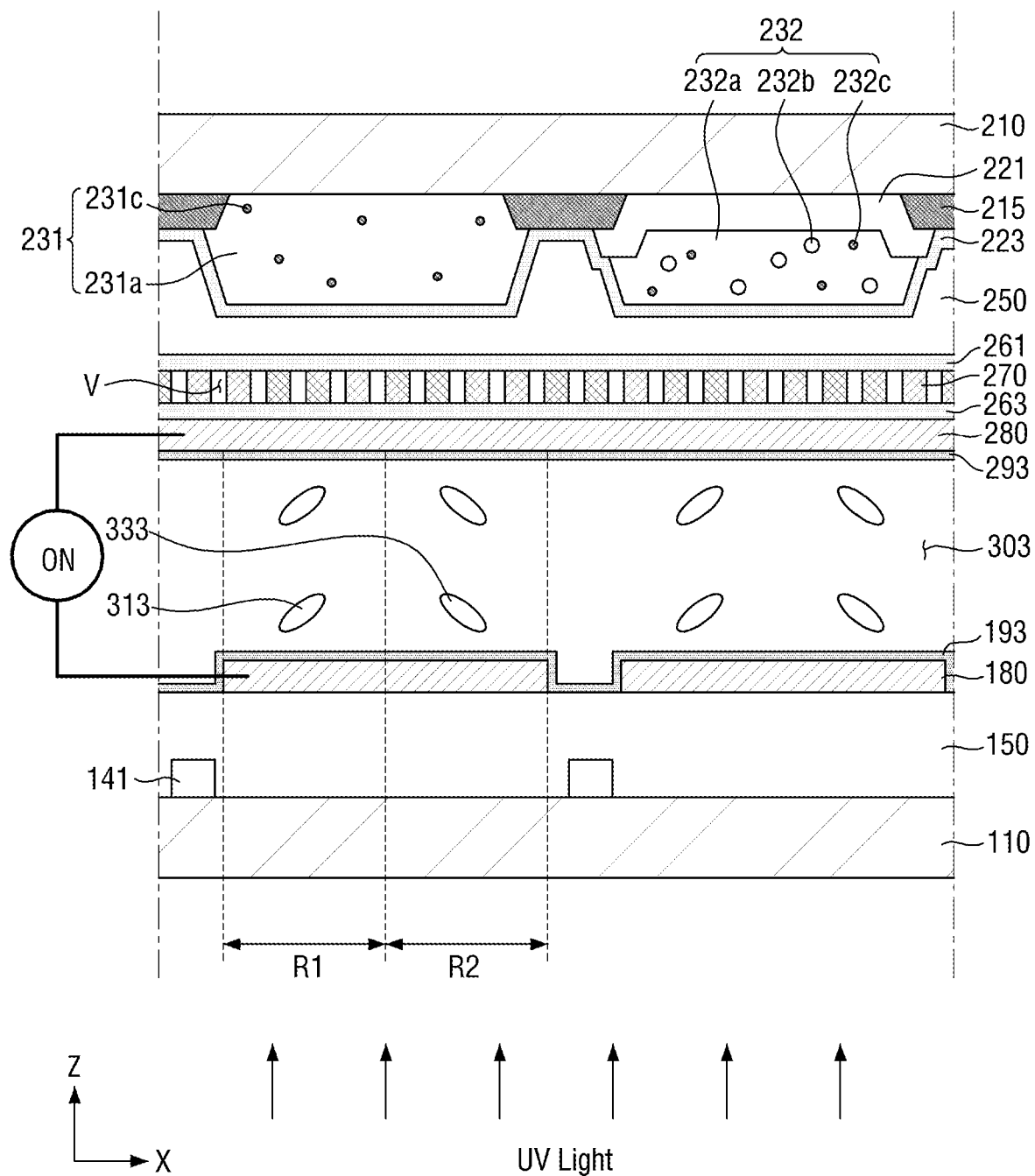

Referring to FIG. 38, light having a second peak wavelength shorter than the first peak wavelength is irradiated to stabilize the pretilt of the first alignment inducing layer 193, the second alignment inducing layer 293, and the liquid crystals LC. The operation may be substantially the same as described above.

FIGS. 39 through 42 are drawings illustrating a method of manufacturing an LCD according to an embodiment of the present disclosure.

Figure 39:
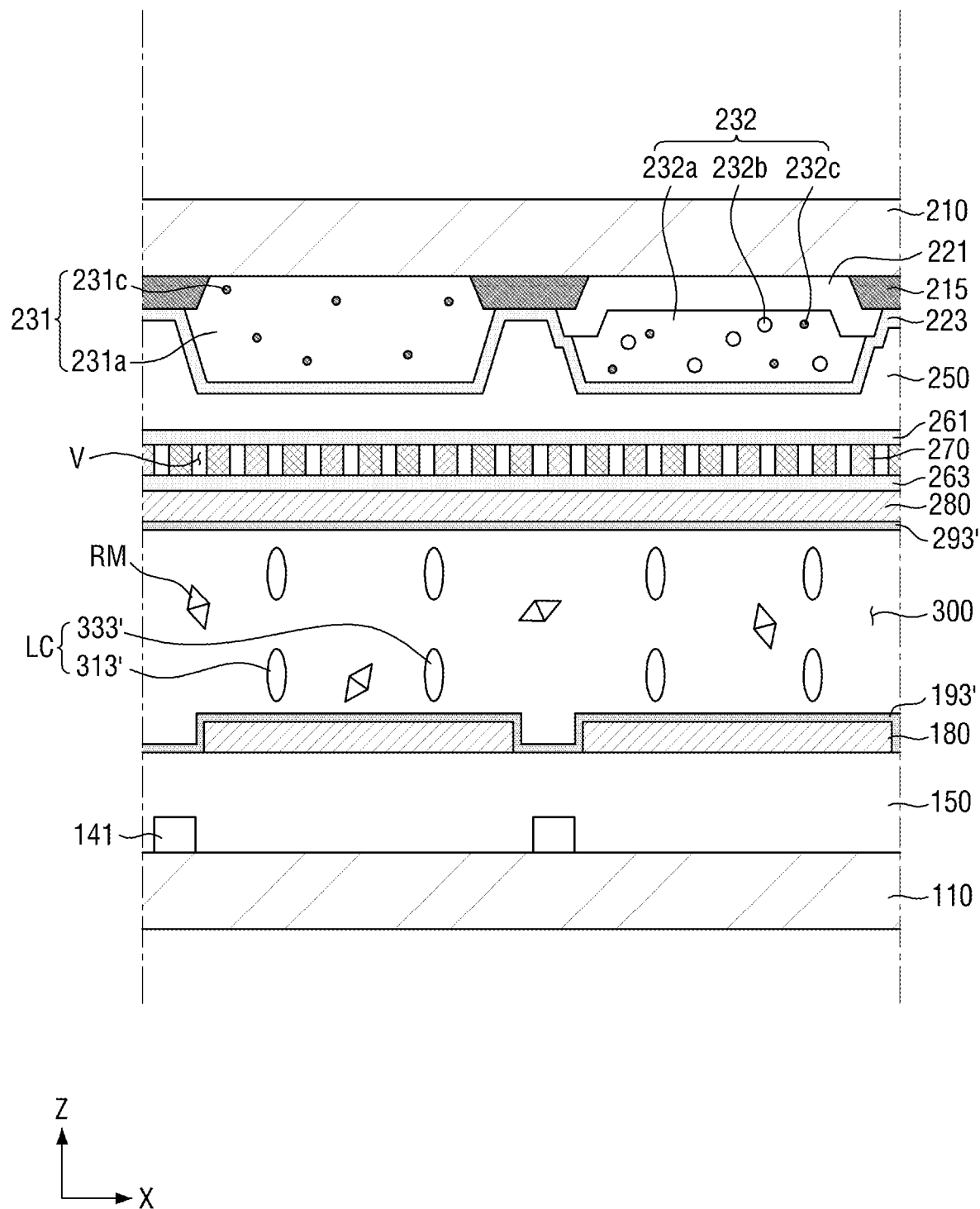
FIGS. 39 through 42 are views illustrating a method of manufacturing an LCD according to an embodiment of the present disclosure.

Referring to FIG. 39, a first pre-alignment inducing layer 193', a second pre-alignment inducing layer 293', and a liquid crystal layer 300 including liquid crystals LC 313' and 333' are formed. The operation may be substantially the same as described above.

Figure 40:
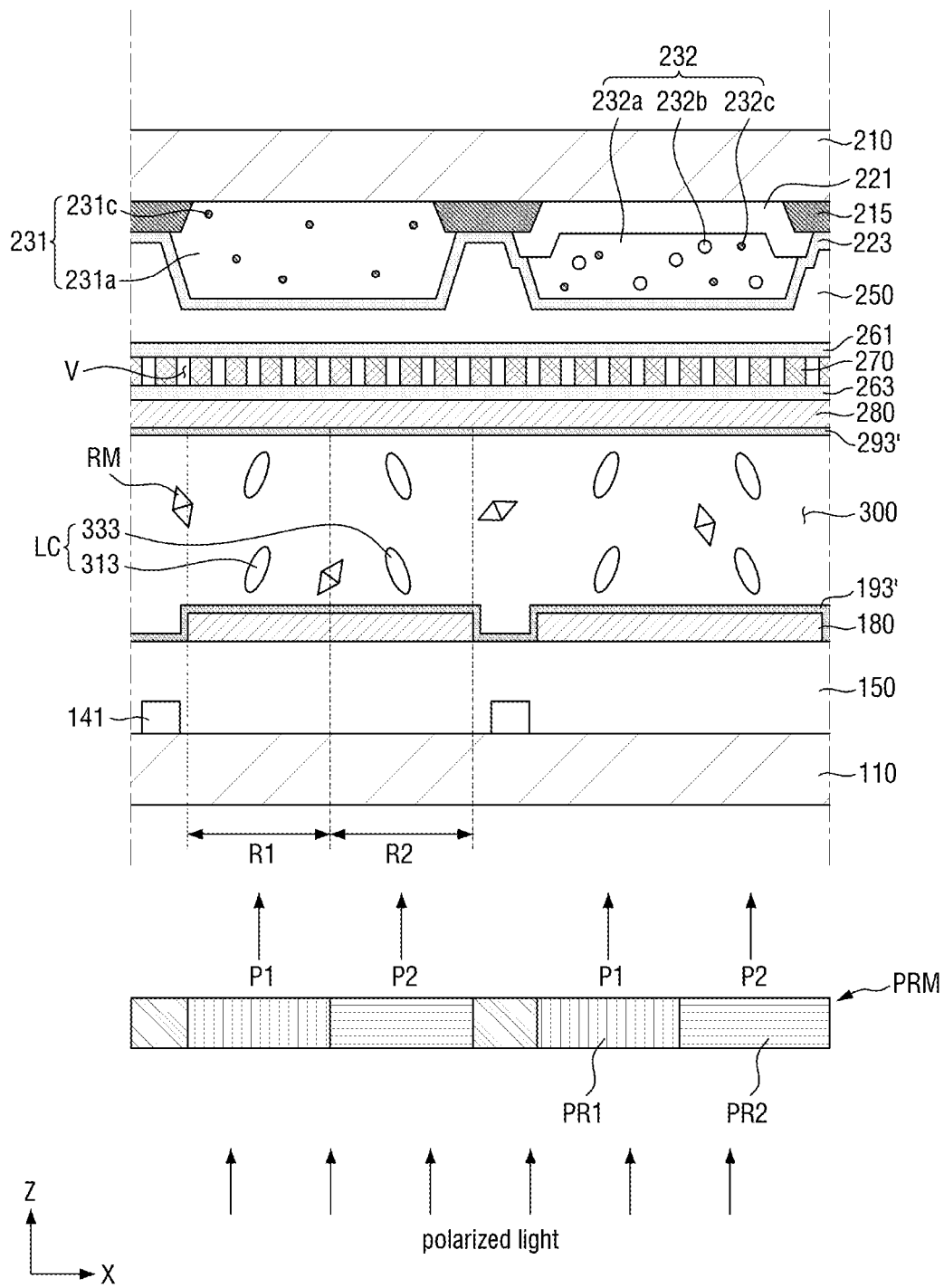
Figure 41:
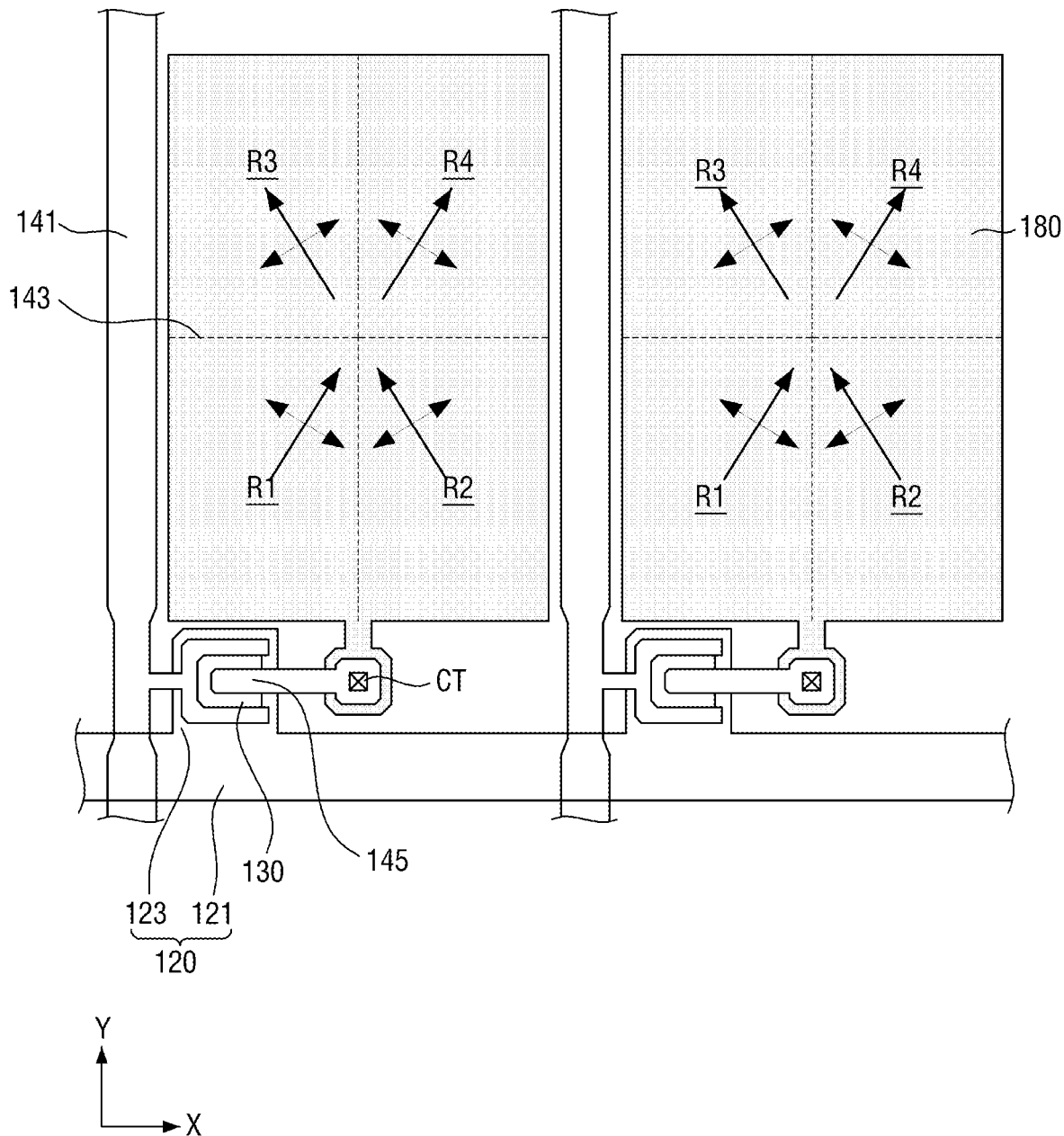

FIG. 40 is a cross-sectional view illustrating an operation of irradiating light having a first peak wavelength to the first and second pre-alignment inducing layers 193' and 293', and FIG. 41 is a plan view corresponding to FIG. 40.

Referring to FIGS. 40 and 41, light having the first peak wavelength is irradiated. In some embodiments, the irradiating of the light having the first peak wavelength may be an operation of irradiating polarized light having the first peak wavelength to the first and second pre-alignment inducing layer 193' and 293' using a phase delay pattern mask PRM.

In an embodiment, the polarization direction of polarized light incident on a first phase delay pattern PR1 of the phase delay pattern mask PRM may be rotated to form first polarized light P1. The first polarized light P1 having the first peak wavelength may induce trans-cis isomerization of the second compound to thereby from the first compound in the first and second pre-alignment inducing layers 193' and 293' in a first region R1 and a third region R3. Accordingly, a pretilt can be given to liquid crystals 313 in the first region R1 and the third region R3.

In addition, the polarization direction of the polarized light incident on a second phase delay pattern PR2 of the phase delay pattern mask PRM may be rotated to form second polarized light P2 having a polarization direction different from that of the first polarized light P1. The second polarized light P2 having the first peak wavelength may induce trans-cis isomerization of the second compound to thereby form the first compound in the first and second pre-alignment inducing layers 193' and 293' in a second region R2 and a fourth region R4. Accordingly, a pretilt can also be given to liquid crystals 333 in the second region R2 and the fourth region R4.

In the method of manufacturing an LCD according to the current embodiment, light having a different polarization direction is irradiated to each of the first through fourth regions R1 through R4 of the first and second pre-alignment inducing layers 193' and 293' within a single exposure using the phase delay pattern mask PRM. Therefore, a plurality of domains having different pretilt directions can be formed in one pixel.

Figure 42:
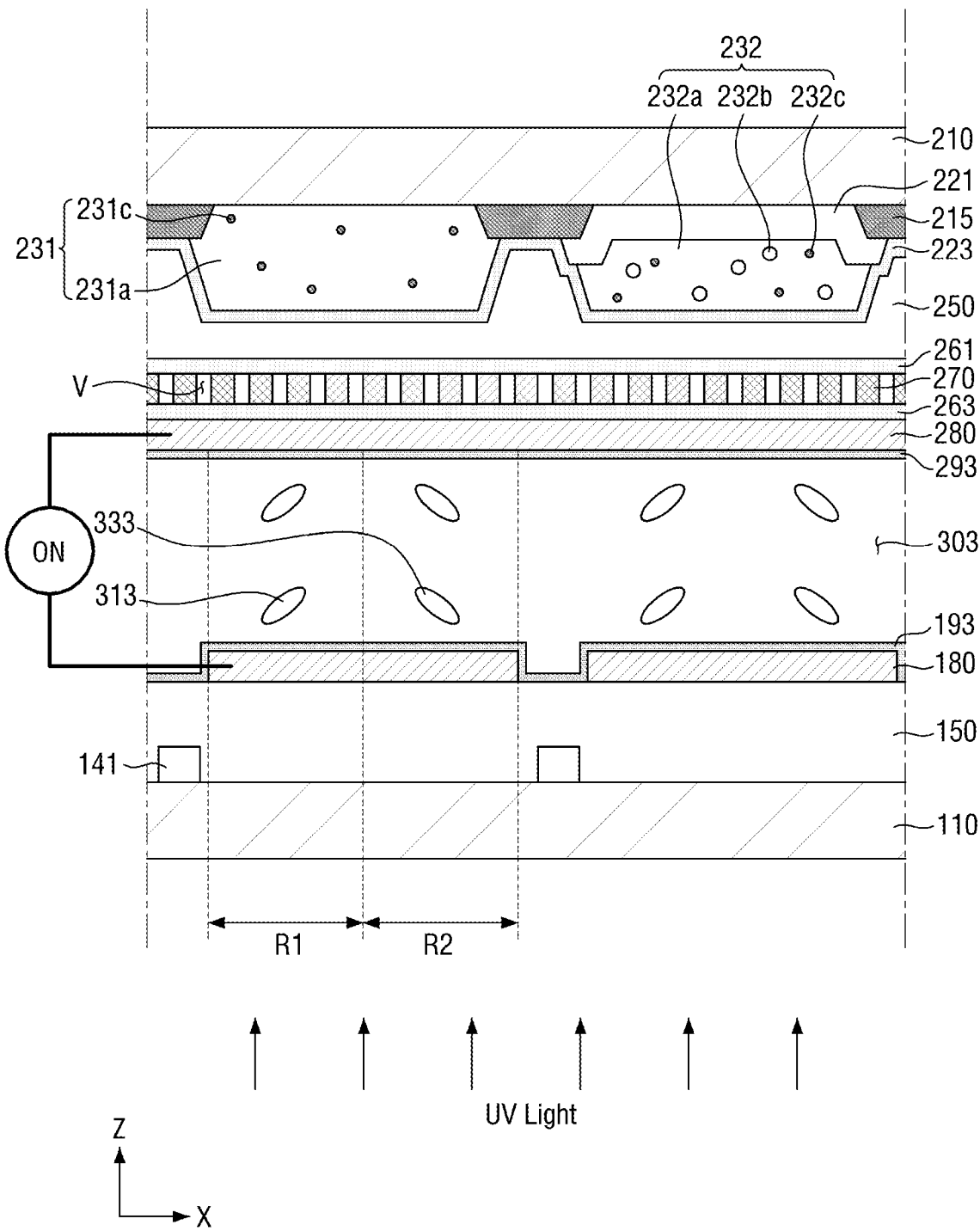

Referring to FIG. 42, light having a second peak wavelength shorter than the first peak wavelength is irradiated to stabilize the pretilt of a first alignment inducing layer 193, a second alignment inducing layer 293 and liquid crystals LC. Since this operation has been described above, a redundant description thereof is omitted.

An LCD according to an embodiment of the present disclosure may have improved viewing angle and response speed characteristics even without domain division portions being formed in a field generating electrode because an alignment inducing layer itself functions as the domain division portions.

In a method of manufacturing an LCD according to an embodiment of the present disclosure, a plurality of domains may be formed in one pixel, and liquid crystals in each domain may be made to have a pretilt in a different direction.

However, the effects of the embodiments are not restricted to the one set forth herein. The above and other effects of the embodiments will become more apparent to one of daily skill in the art to which the embodiments pertain by referencing the claims.

As used herein, expressions such as "at least one of", "one of", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the present disclosure has been particularly illustrated and described with reference to example embodiments thereof, it will be understood by those of ordinary skill in the art that various changes in form and detail may be made therein without departing from the spirit and scope of the present disclosure as defined by the following claims and equivalents thereof. The example embodiments should be considered in a descriptive sense only and not for purposes of limitation.

What is claimed is:

1. A liquid crystal display device (LCD) comprising:
   a base;
   an alignment inducing layer on the base and comprising a first compound represented by formula A1 or a polymer of the first compound; and
   a liquid crystal layer on the alignment inducing layer and comprising liquid crystals:

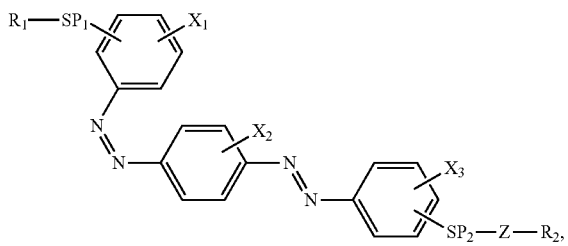

(A1)

where $R_1$ is hydrogen or a polymenzable group,
$R_2$ is a monovalent hydrophilic group selected from

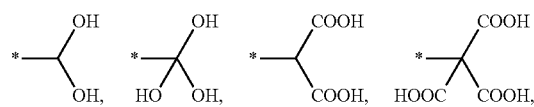

-continued

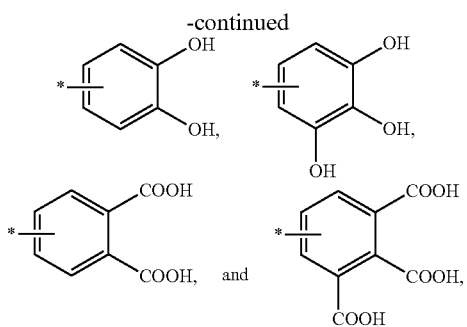

SP$_1$ is a single bond, a C$_1$-C$_{12}$ alkylene group, or a C$_1$-C$_{12}$ alkoxylene group, SP$_2$ is a single bond, a C$_3$-C$_{12}$ alkylene group, or a C$_1$-C$_{12}$ alkoxylene group, Z is a single bond, an ester group, or an ether group, and X$_1$, X$_2$ and X$_3$ are each independently hydrogen, a methyl group, fluorine, or chlorine.

2. The LCD of claim 1, wherein the alignment inducing layer further comprises a second compound represented by formula B1 or a polymer of the second compound:

(B1)

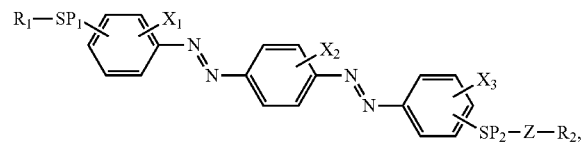

where R$_1$, R$_2$, SP$_1$, SP$_2$, Z, X$_1$, X$_2$, and X$_3$ are each independently the same as defined in formula A1.

3. The LCD of claim 2, wherein the solubility of the second compound in the liquid crystals is less than about 0.01% by weight.

4. The LCD of claim 1,
wherein the alignment inducing layer is in contact with the liquid crystal layer to induce pretilt of the liquid crystals, and
the liquid crystals have negative dielectric anisotropy.

5. The LCD of claim 4,
wherein R$_2$ of the first compound or the polymer of the first compound is aligned toward the base, and
R$_1$ of the first compound or the polymer of the first compound is aligned toward the liquid crystal layer.

6. The LCD of claim 5, wherein R$_1$ is a polymerizable group,
a plurality of pixels are defined, and
each pixel comprises a first domain and a second domain having different pretilt directions of the liquid crystals,
wherein a planar direction of *—SP$_1$—R$_1$ of the first compound in the alignment inducing layer in the first domain is different from a planar direction of the polymerizable group of the first compound, in the alignment inducing layer in the second domain.

7. The LCD of claim 1, wherein a plurality of pixels are defined, and
each pixel comprises a first domain and a fourth domain having the same tilt direction of the liquid crystals,
wherein the liquid crystals in the first domain have a pretilt toward the center of the pixel, and
the liquid crystals in the fourth domain have a pretilt toward the periphery of the pixel.

8. The LCD of claim 1, wherein the alignment inducing layer further comprises a third compound represented by formula C1 or a polymer of the third compound,
wherein the content of the first compound is greater than that of the third compound:

(C1)

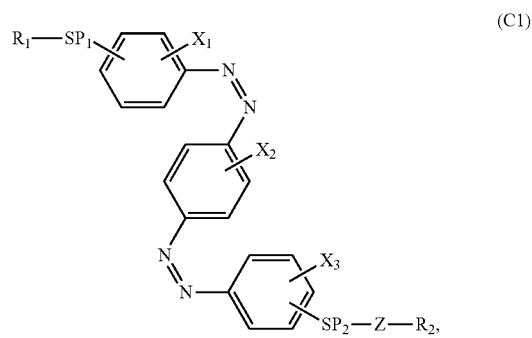

where R$_1$, R$_2$, SP$_1$, SP$_2$, Z, X$_1$, X$_2$, and X$_3$ are the same as defined in formula A1.

9. The LCD of claim 1, further comprising a first field generating electrode between the base and the alignment inducing layer, and wherein a plurality of pixels are defined, and each pixel comprises a plurality of domains having different tilt directions of the liquid crystals, wherein the first field generating electrode does not have domain division portions.

10. A method of manufacturing an LCD, the method comprising:
forming a pre-alignment inducing layer on a base and a liquid crystal layer comprising liquid crystals on the pre-alignment inducing layer; and
irradiating the pre-alignment inducing layer with light having a first peak wavelength,
wherein the pre-alignment inducing layer comprises a second compound represented by formula B1:

(B1)

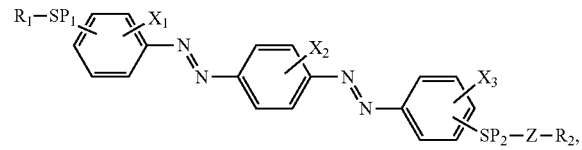

where R$_1$ is a polymerizable group, R$_2$ is a monovalent hydrophilic group selected from

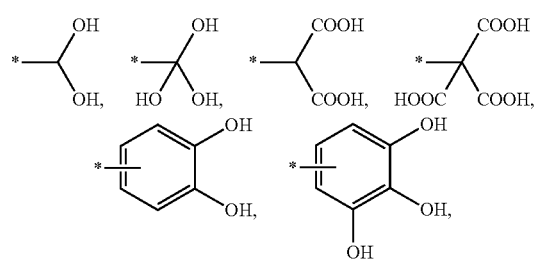

-continued

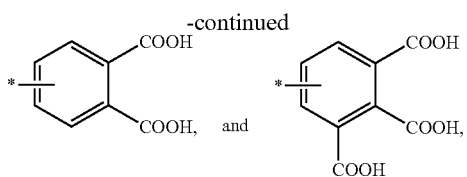

SP$_1$ is a single bond, a C$_1$-C$_{12}$ alkylene group, or a C$_1$-C$_{12}$ alkoxylene group, SP$_2$ is a single bond, a C$_3$-C$_{12}$ alkylene group, or a C$_1$-C$_{12}$ alkoxylene group, Z is a single bond, an ester group, or an ether group, and X$_1$, X$_2$ and X$_3$ are each independently hydrogen, a methyl group, fluorine or chlorine, wherein in the irradiating of the pre-alignment inducing layer with light having a first peak wavelength, at least a portion of the second compound is converted into a first compound represented by formula A1 to form an alignment inducing layer:

(A1)

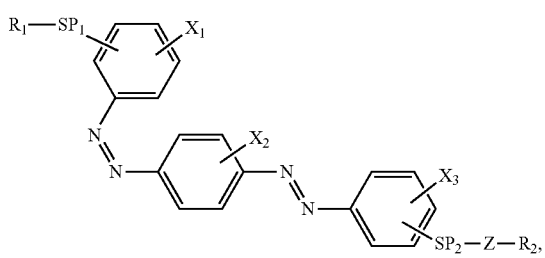

where R$_1$, R$_2$, SP$_1$, SP$_2$, Z, X$_1$, X$_2$, and X$_3$ are the same as defined in the formula B1.

11. The method of claim 10,
wherein the forming of the pre-alignment inducing layer and the liquid crystal layer comprises:
providing a liquid crystal composition, which comprises liquid crystals having negative dielectric anisotropy and the second compound, on the base,
wherein the content of the second compound is about 0.05% to about 1.0% by weight based on a total weight of the liquid crystal composition.

12. The method of claim 10, wherein the forming of the pre-alignment inducing layer and the liquid crystal layer comprises:
providing a liquid crystal composition, which comprises liquid crystals and the second compound, on the base,
forming the pre-alignment inducing layer through phase-separation of at least a portion of the second compound of the liquid crystal composition and self-alignment of the second compound on the base, and
forming the liquid crystal layer, in which the liquid crystals are vertically aligned, on the pre-alignment inducing layer.

13. The method of claim 12, wherein in the providing of the liquid crystal composition on the base,
the second compound is substantially uniformly dispersed in the liquid crystal composition, and
the solubility of the second compound in the liquid crystals is less than about 0.01% by weight.

14. The method of claim 10, wherein in the irradiating of the pre-alignment inducing layer with light having a first peak wavelength,
when the at least a portion of the second compound is converted into the first compound represented by formula A1 to form the alignment inducing layer, a pretilt is formed in the liquid crystals in the liquid crystal layer.

15. The method of claim 10, wherein the first peak wavelength falls within the range of about 450 nm to about 550 nm.

16. The method of claim 10, further comprising irradiating the alignment inducing layer with light having a second peak wavelength shorter than the first peak wavelength after the irradiating of the pre-alignment inducing layer with the light having the first peak wavelength,
wherein the liquid crystal layer further comprises a reactive mesogen compound dispersed in the liquid crystals in the irradiating of the pre-alignment inducing layer with the light having the first peak wavelength.

17. The method of claim 16, wherein in the irradiating of the alignment inducing layer with the light having the second peak wavelength,
at least a portion of the first compound, at least a portion of the second compound, and/or at least a portion of the reactive mesogen compound form a polymer.

18. The method of claim 10, wherein the irradiating of the pre-alignment inducing layer with the light having the first peak wavelength comprises:
irradiating a first oblique light having an inclination to a first region of the pre-alignment inducing layer, and
irradiating a second oblique light having an inclination in a direction different from that of the inclination of the first oblique light to a second region of the pre-alignment inducing layer.

19. The method of claim 10, wherein the irradiating of the light having the first peak wavelength comprises:
irradiating a first polarized light to a first region of the pre-alignment inducing layer, and
irradiating a second polarized light having a different polarization direction from the first polarized light to a second region of the pre-alignment inducing layer.

* * * * *

UNITED STATES PATENT AND TRADEMARK OFFICE
CERTIFICATE OF CORRECTION

| | | |
|---|---|---|
| PATENT NO. | : 11,131,889 B2 | |
| APPLICATION NO. | : 16/143045 | |
| DATED | : September 28, 2021 | |
| INVENTOR(S) | : Ho Lim et al. | |

It is certified that error appears in the above-identified patent and that said Letters Patent is hereby corrected as shown below:

In the Claims

Column 34, Line 59, Claim 1    delete "polymenzable" and insert -- polymerizable --

Signed and Sealed this
First Day of November, 2022

Katherine Kelly Vidal
*Director of the United States Patent and Trademark Office*